United States Patent
Bhargava et al.

(10) Patent No.: US 9,665,437 B2
(45) Date of Patent: May 30, 2017

(54) TEST-AND-DEVELOPMENT WORKFLOW AUTOMATION

(71) Applicant: Actifio, Inc., Waltham, MA (US)

(72) Inventors: Ankur Bhargava, Wayland, MA (US); Dongjun Sun, Acton, MA (US); Sachindra Kumar, Framingham, MA (US); Xiangdong Zhang, Wellesley, MA (US); Madhav Mutalik, Southborough, MA (US)

(73) Assignee: Actifio, Inc., Waltham, MA (US)

( * ) Notice: Subject to any disclaimer, the term of this patent is extended or adjusted under 35 U.S.C. 154(b) by 0 days.

(21) Appl. No.: 14/546,757

(22) Filed: Nov. 18, 2014

(65) Prior Publication Data
US 2015/0143064 A1 May 21, 2015

Related U.S. Application Data

(60) Provisional application No. 62/063,162, filed on Oct. 13, 2014, provisional application No. 61/912,232,
(Continued)

(51) Int. Cl.
*G06F 11/14* (2006.01)
*H04L 29/08* (2006.01)
*G06F 17/30* (2006.01)

(52) U.S. Cl.
CPC ...... *G06F 11/1451* (2013.01); *G06F 11/1435* (2013.01); *G06F 11/1446* (2013.01);
(Continued)

(58) Field of Classification Search
CPC ............. G06F 11/1435; G06F 11/1446; G06F 11/1451; G06F 11/14; G06F 11/1402;
(Continued)

(56) References Cited

U.S. PATENT DOCUMENTS

| | | |
|---|---|---|
| 4,626,829 A | 12/1986 | Hauck |
| 5,381,545 A | 1/1995 | Baker et al. |

(Continued)

FOREIGN PATENT DOCUMENTS

CN 102890621 A 1/2013

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Shawn X Gu
*Assistant Examiner* — Jean Edouard
(74) *Attorney, Agent, or Firm* — Wilmer Cutler Pickering Hale & Dorr LLP

(57) ABSTRACT

Computerized methods and systems for automating a process of creating and mounting live copies of data to applications in accordance with workflows that specify procedures for creating and mounting the live copies of data to the applications. The methods and systems comprise executing at least one workflow associated with a data object based on a triggering event, and executing a set of configurable work actions associated with the at least one workflow; creating a snapshot of data volumes associated with the data object; creating liveclone volumes based on the snapshot of the data volumes, and mounting and dismounting the liveclone volumes to and from at least one application.

18 Claims, 56 Drawing Sheets

Related U.S. Application Data filed on Dec. 5, 2013, provisional application No. 61/905,342, filed on Nov. 18, 2013, provisional application No. 61/905,346, filed on Nov. 18, 2013, provisional application No. 61/905,360, filed on Nov. 18, 2013.

(52) U.S. Cl.
CPC ...... *G06F 11/1461* (2013.01); *G06F 11/1464* (2013.01); *G06F 17/302* (2013.01); *H04L 67/10* (2013.01); *G06F 11/1453* (2013.01); *G06F 11/1456* (2013.01); *G06F 2201/84* (2013.01); *H04L 67/1097* (2013.01)

(58) Field of Classification Search
CPC .. G06F 11/1448; G06F 11/07; G06F 11/2064; G06F 11/2071; G06F 11/2082
See application file for complete search history.

(56) References Cited

U.S. PATENT DOCUMENTS

| | | | |
|---|---|---|---|
| 5,410,667 A | 4/1995 | Belsan et al. | |
| 5,497,483 A | 3/1996 | Beardsley et al. | |
| 5,535,381 A | 7/1996 | Kopper | |
| 5,819,292 A | 10/1998 | Hitz et al. | |
| 5,828,876 A | 10/1998 | Fish et al. | |
| 5,857,208 A | 1/1999 | Ofek | |
| 5,918,225 A | 6/1999 | White et al. | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Milligan et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,765,190 B1* | 7/2010 | Bingham | G06F 11/1458 707/649 |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,139,575 B2 | 3/2012 | Biran et al. | |
| 8,150,808 B2 | 4/2012 | Zha et al. | |
| 8,161,077 B2 | 4/2012 | Zha et al. | |
| 190,835 A1 | 5/2012 | Yueh | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,346,718 B2 | 1/2013 | Hall et al. | |
| 8,407,191 B1 | 3/2013 | Nanda | |
| 8,468,174 B1 | 6/2013 | Yueh et al. | |
| 8,548,944 B2 | 10/2013 | Yueh | |
| 8,554,918 B1 | 10/2013 | Douglis | |
| 8,566,361 B2 | 10/2013 | Zha et al. | |
| 8,706,833 B1 | 4/2014 | Bergant et al. | |
| 8,788,769 B2 | 7/2014 | Abercrombie et al. | |
| 8,843,489 B2 | 9/2014 | Provenzano | |
| 9,098,432 B1 | 8/2015 | Bachu et al. | |
| 2002/0080143 A1 | 6/2002 | Morgan et al. | |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0199570 A1 | 10/2004 | Terao | |
| 2004/0236623 A1 | 11/2004 | Gopalakrishnan | |
| 2005/0066095 A1 | 3/2005 | Mullick et al. | |
| 2005/0165794 A1 | 7/2005 | Mosescu | |
| 2006/0047928 A1 | 3/2006 | Bhasin et al. | |
| 2006/0074945 A1 | 4/2006 | Mori | |
| 2006/0107085 A1* | 5/2006 | Daniels | G06F 11/2074 714/2 |
| 2006/0161810 A1* | 7/2006 | Bao | G06F 11/2082 714/6.12 |
| 2006/0212704 A1 | 9/2006 | Kirovski et al. | |
| 2007/0006023 A1* | 1/2007 | Fujibayashi | G06F 11/1456 714/6.32 |
| 2008/0082592 A1 | 4/2008 | Ahal et al. | |
| 2009/0049260 A1 | 2/2009 | Upadhyayula | |
| 2009/0222496 A1 | 9/2009 | Liu et al. | |
| 2011/0184919 A1 | 7/2011 | Shirk | |
| 2011/0218966 A1 | 9/2011 | Barnes et al. | |
| 2011/0225123 A1* | 9/2011 | D'Souza | G06F 17/30312 707/634 |
| 2011/0246832 A1 | 10/2011 | Akiyama et al. | |
| 2011/0258161 A1 | 10/2011 | Constantinescu et al. | |
| 2011/0258239 A1 | 10/2011 | Petrocelli | |
| 2012/0110328 A1 | 5/2012 | Pate et al. | |
| 2012/0123999 A1 | 5/2012 | Ashutosh et al. | |
| 2012/0124012 A1 | 5/2012 | Provenzano et al. | |
| 2012/0124013 A1 | 5/2012 | Provenzano | |
| 2012/0124014 A1 | 5/2012 | Provenzano | |
| 2012/0124046 A1 | 5/2012 | Provenzano | |
| 2012/0124306 A1* | 5/2012 | Abercrombie | G06F 11/1461 711/162 |
| 2012/0323971 A1 | 12/2012 | Pasupuleti | |
| 2013/0036098 A1 | 2/2013 | Mutalik et al. | |
| 2013/0152045 A1 | 6/2013 | Jain et al. | |
| 2013/0262396 A1* | 10/2013 | Kripalani | G06F 17/30289 707/674 |
| 2013/0275674 A1* | 10/2013 | Rangachari | G06F 3/065 711/114 |
| 2013/0282662 A1 | 10/2013 | Kumarasamy et al. | |
| 2013/0325828 A1 | 12/2013 | Larson et al. | |
| 2014/0201150 A1* | 7/2014 | Kumarasamy | G06F 11/1451 707/639 |

OTHER PUBLICATIONS

American Megatrends, Inc., "StorTrends/ManageTrends (Version 2.7) User's Guide for the StorTends 1300 Storage Appliance" Mar. 23, 2009 (378 pages).

(56) References Cited

OTHER PUBLICATIONS

Arrell et al., "Using RVA and SnapShot for Business Intelligence Applications with OS/390 and DB2," IBM, Redbooks, Aug. 1998 (70 pages).
Azagury et al., "Point-in-Time Copy: Yesterday, Today and Tomorrow," IBM Research Lab in Haifa, No Date Listed (pp. 259-270).
Baird, "Virtual Storage Architecture Guide (VSAG)," IEEE, No Month Listed 1995 (pp. 312-326).
Baker, "Disk-Based Mirroring is a Lot More Than Just Safe," Computer Technology Review, No Month Listed 2000 (pp. 55-57).
Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).
Cederqvist et al., "Version Management with CVS," No Month Listed 1992 (122 pages).
Chang et al., "Performance Analysis of Two Frozen Image Based Backup/Restore Methods," IEEE International Conference on Electron Information Technology 2005, May 22-25, 2005 (7 pages).
Chapman et al., "SnapMirror® Best Practices Guide," Network Appliance, Inc., Apr. 2006 (63 pages).
Chatterjee et al., "Efficient Replication Leveraging Information Lifecycle Management in Data Storage Systems," Provisional Patent Application No. Not Available, Feb. 9, 2009 (25 pages).
Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).
Chutani et al., "The Episode File System," USENIX Association, Proceedings of the Winter 1992 Usenix Conference, San Francisco, California, Jan. 20-24, 1992 (19 pages).
CommVault, "CommVault® Simpana® Quick Recovery® Software for Critical Data Center Applications and File Systems," No Month Listed 2010 (35 pages).
Dantz Development Corporation, "Retrospect® User's Guide," No Month Listed 2002 (262 pages).
Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File Volume Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).

Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).

(56) References Cited

OTHER PUBLICATIONS

Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("The '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, Data Domain ("Data Domain") as Prior Art to U.S. Pat. No. 6,959,369, Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade The European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http://www.cs.wisc.edu/~shankar/Viva/viva.html>>] Jun. 14, 1997 (26 pages).

(56) References Cited

OTHER PUBLICATIONS

Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror® File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).

(56) References Cited

OTHER PUBLICATIONS

Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).
International Search Report and Written Opinion issued by the U.S. Patent and Trademark Office as International Searching Authority for International Application No. PCT/US14/66104 mailed Apr. 6, 2015 (11 pgs.).

* cited by examiner

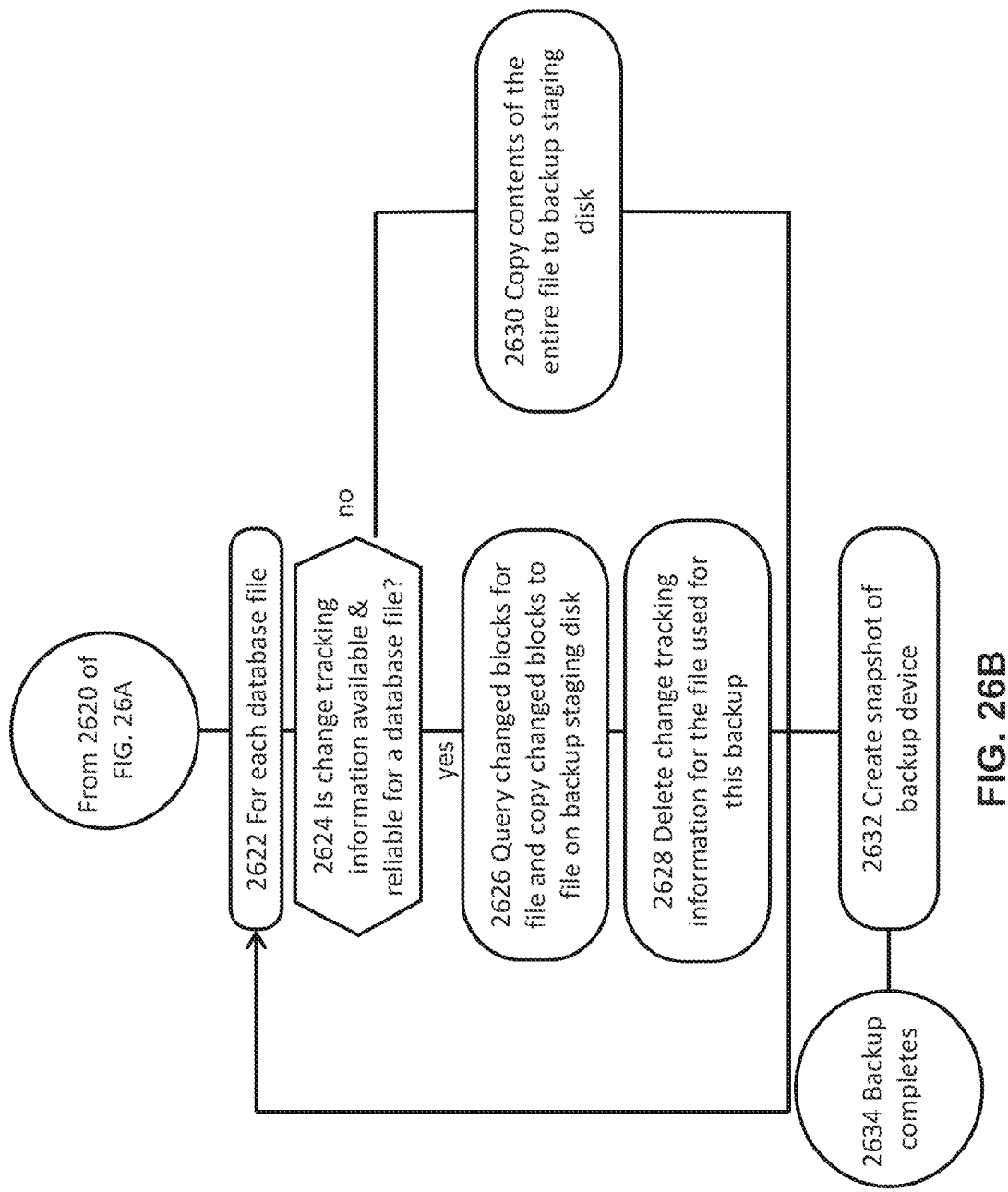

| Backup Time | Bitmap Id Created | Bitmaps available at backup time | Bitmap id used for backup | Bitmap id deleted |
|---|---|---|---|---|
| D1 | 1 | 1 | - | - |
| D2 | 2 | 1,2 | 1 | 1 |
| D3 | 3 | 2,3 | 2 | 2 |
| D4 | 4 | 3,4 | 3 | 3 |
| D5 | 5 | 4,5 | 4 | 4 |
| D6 | 6 | 5,6 | 5 | 5 |

FIG. 27

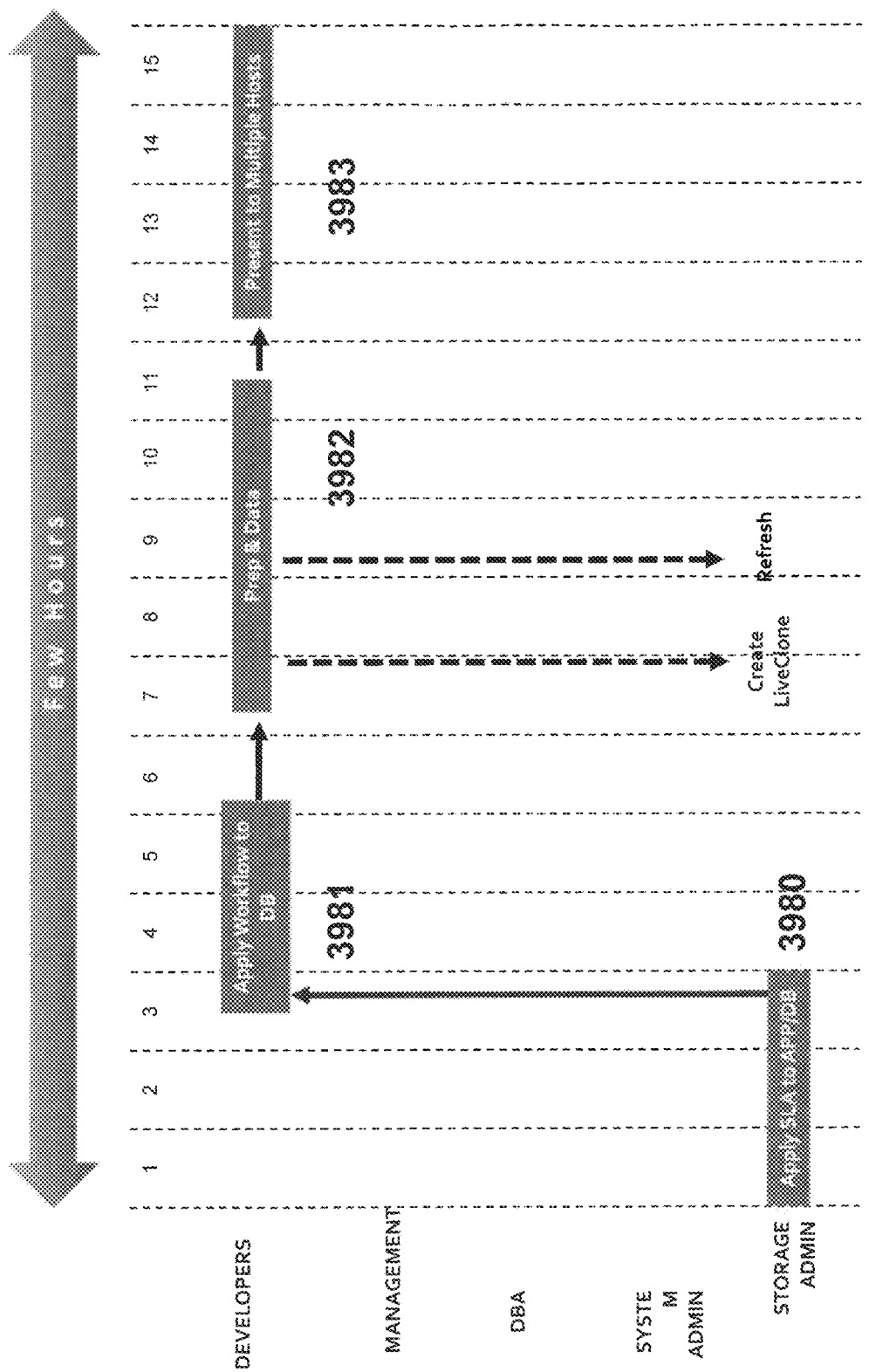

Comparing Filesystem and Virtual Disk Snapshot Services

| Criterion | Filesystem Snapshot | Virtual Disk Snapshot |
|---|---|---|
| Where implemented | proxy host filesystem | copy storage server hypervisor |
| Write caching | write through | write behind with non-volatile memory |
| Technology | allocate on write | copy on write |
| Snapshot Count | only limited by memory in the proxy host | limits imposed by storage hypervisor |
| Read/write performance | generally slower | generally faster |
| Scales out | yes, with the addition of new proxy hosts | no, depends on server hypervisor |

FIG. 51

TEST-AND-DEVELOPMENT WORKFLOW AUTOMATION

CROSS-REFERENCE TO RELATED APPLICATIONS

This disclosure claims the benefit of priority under 35 U.S.C. §119(e) to the following applications, the contents of are hereby incorporated by reference in their entirety:

U.S. Pat. App. No. 62/063,162, filed Oct. 13, 2014, entitled COPY DATA TECHNIQUES U.S. Pat. App. No. 61/905,346, filed Nov. 18, 2013, entitled COMPUTERIZED METHODS AND APPARATUS FOR INCREMENTAL DATABASE BACKUP USING CHANGE TRACKING U.S. Pat. App. No. 61/905,360, filed Nov. 18, 2013, entitled DATA MANAGEMENT VIRTUALIZATION U.S. Pat. App. No. 61/912,232, filed Dec. 5, 2013 entitled COMPUTERIZED METHODS AND APPARATUS FOR DATA CLONING U.S. Pat. App. No. 61/905,342, filed Nov. 18, 2013, entitled TEST-AND-DEVELOPMENT WORKFLOW AUTOMATION This disclosure is related to the following applications, the contents of are hereby incorporated by reference in their entirety:

U.S. patent application Ser. No. 61/063,162, filed Nov. 18, 2014, entitled SUCCESSIVE DATA FINGERPRINTING FOR COPY ACCURACY ASSURANCE, U.S. patent application Ser. No. 14/546,727, filed Nov. 18, 2014, entitled COMPUTERIZED METHODS AND APPARATUS FOR INCREMENTAL DATABASE BACKUP USING CHANGE TRACKING, U.S. patent application Ser. No. 14/546,738, filed Nov. 18, 2014, entitled DATA MANAGEMENT VIRTUALIZATION, U.S. patent application Ser. No. 14/546,747, filed Nov. 18, 2014 entitled COMPUTERIZED METHODS AND APPARATUS FOR DATA CLONING,

TECHNICAL FIELD

This invention relates generally to data management, data protection, and data verification.

BACKGROUND

The business requirements for managing the lifecycle of application data have been traditionally met by deploying multiple point solutions, each of which addresses a part of the lifecycle. This has resulted in a complex and expensive infrastructure where multiple copies of data are created and moved multiple times to individual storage repositories. The adoption of server virtualization has become a catalyst for simple, agile and low-cost compute infrastructure. This has led to larger deployments of virtual hosts and storage, further exacerbating the gap between the emerging compute models and the current data management implementations.

Applications that provide business services depend on storage of their data at various stages of its lifecycle. FIG. 1 shows a typical set of data management operations that would be applied to the data of an application such as a database underlying a business service such as payroll management. In order to provide a business service, application 102 requires primary data storage 122 with some contracted level of reliability and availability.

Backups 104 are made to guard against corruption or the primary data storage through hardware or software failure or human error. Typically backups may be made daily or weekly to local disk or tape 124, and moved less frequently (weekly or monthly) to a remote physically secure location 125.

Concurrent development and test 106 of new applications based on the same database requires a development team to have access to another copy of the data 126. Such a snapshot might be made weekly, depending on development schedules.

Compliance with legal or voluntary policies 108 may require that some data be retained for safely future access for some number of years; usually data is copied regularly (say, monthly) to a long-term archiving system 128.

Disaster Recovery services 110 guard against catastrophic loss of data if systems providing primary business services fail due to some physical disaster. Primary data is copied 130 to a physically distinct location as frequently as is feasible given other constraints (such as cost). In the event of a disaster the primary site can be reconstructed and data moved back from the safe copy.

Business Continuity services 112 provide a facility for ensuring continued business services should the primary site become compromised. Usually this requires a hot copy 132 of the primary data that is in near-lockstep with the primary data, as well as duplicate systems and applications and mechanisms for switching incoming requests to the Business Continuity servers.

Thus, data management is currently a collection of point applications managing the different parts of the lifecycle. This has been an artifact of evolution of data management solutions over the last two decades.

Current Data Management architecture and implementations such as described above involve multiple applications addressing different parts of data lifecycle management, all of them performing certain common functions: (a) make a copy of application data (the frequency of this action is commonly termed the Recovery Point Objective (RPO)), (b) store the copy of data in an exclusive storage repository, typically in a proprietary format, and (c) retain the copy for certain duration, measured as Retention Time. A primary difference in each of the point solutions is in the frequency of the RPO, the Retention Time, and the characteristics of the individual storage repositories used, including capacity, cost and geographic location.

In a series of prior patent applications, e.g., U.S. Ser. No. 12/947,375, a system and method for managing data has been presented that uses Data Management Virtualization. Data Management activities, such as Backup, Replication and Archiving are virtualized in that they do not have to be configured and run individually and separately. Instead, the user defines their business requirement with regard to the lifecycle of the data, and the Data Management Virtualization System performs these operations automatically. A snapshot is taken from primary storage to secondary storage; this snapshot is then used for a backup operation to other secondary storage. Essentially an arbitrary number of these backups may be made, providing a level of data protection specified by a Service Level Agreement.

The present application provides enhancements to the above system for data management virtualization.

SUMMARY

According to some embodiments of the present disclosure, computerized methods and systems are disclosed for automating a process of creating and mounting live copies of data to applications in accordance with workflows that specify procedures for creating and mounting the live copies of data to the applications, said system comprising: a memory containing instructions for execution by a processor; a storage system for providing a data object; the processor configured to: execute at least one workflow associated with the data object based on a triggering event, the triggering event specifying a condition upon which to execute the at least one workflow, the workflow comprising a configurable set of work actions; and execute the set of configurable work actions associated with the at least one workflow, the processor further configured to: create a snapshot of data volumes associated with the data object; create liveclone volumes based on the snapshot of the data volumes, wherein the liveclone volumes provide a live copy of the data object so that an application can use the data object as stored in the liveclone volumes, and mount and dismount the liveclone volumes to and from at least one application, thereby automating the process of creating and mounting live copies of data to applications in accordance with workflows that specify procedures for creating and mounting the live copies of data to applications.

BRIEF DESCRIPTION OF THE DRAWINGS

FIGS. 26A and 26B are exemplary flow charts illustrating a computerized method for incremental backup using a change tracking driver, according to some embodiments.

FIG. 27 is an exemplary table illustrating the lifecycle of a change tracking bitmap, according to some embodiments.

FIG. 39B is a flow diagram of the new process leveraging workflow automation technology to procure copy of production data for business application development, according to some embodiments.

FIG. 51 is an exemplary table that compares features of the two snapshot services, according to some embodiments.

DETAILED DESCRIPTION

Figure 1:
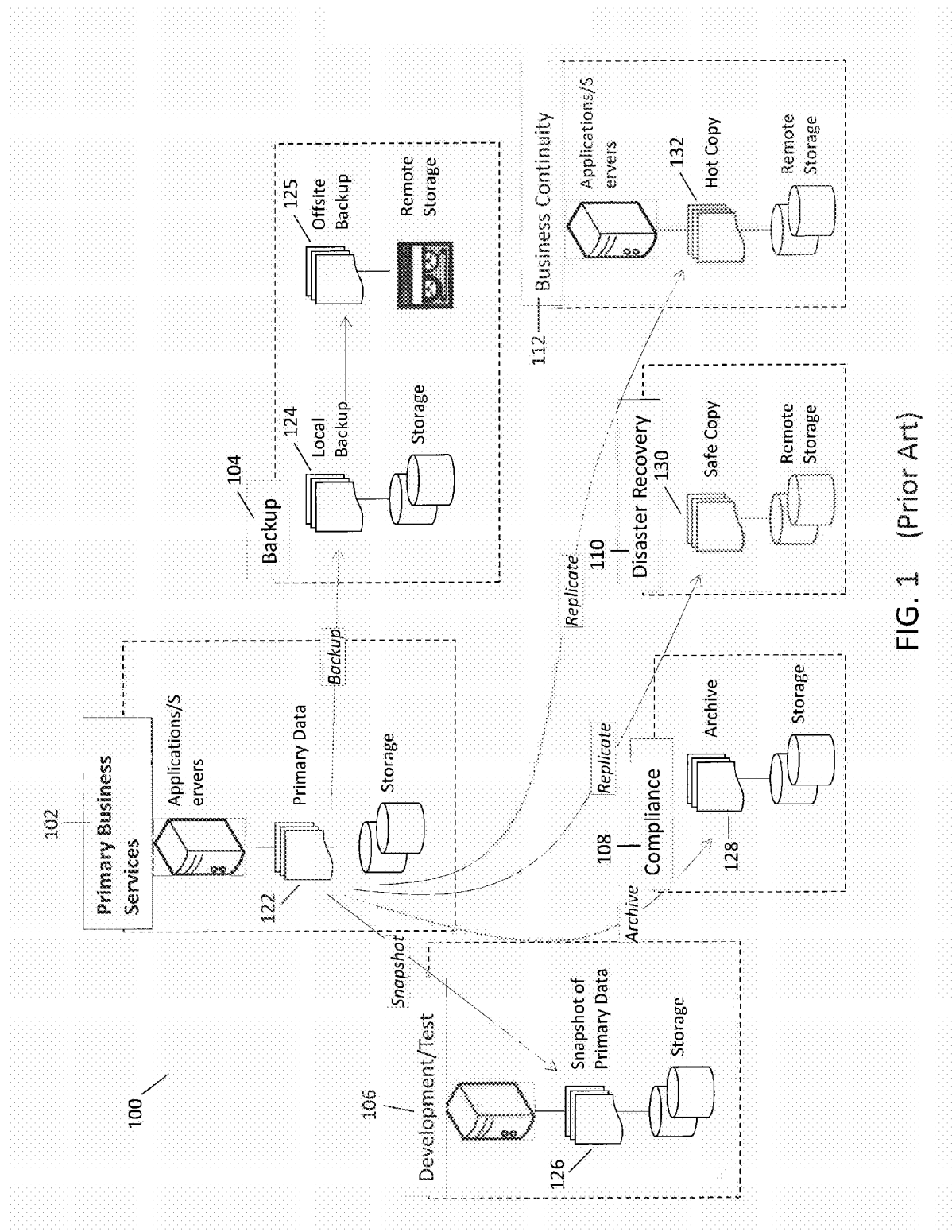
FIG. 1 is a simplified diagram of current methods deployed to manage the data lifecycle for a business service.

This disclosure pertains to computerized methods and apparatus for test-and-development workflow automation.

In the Data Management Virtualization system described below, a user defines business requirements with regard to the lifecycle of the data, and the Data Management Virtualization System performs these operations automatically. A snapshot is taken from primary storage to secondary storage; this snapshot is then used for a backup operation to other secondary storage. Essentially an arbitrary number of these backups may be made, providing a level of data protection specified by a Service Level Agreement.

The data management engine is operable to execute a sequence of snapshot operations to create point-in-time images of application data on a first storage pool, each successive point-in-time image corresponding to a specific, successive time-state of the application data, and each snapshot operation creating difference information indicating which application data has changed and the content of the changed application data for the corresponding time state. The data management engine is also operable to execute at least one back-up function for the application data that is scheduled for execution at non-consecutive time-states, and is also full of maintain history information having time-state information indicating the time-state of the last back-up function performed on the application data for a corresponding back-up copy of data. The data management engine creates composite difference information from the difference information for each time-state between the time-state of the last back-up function performed on the application data and the time-state of the currently-scheduled back-up function to be performed on the application data, and sends the composite difference information to a second storage pool to be compiled with the back-up copy of data at the last time-state to create a back-up copy of data for the current time-state.

Data Management Virtualization technology according to this disclosure is based on an architecture and implementation based on the following guiding principles.

First, define the business requirements of an application with a Service Level Agreement (SLA) for its entire data lifecycle. The SLA is more than a single RPO, Retention and Recovery Time Objective (RTO). It describes the data protection characteristics for each stage of the data lifecycle. Each application may have a different SLA.

Second, provide a unified Data Management Virtualization Engine that manages the data protection lifecycle, moving data across the various storage repositories, with improved storage capacity and network bandwidth. The Data Management Virtualization system achieves these improvements by leveraging extended capabilities of modern storage systems by tracking the portions of the data that have changed over time and by data deduplication and compression algorithms that reduce the amount of data that needs to be copied and moved.

Third, leverage a single master copy of the application data to be the basis for multiple elements within the lifecycle. Many of the Data Management operations such as backup, archival and replication depend on a stable, consistent copy of the data to be protected. The Data Management Virtualization System leverages a single copy of the data for multiple purposes. A single instance of the data maintained by the system may serve as the source, from which each data management function may make additional copies as needed. This contrasts with requiring application data to be copied multiple times by multiple independent data management applications in the traditional approach.

Fourth, abstracting physical storage resources into a series of data protection storage pools, which are virtualized out of different classes of storage including local and remote disk, solid state memory, tape and optical media, private, public and/or hybrid storage clouds. The storage pools provide access independent of the type, physical location or underlying storage technology. Business requirements for the lifecycle of data may call for copying the data to different types of storage media at different times. The Data Management Virtualization system allows the user to classify and aggregate different storage media into storage pools, for example, a Quick Recovery Pool, which may include high speed disks, and a Cost Efficient Long-term Storage Pool, which may be a deduplicated store on high capacity disks, or a tape library. The Data Management Virtualization System can move data amongst these pools to take advantage of the unique characteristics of each storage medium. The abstraction of Storage Pools provides access independent of the type, physical location or underlying storage technology.

Fifth, improve the movement of the data between storage pools and disaster locations utilizing underlying device capabilities and post-deduplicated application data. The Data Management Virtualization System discovers the capabilities of the storage systems that include the Storage Pools, and takes advantage of these capabilities to move data efficiently. If the Storage System is a disk array that supports the capability of creating a snapshot or clone of a data volume, the Data Management Virtualization System will take advantage of this capability and use a snapshot to make a copy of the data rather than reading the data from one place and writing it to another. Similarly, if a storage system supports change tracking, the Data Management Virtualization System will update an older copy with just the changes to efficiently create a new copy. When moving data across a network, the Data Management Virtualization system uses a deduplication and compression algorithm that avoids sending data that is already available on the other side of the network.

One key aspect of improving data movement is recognizing that application data changes slowly over time. A copy of an application that is made today will, in general, have a lot of similarities to the copy of the same application that was made yesterday. In fact today's copy of the data could be represented as yesterday's copy with a series of delta transformations, where the size of the delta transformations themselves are usually much smaller than all of the data in the copy itself. The Data Management Virtualization system captures and records these transformations in the form of bitmaps or extent lists. In one embodiment of the system, the underlying storage resources—a disk array or server virtualization system—are capable of tracking the changes made to a volume or file; in these environments, the Data Management Virtualization system queries the storage resources to obtain these change lists, and saves them with the data being protected.

In the preferred embodiment of the Data Management Virtualization system, there is a mechanism for eavesdropping on the primary data access path of the application, which enables the Data Management Virtualization system to observe which parts of the application data are modified, and to generate its own bitmap of modified data. If, for example, the application modifies blocks 100, 200 and 300 during a particular period, the Data Management Virtualization system will eavesdrop on these events, and create a bitmap that indicates that these particular blocks were modified. When processing the next copy of application data, the Data Management Virtualization system will only process blocks 100, 200 and 300 since it knows that these were the only blocks that were modified.

In one embodiment of the system, where the primary storage for the application is a modern disk array or storage virtualization appliance, the Data Management Virtualization system takes advantage of a point-in-time snapshot capability of an underlying storage device to make the initial copy of the data. This virtual copy mechanism is a fast, efficient and low-impact technique of creating the initial copy that does not guarantee that all the bits will be copied, or stored together. Instead, virtual copies are constructed by maintaining metadata and data structures, such as copy-on-write volume bitmaps or extents, that allow the copies to be reconstructed at access time. The copy has a lightweight impact on the application and on the primary storage device. In another embodiment, where the application is based on a Server Virtualization System such as VMware or Xen, the Data Management Virtualization system uses the similar virtual-machine-snapshot capability that is built into the Server Virtualization systems. When a virtual copy capability is not available, the Data Management Virtualization System may include its own built-in snapshot mechanism.

It is possible to use the snapshot as a data primitive underlying all of the data management functions supported by the system. Because it is lightweight, the snapshot can be used as an internal operation even when the requested operation is not a snapshot per se; it is created to enable and facilitate other operations.

At the time of creation of a snapshot, there may be certain preparatory operations involved in order to create a coherent snapshot or coherent image, such that the image may be restored to a state that is usable by the application. These preparatory operations need only be performed once, even if the snapshot will be leveraged across multiple data management functions in the system, such as backup copies which are scheduled according to a policy. The preparatory operations may include application quiescence, which includes flushing data caches and freezing the state of the application; it may also include other operations known in the art and other operations useful for retaining a complete image, such as collecting metadata information from the application to be stored with the image.

Figure 2:
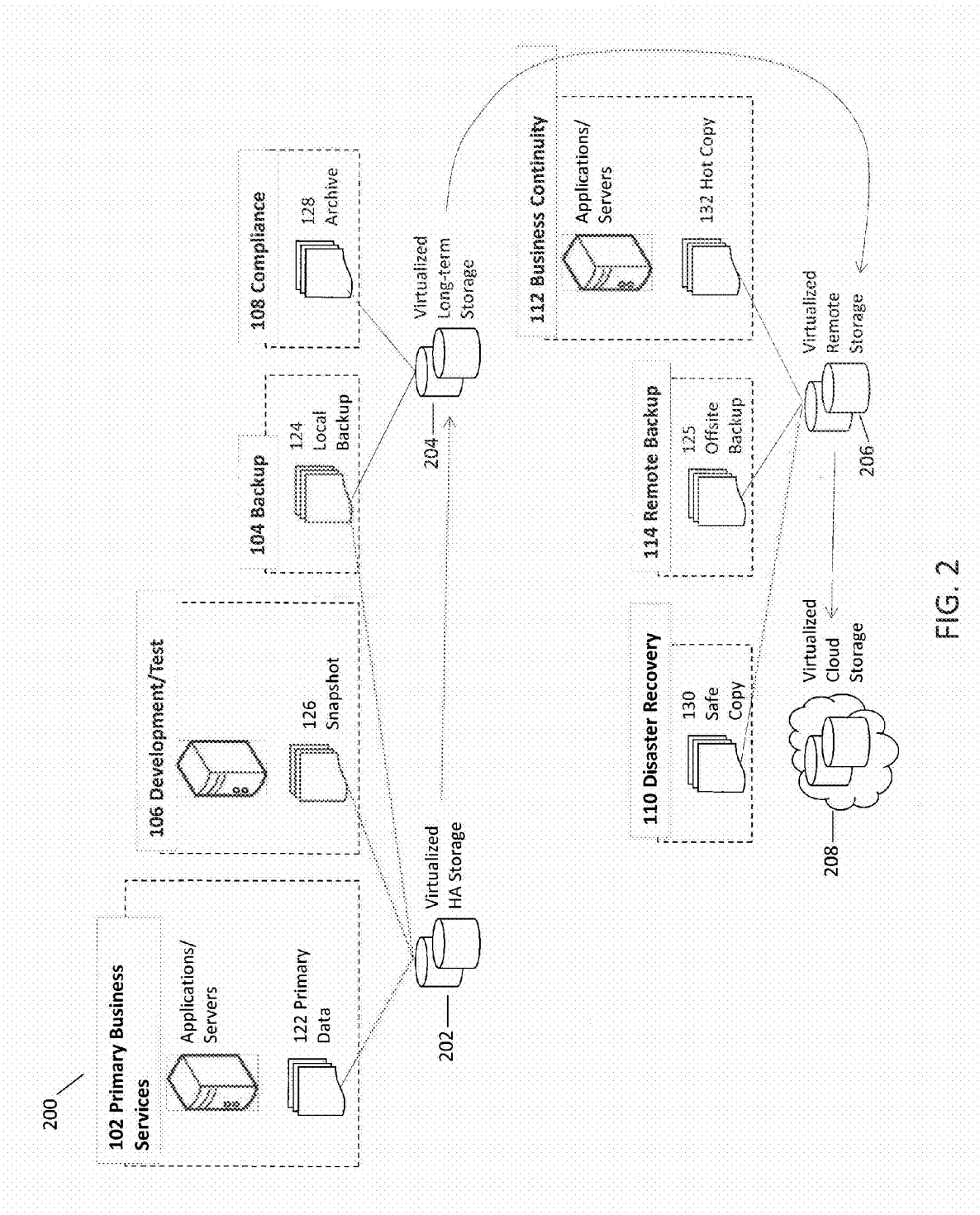
FIG. 2 is an overview of the management of data throughout its lifecycle by a single Data Management Virtualization System.

FIG. 2 illustrates one way that a Virtualized Data Management system can address the data lifecycle requirements described earlier in accordance with these principles.

To serve local backup requirements, a sequence of efficient snapshots are made within local high-availability storage 202. Some of these snapshots are used to serve development/test requirements without making another copy. For longer term retention of local backup, a copy is made efficiently into long-term local storage 204, which in this implementation uses deduplication to reduce repeated copying. The copies within long-term storage may be accessed as backups or treated as an archive, depending on the retention policy applied by the SLA. A copy of the data is made to remote storage 206 in order to satisfy requirements for remote backup and business continuity—again a single set of copies suffices both purposes. As an alternative for remote backup and disaster recovery, a further copy of the data may be made efficiently to a repository 208 hosted by a commercial or private cloud storage provider.

The Data Management Virtualization System

Figure 3:
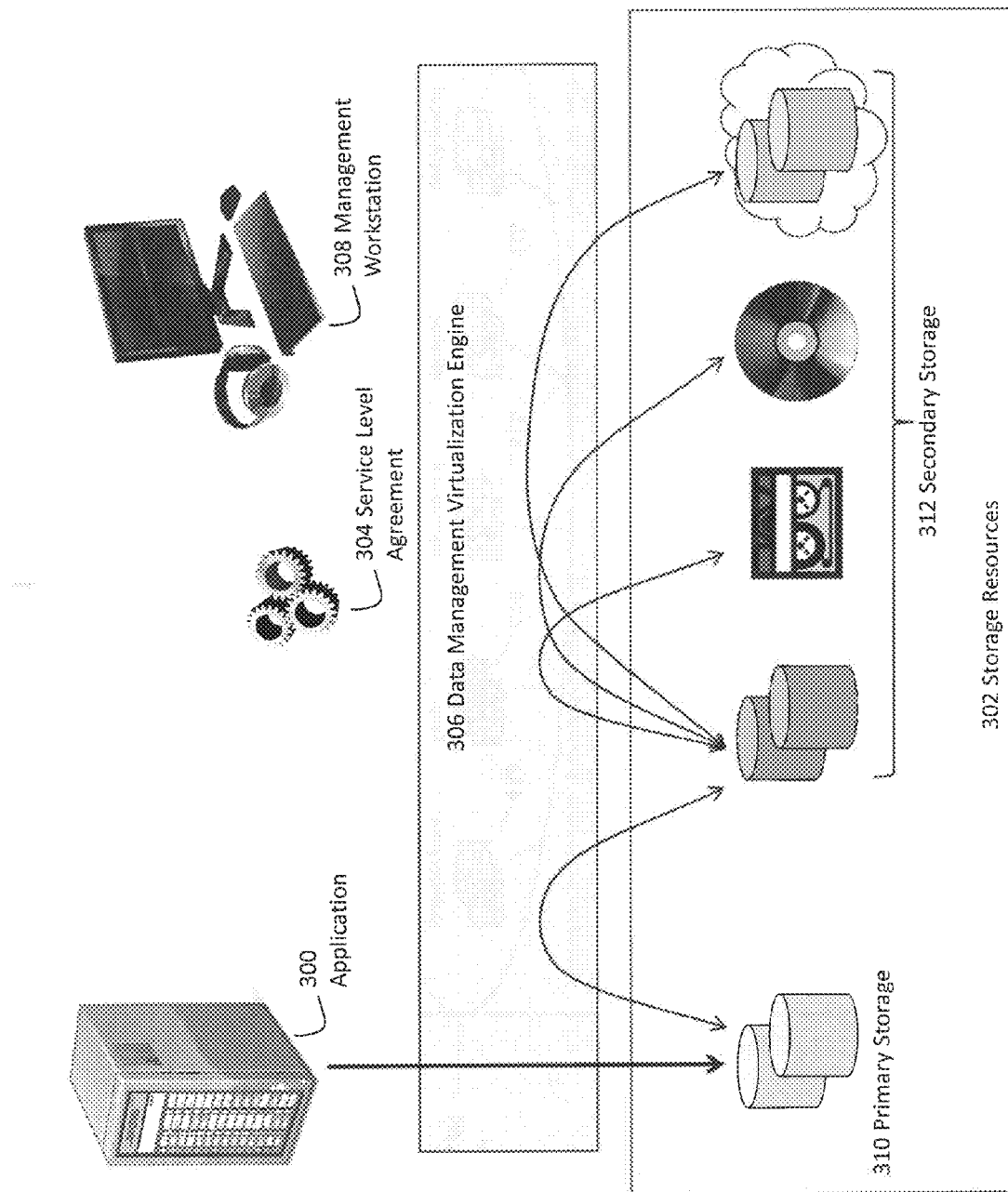
FIG. 3 is a simplified block diagram of the Data Management Virtualization system.

FIG. 3 illustrates the high level components of the Data Management Virtualization System that implements the above principles. Preferably, the system includes these basic functional components further described below.

Application 300 creates and owns the data. This is the software system that has been deployed by the user, as for example, an email system, a database system, or financial reporting system, in order to satisfy some computational need. The Application typically runs on a server and utilizes storage. For illustrative purposes, only one application has been indicated. In reality there may be hundreds or even thousands of applications that are managed by a single Data Management Virtualization System.

Storage Resources 302 is where application data is stored through its lifecycle. The Storage Resources are the physical storage assets, including internal disk drives, disk arrays, optical and tape storage libraries and cloud-based storage systems that the user has acquired to address data storage requirements. The storage resources include Primary Storage 310, where the online, active copy of the application data is stored, and Secondary Storage 312 where additional copies of the application data are stored for the purposes such as backup, disaster recovery, archiving, indexing, reporting and other uses. Secondary storage resources may include additional storage within the same enclosure as the primary storage, as well as storage based on similar or different storage technologies within the same data center, another location or across the internet.

One or more Management Workstations 308 allow the user to specify a Service Level Agreement (SLA) 304 that defines the lifecycle for the application data. A Management workstation is a desktop or laptop computer or a mobile computing device that is used to configure, monitor and control the Data Management Virtualization System. A Service Level Agreement is a detailed specification that captures the detailed business requirements related to the creation, retention and deletion of secondary copies of the application data. The SLA is more than the simple RTO and RPO that are used in traditional data management applications to represent the frequency of copies and the anticipated restore time for a single class of secondary storage. The SLA captures the multiple stages in the data lifecycle specification, and allows for non-uniform frequency and retention specifications within each class of secondary storage. The SLA is described in greater detail in FIG. 7.

Data Management Virtualization Engine 306 manages all of the lifecycle of the application data as specified in SLA. It manages potentially a large number of SLAs for a large number of applications. The Data Management Virtualization Engine takes inputs from the user through the Management Workstation and interacts with the applications to discover the applications primary storage resources. The Data Management Virtualization Engine makes decisions regarding what data needs to be protected and what secondary storage resources best fulfill the protection needs. For example, if an enterprise designates its accounting data as requiring copies to be made at very short intervals for business continuity purposes as well as for backup purposes, the Engine may decide to create copies of the accounting data at a short interval to a first storage pool, and to also create backup copies of the accounting data to a second storage pool at a longer interval, according to an appropriate set of SLAs. This is determined by the business requirements of the storage application.

The Engine then makes copies of application data using advanced capabilities of the storage resources as available. In the above example, the Engine may schedule the short-interval business continuity copy using a storage appliance's built-in virtual copy or snapshot capabilities. The Data Management Virtualization Engine moves the application data amongst the storage resources in order to satisfy the business requirements that are captured in the SLA. The Data Management Virtualization Engine is described in greater detail in FIG. 4.

The Data Management Virtualization System as a whole may be deployed within a single host computer system or appliance, or it may be one logical entity but physically distributed across a network of general-purpose and purpose-built systems. Certain components of the system may also be deployed within a computing or storage cloud.

In one embodiment of the Data Management Virtualization System the Data Management Virtualization Engine largely runs as multiple processes on a fault tolerant, redundant pair of computers. Certain components of the Data Management Virtualization Engine may run close to the application within the application servers. Some other components may run close to the primary and secondary storage, within the storage fabric or in the storage systems themselves. The Management stations are typically desktop and laptop computers and mobile devices that connect over a secure network to the Engine.

The Data Management Virtualization Engine

Figure 4:
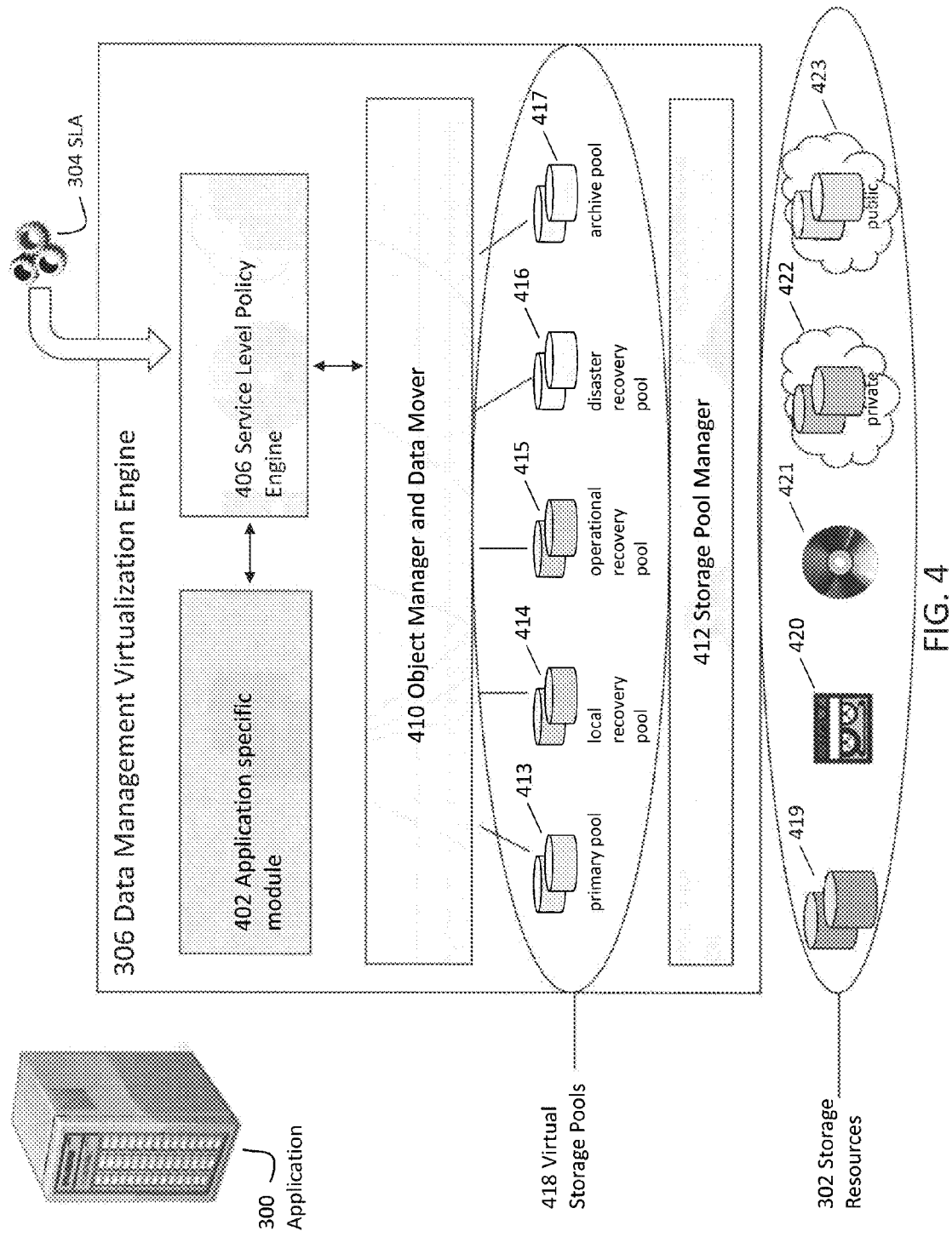
FIG. 4 is a view of the Data Management Virtualization Engine.

FIG. 4 illustrates an architectural overview of the Data Management Virtualization Engine 306 according to certain embodiments of the invention. The 306 Engine includes the following modules:

Application Specific Module 402. This module is responsible for controlling and collecting metadata from the application 300. Application metadata includes information about the application such as the type of application, details about its configuration, location of its datastores, its current operating state. Controlling the operation of the application includes actions such as flushing cached data to disk, freezing and thawing application I/O, rotating or truncating log files, and shutting down and restarting applications. The Application Specific module performs these operations and sends and receives metadata in responses to commands from the Service Level Policy Engine 406, described below. The Application Specific Module is described in more detail in connection with FIG. 8.

Service Level Policy Engine 406. This module acts on the SLA 304 provided by the user to make decisions regarding the creation, movement and deletion of copies of the application data. Each SLA describes the business requirements related to protection of one application. The Service Level Policy Engine analyzes each SLA and arrives at a series of actions each of which involve the copying of application data from one storage location to another. The Service Level Policy Engine then reviews these actions to determine priorities and dependencies, and schedules and initiates the data movement jobs. The Service Level Policy Engine is described in more detail in connection with FIG. 9.

Object Manager and Data Movement Engine 410. This module creates a composite object consisting of the Application data, the Application Metadata and the SLA which it moves through different target storage pools per instruction from the Policy Engine. The Object Manager receives instructions from the Service Policy Engine 406 in the form of a command to create a copy of application data in a particular pool based on the live primary data 413 belonging to the application 300, or from an existing copy, e.g., 415, in another pool. The copy of the composite object that is created by the Object Manager and the Data Movement Engine is self contained and self describing in that it contains not only application data, but also application metadata and the SLA for the application. The Object Manager and Data Movement Engine are described in more detail in connection with FIG. 5.

Storage Pool Manager 412. This module is a component that adapts and abstracts the underlying physical storage resources 302 and presents them as virtual storage pools 418. The physical storage resources are the actual storage assets, such as disk arrays and tape libraries that the user has deployed for the purpose of supporting the lifecycle of the data of the user's applications. These storage resources might be based on different storage technologies such as disk, tape, flash memory or optical storage. The storage resources may also have different geographic locations, cost and speed attributes, and may support different protocols. The role of the Storage Pool Manager is to combine and aggregate the storage resources, and mask the differences between their programming interfaces. The Storage Pool Manager presents the physical storage resources to the Object Manager 410 as a set of storage pools that have characteristics that make these pools suitable for particular stages in the lifecycle of application data. The Storage Pool Manager is described in more detail in connection with FIG. 6.

Object Manager and Data Movement Engine

Figure 5:
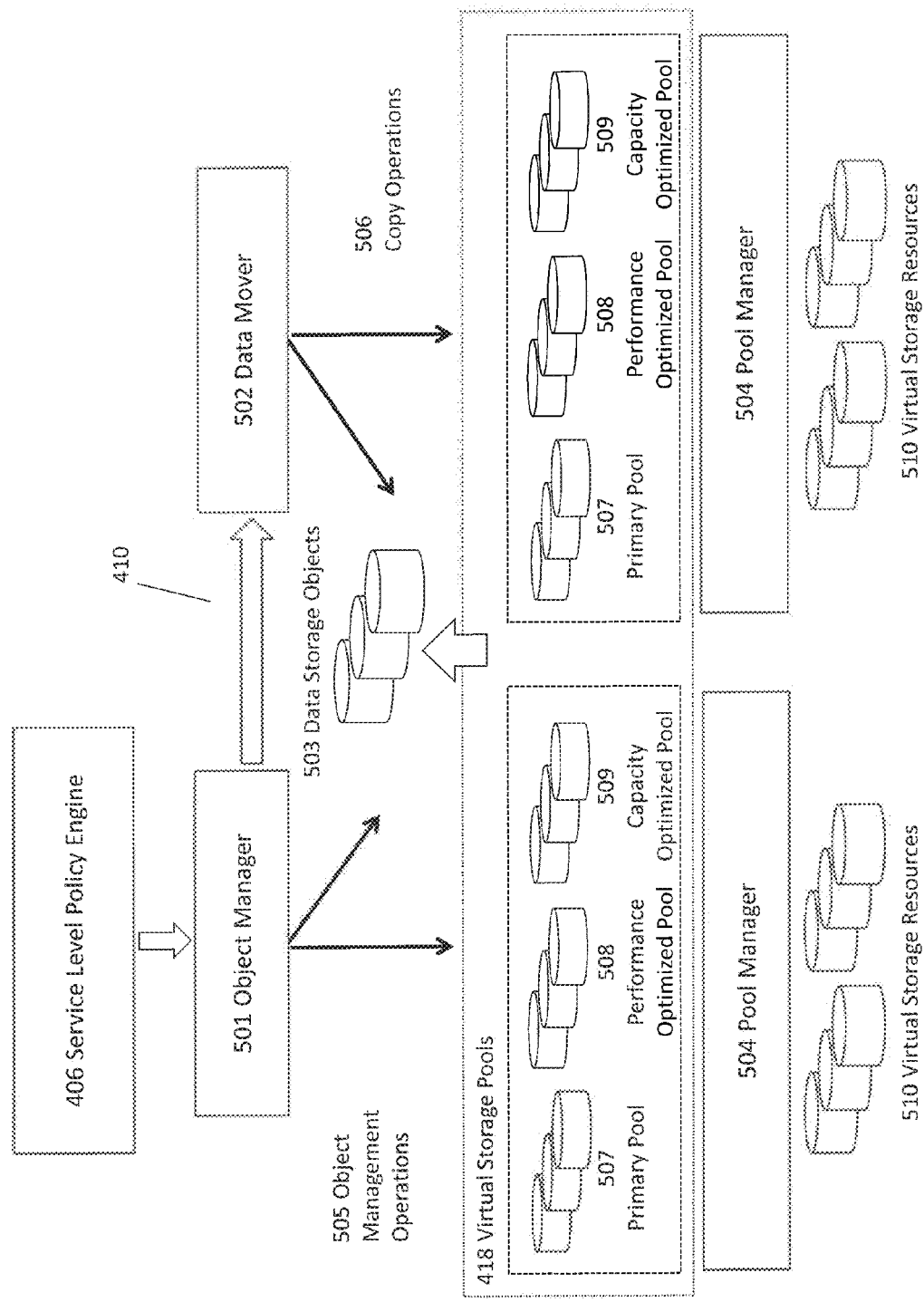
FIG. 5 illustrates the Object Management and Data Movement Engine.

FIG. 5 illustrates the Object Manager and Data Movement Engine 410. The Object Manager and Data Movement Engine discovers and uses Virtual Storage Resources 510 presented to it by the Pool Managers 504. It accepts requests from the Service Level Policy Engine 406 to create and maintain Data Storage Object instances from the resources in a Virtual Storage Pool, and it copies application data among instances of storage objects from the Virtual Storage Pools according to the instructions from the Service Level Policy Engine. The target pool selected for the copy implicitly designates the business operation being selected, e.g. backup, replication or restore. The Service Level Policy Engine resides either locally to the Object Manager (on the same system) or remotely, and communicates using a protocol over standard networking communication. TCP/IP may be used in a preferred embodiment, as it is well understood, widely available, and allows the Service Level Policy Engine to be located locally to the Object Manager or remotely with little modification.

In one embodiment, the system may deploy the Service Level Policy Engine on the same computer system as the Object Manager for ease of implementation. In another embodiment, the system may employ multiple systems, each hosting a subset of the components if beneficial or convenient for an application, without changing the design.

The Object Manager 501 and the Storage Pool Managers 504 are software components that may reside on the computer system platform that interconnects the storage resources and the computer systems that use those storage resources, where the user's application resides. The placement of these software components on the interconnect platform is designated as a preferred embodiment, and may provide the ability to connect customer systems to storage via communication protocols widely used for such applications (e.g. Fibre Channel, iSCSI, etc.), and may also provide ease of deployment of the various software components.

The Object Manager 501 and Storage Pool Manager 504 communicate with the underlying storage virtualization platform via the Application Programming Interfaces made available by the platform. These interfaces allow the software components to query and control the behavior of the computer system and how it interconnects the storage resources and the computer system where the user's Application resides. The components apply modularity techniques as is common within the practice to allow replacement of the intercommunication code particular to a given platform.

The Object Manager and Storage Pool Managers communicate via a protocol. These are transmitted over standard networking protocols, e.g. TCP/IP, or standard Interprocess Communication (IPC) mechanisms typically available on the computer system. This allows comparable communication between the components if they reside on the same computer platform or on multiple computer platforms connected by a network, depending on the particular computer platform. The current configuration has all of the local software components residing on the same computer system for ease of deployment. This is not a strict requirement of the design, as described above, and can be reconfigured in the future as needed.

Object Manager

Object Manager 501 is a software component for maintaining Data Storage Objects, and provides a set of protocol operations to control it. The operations include creation, destruction, duplication, and copying of data among the objects, maintaining access to objects, and in particular allow the specification of the storage pool used to create copies. There is no common subset of functions supported by all pools; however, in a preferred embodiment, primary pools may be performance-optimized, i.e. lower latency, whereas backup or replication pools may be capacity-optimized, supporting larger quantities of data and content-addressable. The pools may be remote or local. The storage pools are classified according to various criteria, including means by which a user may make a business decision, e.g. cost per gigabyte of storage.

First, the particular storage device from which the storage is drawn may be a consideration, as equipment is allocated for different business purposes, along with associated cost and other practical considerations. Some devices may not even be actual hardware but capacity provided as a service, and selection of such a resource can be done for practical business purposes.

Second, the network topological "proximity" is considered, as near storage is typically connected by low-latency, inexpensive network resources, while distant storage may be connected by high-latency, bandwidth limited expensive network resources; conversely, the distance of a storage pool relative to the source may be beneficial when geographic diversity protects against a physical disaster affecting local resources.

Third, storage optimization characteristics are considered, where some storage is optimized for space-efficient storage, but requires computation time and resources to analyze or transform the data before it can be stored, while other storage by comparison is "performance optimized," taking more storage resources by comparison but using comparatively little computation time or resource to transform the data, if at all.

Fourth, "speed of access" characteristics are considered, where some resources intrinsic to a storage computer platform are readily and quickly made available to the user's Application, e.g. as a virtual SCSI block device, while some can only be indirectly used. These ease and speed of recovery is often governed by the kind of storage used, and this allows it to be suitably classified.

Fifth, the amount of storage used and the amount available in a given pool are considered, as there may be benefit to either concentrating or spreading the storage capacity used.

The Service Level Policy Engine, described below, combines the SLA provided by the user with the classification criteria to determine how and when to maintain the application data, and from which storage pools to draw the needed resources to meet the Service Level Agreement (SLA).

The object manager 501 creates, maintains and employs a history mechanism to track the series of operations performed on a data object within the performance pools, and to correlate those operations with others that move the object to other storage pools, in particular capacity-optimized ones. This series of records for each data object is maintained at the object manager for all data objects in the primary pool, initially correlated by primary data object, then correlated by operation order: a time line for each object and a list of all such time lines. Each operation performed exploits underlying virtualization primitives to capture the state of the data object at a given point in time.

Additionally, the underlying storage virtualization appliance may be modified to expose and allow retrieval of internal data structures, such as bitmaps, that indicate the modification of portions of the data within the data object. These data structures are exploited to capture the state of a data object at a point in time: e.g., a snapshot of the data object, and to provide differences between snapshots taken at a specific time, and thereby enables optimal backup and restore. While the particular implementations and data structures may vary among different appliances from different vendors, a data structure is employed to track changes to the data object, and storage is employed to retain the original state of those portions of the object that have changed: indications in the data structure correspond to data retained in the storage. When accessing the snapshot, the data structure is consulted and for portions that have been changed, the preserved data is accessed rather than the current data, as the data object has been modified at the areas so indicated. A typical data structure employed is a bitmap, where each bit corresponds to a section of the data object. Setting the bit indicates that section has been modified after the point in time of the snapshot operation. The underlying snapshot primitive mechanism maintains this for as long as the snapshot object exists.

The time line described above maintains a list of the snapshot operations against a given primary data object, including the time an operation is started, the time it is stopped (if at all), a reference to the snapshot object, and a reference to the internal data structure (e.g. bitmaps or extent lists), so that it can be obtained from the underlying system. Also maintained is a reference to the result of copying the state of the data object at any given point in time into another pool—as an example, copying the state of a data object into a capacity-optimized pool using content addressing results in an object handle. That object handle corresponds to a given snapshot and is stored with the snapshot operation in the time line. This correlation is used to identify suitable starting points.

Optimal backup and restore consult the list of operations from a desired starting point to an end point. A time ordered list of operations and their corresponding data structures (bitmaps) are constructed such that a continuous time series from start to finish is realized: there is no gap between start times of the operations in the series. This ensures that all changes to the data object are represented by the corresponding bitmap data structures. It is not necessary to retrieve all operations from start to finish; simultaneously existing data objects and underlying snapshots overlap in time; it is only necessary that there are no gaps in time where a change might have occurred that was not tracked. As bitmaps indicate that a certain block of storage has changed but not what the change is, the bitmaps may be added or composed together to realize a set of all changes that occurred in the time interval. Instead of using this data structure to access the state at a point in time, the system instead exploits the fact that the data structure represents data modified as time marches forward. Rather, the end state of the data object is accessed at the indicated areas, thus returning the set of changes to the given data object from the given start time to the end time.

The backup operation exploits this time line, the correlated references, and access to the internal data structures to realize our backup operation. Similarly, it uses the system in a complementary fashion to accomplish our restore operation. The specific steps are described below in the section for "Optimal Backup/Restore."

Virtual Storage Pool Types

FIG. 5 illustrates several representative storage pool types. Although one primary storage pool and two secondary storage pools are depicted in the figure, many more may be configured in some embodiments.

Primary Storage Pool 507—contains the storage resources used to create the data objects in which the user Application stores its data. This is in contrast to the other storage pools, which exist to primarily fulfill the operation of the Data Management Virtualization Engine.

Performance Optimized Pool 508—a virtual storage pool able to provide high performance backup (i.e. point in time duplication, described below) as well as rapid access to the backup image by the user Application Capacity Optimized Pool 509—a virtual storage pool that chiefly provides storage of a data object in a highly space-efficient manner by use of deduplication techniques described below. The virtual storage pool provides access to the copy of the data object, but does not do so with high performance as its chief aim, in contrast to the Performance Optimized pool above.

The initial deployments contain storage pools as described above, as a minimal operational set. The design fully expects multiple Pools of a variety of types, representing various combinations of the criteria illustrated above, and multiple Pool Managers as is convenient to represent all of the storage in future deployments. The tradeoffs illustrated above are typical of computer data storage systems.

From a practical point of view, these three pools represent a preferred embodiment, addressing most users requirements in a very simple way. Most users will find that if they have one pool of storage for urgent restore needs, which affords quick recovery, and one other pool that is low cost, so that a large number of images can be retained for a large period of time, almost all of the business requirements for data protection can be met with little compromise.

The format of data in each pool is dictated by the objectives and technology used within the pool. For example, the quick recovery pool is maintained in the form very similar to the original data to minimize the translation required and to improve the speed of recovery. The long-term storage pool, on the other hand, uses deduplication and compression to reduce the size of the data and thus reduce the cost of storage.

Object Management Operations 505

The Object Manager 501 creates and maintains instances of Data Storage Objects 503 from the Virtual Storage Pools 418 according to the instructions sent to it by the Service Level Policy Engine 406. The Object Manager provides data object operations in five major areas: point-in-time duplication or copying (commonly referred to as "snapshots"), standard copying, object maintenance, mapping and access maintenance, and collections.

Object Management operations also include a series of Resource Discovery operations for maintaining Virtual Storage Pools themselves and retrieving information about them. The Pool Manager 504 ultimately supplies the functionality for these.

Point-in-Time Copy ("Snapshot") Operations

Snapshot operations create a data object instance representing an initial object instance at a specific point in time. More specifically, a snapshot operation creates a complete virtual copy of the members of a collection using the resources of a specified Virtual Storage Pool. This is called a Data Storage Object. Multiple states of a Data Storage Object are maintained over time, such that the state of a Data Storage Object as it existed at a point in time is available. As described above, a virtual copy is a copy implemented using an underlying storage virtualization API that allows a copy to be created in a lightweight fashion, using copy-on-write or other in-band technologies instead of copying and storing all bits of duplicate data to disk. This may be implemented using software modules written to access the capabilities of an off-the-shelf underlying storage virtualization system such as provided by EMC, vmware or IBM in some embodiments. Where such underlying virtualizations are not available, the described system may provide its own virtualization layer for interfacing with unintelligent hardware.

Snapshot operations require the application to freeze the state of the data to a specific point so that the image data is coherent, and so that the snapshot may later be used to restore the state of the application at the time of the snapshot. Other preparatory steps may also be required. These are handled by the Application-Specific Module 302, which is described in a subsequent section. For live applications, therefore, the most lightweight operations are desired.

Snapshot operations are used as the data primitive for all higher-level operations in the system. In effect, they provide access to the state of the data at a particular point in time. As well, since snapshots are typically implemented using copy-on-write techniques that distinguish what has changed from what is resident on disk, these snapshots provide differences that can also be composed or added together to efficiently copy data throughout the system. The format of the snapshot may be the format of data that is copied by Data Mover 502, which is described below.

Standard Copy Operations

When a copy operation is not a snapshot, it may be considered a standard copy operation. A standard copy operation copies all or a subset of a source data object in one storage pool to a data object in another storage pool. The result is two distinct objects. One type of standard copy operation that may be used is an initial "baseline" copy. This is typically done when data is initially copied from one Virtual Storage Pool into another, such as from a performance-optimized pool to a capacity-optimized storage pool. Another type of standard copy operation may be used wherein only changed data or differences are copied to a target storage pool to update the target object. This would occur after an initial baseline copy has previously been performed.

A complete exhaustive version of an object need not be preserved in the system each time a copy is made, even though a baseline copy is needed when the Data Virtualization System is first initialized. This is because each virtual copy provides access to a complete copy. Any delta or difference can be expressed in relation to a virtual copy instead of in relation to a baseline. This has the positive side effect of virtually eliminating the common step of walking through a series of change lists.

Standard copy operations are initiated by a series of instructions or requests supplied by the Pool Manager and received by the Data Mover to cause the movement of data among the Data Storage Objects, and to maintain the Data Storage Objects themselves. The copy operations allow the creation of copies of the specified Data Storage Objects using the resources of a specified Virtual Storage Pool. The result is a copy of the source Data Object in a target Data Object in the storage pool.

The Snapshot and Copy operations are each structured with a preparation operation and an activation operation. The two steps of prepare and activate allow the long-running resource allocation operations, typical of the prepare phase, to be decoupled from the actuation. This is required by applications that can only be paused for a short while to fulfill the point-in-time characteristics of a snapshot operation, which in reality takes a finite but non-zero amount of time to accomplish. Similarly for copy and snapshot operations, this two-step preparation and activation structure allows the Policy Engine to proceed with an operation only if resources for all of the collection members can be allocated.

Object Maintenance

Object Maintenance operations are a series of operations for maintaining data objects, including creation, destruction, and duplication. The Object Manager and Data Mover use functionality provided by a Pool Request Broker (more below) to implement these operations. The data objects may be maintained at a global level, at each Storage Pool, or preferably both.

Collections

Collection operations are auxiliary functions. Collections are abstract software concepts, lists maintained in memory by the object manager. They allow the Policy Engine 206 to request a series of operations over all of the members in a collection, allowing a consistent application of a request to all members. The use of collections allows for simultaneous activation of the point-in-time snapshot so that multiple Data Storage Objects are all captured at precisely the same point in time, as this is typically required by the application for a logically correct restore. The use of collections allows for convenient request of a copy operation across all members of a collection, where an application would use multiple storage objects as a logical whole.

Resource Discovery Operations

The Object Manager discovers Virtual Storage Pools by issuing Object Management Operations 505 to the Pool Manager 504, and uses the information obtained about each of the pools to select one that meets the required criteria for a given request, or in the case where none match, a default pool is selected, and the Object Manager can then create a data storage object using resources from the selected Virtual Storage Pool.

Mapping and Access

The Object Manager also provides sets of Object Management operations to allow and maintain the availability of these objects to external Applications. The first set is operations for registering and unregistering the computers where the user's Applications reside. The computers are registered by the identities typical to the storage network in use (e.g. Fibre Channel WWPN, iSCSI identity, etc.). The second set is "mapping" operations, and when permitted by the storage pool from which an object is created, the Data Storage Object can be "mapped," that is, made available for use to a computer on which a user Application resides.

This availability takes a form appropriate to the storage, e.g. a block device presented on a SAN as a Fibre Channel disk or iSCSI device on a network, a filesystem on a file sharing network, etc. and is usable by the operating system on the Application computer. Similarly, an "unmapping" operation reverses the availability of the virtual storage device on the network to a user Application. In this way, data stored for one Application, i.e. a backup, can be made available to another Application on another computer at a later time, i.e. a restore.

502 Data Mover

The Data Mover 502 is a software component within the Object Manager and Data Mover that reads and writes data among the various Data Storage Objects 503 according to instructions received from the Object Manager for Snapshot (Point in Time) Copy requests and standard copy requests. The Data Mover provides operations for reading and writing data among instances of data objects throughout the system. The Data Mover also provides operations that allow querying and maintaining the state of long running operations that the Object Manager has requested for it to perform.

The Data Mover uses functionality from the Pool Functionality Providers (see FIG. 6) to accomplish its operation. The Snapshot functionality provider 608 allows creation of a data object instance representing an initial object instance at a specific point in time. The Difference Engine functionality provider 614 is used to request a description of the differences between two data objects that are related in a temporal chain. For data objects stored on content-addressable pools, a special functionality is provided that can provide differences between any two arbitrary data objects. This functionality is also provided for performance-optimized pools, in some cases by an underlying storage virtualization system, and in other cases by a module that implements this on top of commodity storage. The Data Mover 502 uses the information about the differences to select the set of data that it copies between instances of data objects 503.

For a given Pool, the Difference Engine Provider provides a specific representation of the differences between two states of a Data Storage Object over time. For a Snapshot provider the changes between two points in time are recorded as writes to a given part of the Data Storage Object. In one embodiment, the difference is represented as a bitmap where each bit corresponds to an ordered list of the Data Object areas, starting at the first and ascending in order to the last, where a set bit indicates a modified area. This bitmap is derived from the copy-on-write bitmaps used by the underlying storage virtualization system. In another embodiment, the difference may be represented as a list of extents corresponding to changed areas of data. For a Content Addressable storage provider 610, the representation is described below, and is used to determine efficiently the parts of two Content Addressable Data Objects that differ.

The Data Mover uses this information to copy only those sections that differ, so that a new version of a Data Object can be created from an existing version by first duplicating it, obtaining the list of differences, and then moving only the data corresponding to those differences in the list. The Data Mover 502 traverses the list of differences, moving the indicated areas from the source Data Object to the target Data Object. (See Optimal Way for Data Backup and Restore.)

506 Copy Operation—Request Translation and Instructions

The Object Manager 501 instructs the Data Mover 502 through a series of operations to copy data among the data objects in the Virtual Storage Pools 418. The procedure includes the following steps, starting at the reception of instructions:

First, create Collection request. A name for the collection is returned.

Second, add Object to Collection. The collection name from above is used as well as the name of the source Data Object that is to be copied and the name of two antecedents: a Data Object against which differences are to be taken in the source Storage Resource Pool, and a corresponding Data Object in the target Storage Resource Pool. This step is repeated for each source Data Object to be operated on in this set.

Third, prepare Copy Request. The collection name is supplied as well as a Storage Resource Pool to act as a target. The prepare command instructs the Object Manager to contact the Storage Pool Manager to create the necessary target Data Objects, corresponding to each of the sources in the collection. The prepare command also supplies the corresponding Data Object in the target Storage Resource Pool to be duplicated, so the Provider can duplicate the provided object and use that as a target object. A reference name for the copy request is returned.

Fourth, activate Copy Request. The reference name for the copy request returned above is supplied. The Data Mover is instructed to copy a given source object to its corresponding target object. Each request includes a reference name as well as a sequence number to describe the overall job (the entire set of source target pairs) as well as a sequence number to describe each individual source-target pair. In addition to the source-target pair, the names of the corresponding antecedents are supplied as part of the Copy instruction.

Fifth, the Copy Engine uses the name of the Data Object in the source pool to obtain the differences between the antecedent and the source from the Difference Engine at the source. The indicated differences are then transmitted from the source to the target. In one embodiment, these differences are transmitted as bitmaps and data. In another embodiment, these differences are transmitted as extent lists and data.

503 Data Storage Objects

Data Storage Objects are software constructs that permit the storage and retrieval of Application data using idioms and methods familiar to computer data processing equipment and software. In practice these currently take the form of a SCSI block device on a storage network, e.g. a SCSI LUN, or a content-addressable container, where a designator for the content is constructed from and uniquely identifies the data therein. Data Storage Objects are created and maintained by issuing instructions to the Pool Manager. The actual storage for persisting the Application data is drawn from the Virtual Storage Pool from which the Data Storage Object is created.

The structure of the data storage object varies depending on the storage pool from which it is created. For the objects that take the form of a block device on a storage network, the data structure for a given block device Data Object implements a mapping between the Logical Block Address (LBA) of each of the blocks within the Data Object to the device identifier and LBA of the actual storage location. The identifier of the Data Object is used to identify the set of mappings to be used. The current embodiment relies on the services provided by the underlying physical computer platform to implement this mapping, and relies on its internal data structures, such as bitmaps or extent lists.

For objects that take the form of a Content Addressable Container, the content signature is used as the identifier, and the Data Object is stored as is described below in the section about deduplication.

504 Pool Manager

A Pool Manager 504 is a software component for managing virtual storage resources and the associated functionality and characteristics as described below. The Object manager 501 and Data Movement Engine 502 communicate with one or more Pool Managers 504 to maintain Data Storage Objects 503.

510 Virtual Storage Resources

Virtual Storage Resources 510 are various kinds of storage made available to the Pool Manager for implementing storage pool functions, as described below. In this embodiment, a storage virtualizer is used to present various external Fibre Channel or iSCSI storage LUNs as virtualized storage to the Pool Manager 504.

The Storage Pool Manager

Figure 6:
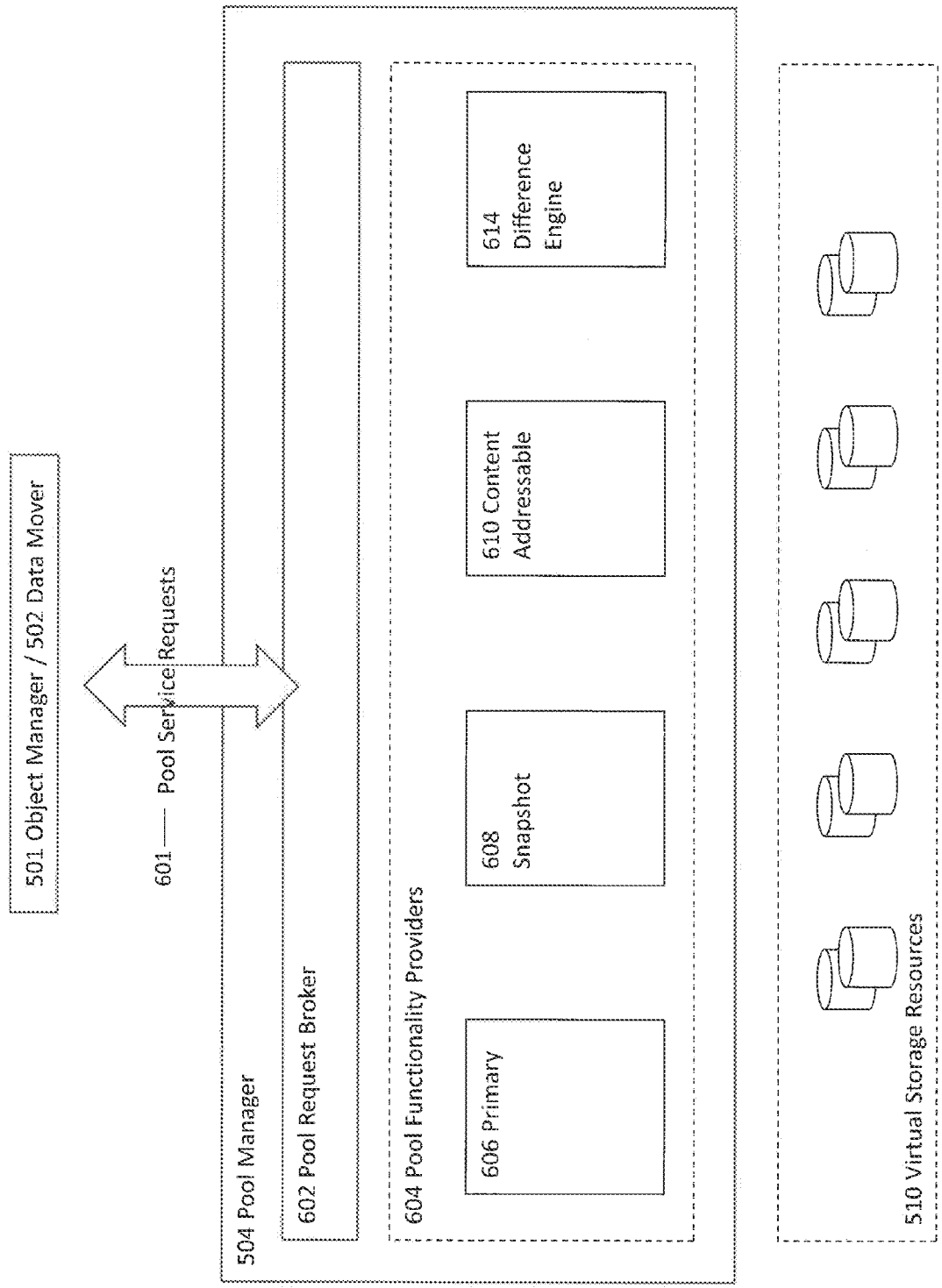
FIG. 6 shows the Storage Pool Manager.

FIG. 6 further illustrates the Storage Pool Manager 504. The purpose of the storage pool manager is to present underlying virtual storage resources to the Object Manager/Data Mover as Storage Resource Pools, which are abstractions of storage and data management functionality with common interfaces that are utilized by other components of the system. These common interfaces typically include a mechanism for identifying and addressing data objects associated with a specific temporal state, and a mechanism for producing differences between data objects in the form of bitmaps or extents. In this embodiment, the pool manager presents a Primary Storage Pool, a Performance Optimized Pool, and a Capacity Optimized Pool. The common interfaces allow the object manager to create and delete Data Storage objects in these pools, either as copies of other data storage objects or as new objects, and the data mover can move data between data storage objects, and can use the results of data object differencing operations.

The storage pool manager has a typical architecture for implementing a common interface to diverse implementations of similar functionality, where some functionality is provided by "smart" underlying resources, and other functionality must be implemented on top of less functional underlying resources.

Pool request broker 602 and pool functionality providers 604 are software modules executing in either the same process as the Object Manager/Data Mover, or in another process communicating via a local or network protocol such as TCP. In this embodiment the providers include a Primary Storage provider 606, Snapshot provider 608, Content Addressable provider 610, and Difference Engine provider 614, and these are further described below. In another embodiment the set of providers may be a superset of those shown here.

Virtual Storage Resources 510 are the different kinds of storage made available to the Pool Manager for implementing storage pool functions. In this embodiment, the virtual storage resources include sets of SCSI logical units from a storage virtualization system that runs on the same hardware as the pool manager, and accessible (for both data and management operations) through a programmatic interface: in addition to standard block storage functionality additional capabilities are available including creating and deleting snapshots, and tracking changed portions of volumes. In another embodiment the virtual resources can be from an external storage system that exposes similar capabilities, or may differ in interface (for example accessed through a file-system, or through a network interface such as CIFS, iSCSI or CDMI), in capability (for example, whether the resource supports an operation to make a copy-on-write snapshot), or in non-functional aspects (for example, high-speed/limited-capacity such as Solid State Disk versus low-speed/high-capacity such as SATA disk). The capabilities and interface available determine which providers can consume the virtual storage resources, and which pool functionality needs to be implemented within the pool manager by one or more providers: for example, this implementation of a content addressable storage provider only requires "dumb" storage, and the implementation is entirely within content addressable provider 610; an underlying content addressable virtual storage resource could be used instead with a simpler "pass-through" provider. Conversely, this implementation of a snapshot provider is mostly "pass-through" and requires storage that exposes a quick point-in-time copy operation.

Pool Request Broker 602 is a simple software component that services requests for storage pool specific functions by executing an appropriate set of pool functionality providers against the configured virtual storage resource 510. The requests that can be serviced include, but are not limited to, creating an object in a pool; deleting an object from a pool; writing data to an object; reading data from an object; copying an object within a pool; copying an object between pools; requesting a summary of the differences between two objects in a pool.

Primary storage provider 606 enables management interfaces (for example, creating and deleting snapshots, and tracking changed portions of files) to a virtual storage resource that is also exposed directly to applications via an interface such as fibre channel, iSCSI, NFS or CIFS.

Snapshot provider 608 implements the function of making a point-in-time copy of data from a Primary resource pool. This creates the abstraction of another resource pool populated with snapshots. As implemented, the point-in-time copy is a copy-on-write snapshot of the object from the primary resource pool, consuming a second virtual storage resource to accommodate the copy-on-write copies, since this management functionality is exposed by the virtual storage resources used for primary storage and for the snapshot provider.

Difference engine provider 614 can satisfy a request for two objects in a pool to be compared that are connected in a temporal chain. The difference sections between the two objects are identified and summarized in a provider-specific way, e.g. using bitmaps or extents. For example, the difference sections might be represented as a bitmap where each set bit denotes a fixed size region where the two objects differ; or the differences might be represented procedurally as a series of function calls or callbacks.

Depending on the virtual storage resource on which the pool is based, or on other providers implementing the pool, a difference engine may produce a result efficiently in various ways. As implemented, a difference engine acting on a pool implemented via a snapshot provider uses the copy-on-write nature of the snapshot provider to track changes to objects that have had snapshots made. Consecutive snapshots of a single changing primary object thus have a record of the differences that is stored alongside them by the snapshot provider, and the difference engine for snapshot pools simply retrieves this record of change. Also as implemented, a difference engine acting on a pool implemented via a Content Addressable provider uses the efficient tree structure (see below, FIG. 12) of the content addressable implementation to do rapid comparisons between objects on demand.

Figure 11:
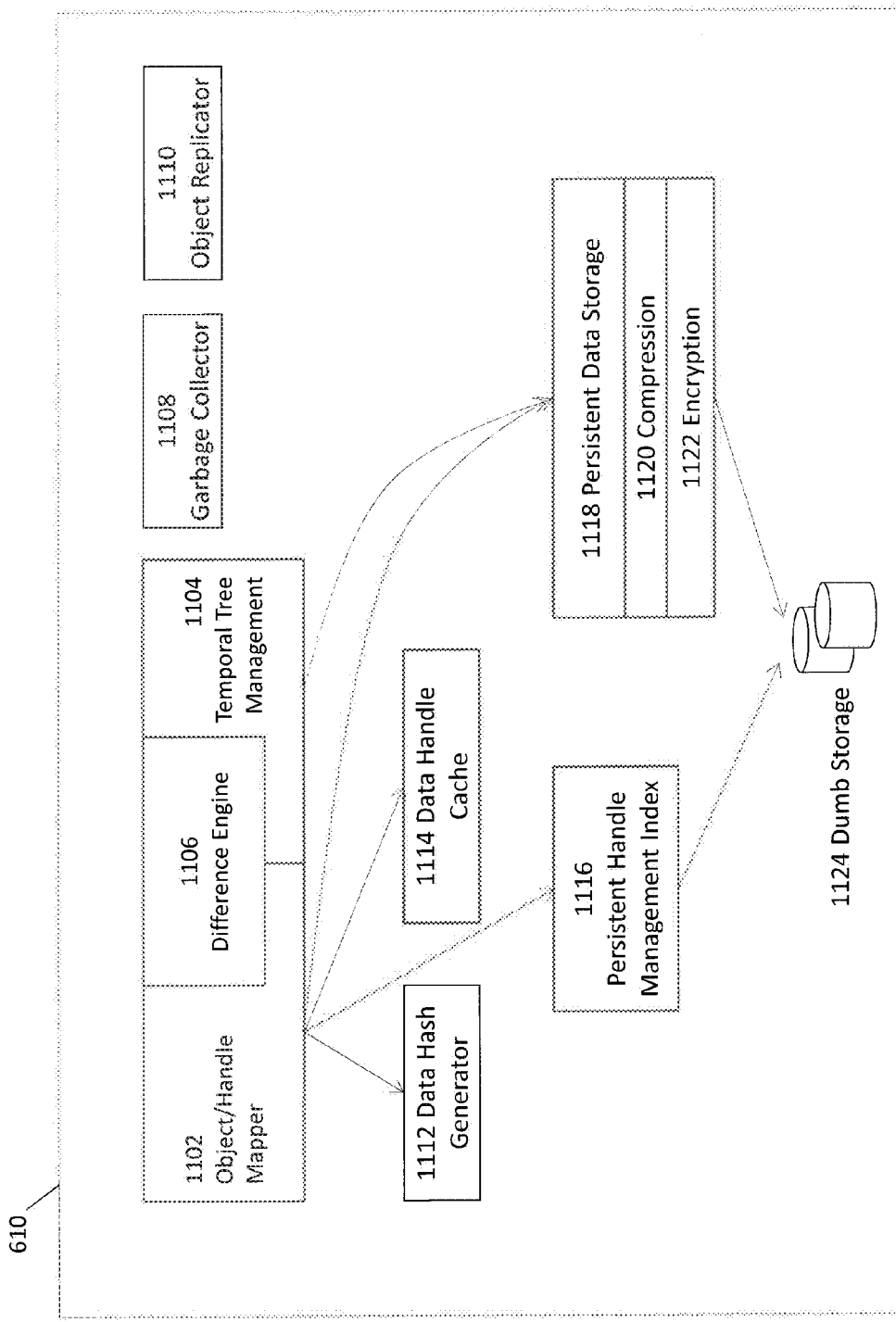
FIG. 11 is a block diagram of the Content Addressable Storage (CAS) provider.

Content addressable provider 610 implements a write-once content addressable interface to the virtual storage resource it consumes. It satisfies read, write, duplicate and delete operations. Each written or copied object is identified by a unique handle that is derived from its content. The content addressable provider is described further below (FIG. 11).

Pool Manager Operations

In operation, the pool request broker 502 accepts requests for data manipulation operations such as copy, snapshot, or delete on a pool or object. The request broker determines which provider code from pool 504 to execute by looking at the name or reference to the pool or object. The broker then translates the incoming service request into a form that can be handled by the specific pool functionality provider, and invokes the appropriate sequence of provider operations.

For example, an incoming request could ask to make a snapshot from a volume in a primary storage pool, into a snapshot pool. The incoming request identifies the object (volume) in the primary storage pool by name, and the combination of name and operation (snapshot) determines that the snapshot provider should be invoked which can make point-in-time snapshots from the primary pool using the underlying snapshot capability. This snapshot provider will translate the request into the exact form required by the native copy-on-write function performed by the underlying storage virtualization appliance, such as bitmaps or extents, and it will translate the result of the native copy-on-write function to a storage volume handle that can be returned to the object manager and used in future requests to the pool manager.

Optimal Way for Data Backup Using the Object Manager and Data Mover

Optimal Way for Data Backup is a series of operations to make successive versions of Application Data objects over time, while minimizing the amount of data that must be copied by using bitmaps, extents and other temporal difference information stored at the Object Mover. It stores the application data in a data storage object and associates with it the metadata that relates the various changes to the application data over time, such that changes over time can be readily identified.

In a preferred embodiment, the procedure includes the following steps:
1. The mechanism provides an initial reference state, e.g. T0, of the Application Data within a Data Storage Object.
2. Subsequent instances (versions) are created on demand over time of the Data Storage Object in a Virtual Storage Pool that has a Difference Engine Provider.
3. Each successive version, e.g. T4, T5, uses the Difference Engine Provider for the Virtual Storage Pool to obtain the difference between it and the instance created prior to it, so that T5 is stored as a reference to T4 and a set of differences between T5 and T4.
4. The Copy Engine receives a request to copy data from one data object (the source) to another data object (the destination).
5. If the Virtual Storage Pool in which the destination object will be created contains no other objects created from prior versions of the source data object, then a new object is created in the destination Virtual Storage Pool and the entire contents of the source data object are copied to the destination object; the procedure is complete. Otherwise the next steps are followed.
6. If the Virtual Storage Pool in which the destination object is created contains objects created from prior versions of the source data object, a recently created prior version in the destination Virtual Storage Pool is selected for which there exists a corresponding prior version in the Virtual Storage Pool of the source data object. For example, if a copy of T5 is initiated from a snapshot pool, and an object created at time T3 is the most recent version available at the target, T3 is selected as the prior version.
7. Construct a time-ordered list of the versions of the source data object, beginning with an initial version identified in the previous step, and ending with the source data object that is about to be copied. In the above example, at the snapshot pool, all states of the object are available, but only the states including and following T3 are of interest: T3, T4, T5.
8. Construct a corresponding list of the differences between each successive version in the list such that all of the differences, from the beginning version of the list to the end are represented. Difference both, identify which portion of data has changed and includes the new data for the corresponding time. This creates a set of differences from the target version to the source version, e.g. the difference between T3 and T5.
9. Create the destination object by duplicating the prior version of the object identified in Step 6 in the destination Virtual Storage Pool, e.g. object T3 in the target store.
10. Copy the set of differences identified in the list created in Step 8 from the source data object to the destination object; the procedure is complete.

Each data object within the destination Virtual Storage Pool is complete; that is, it represents the entire data object and allows access to the all of the Application Data at the point in time without requiring external reference to state or representations at other points in time. The object is accessible without replaying all deltas from a baseline state to the present state. Furthermore, the duplication of initial and subsequent versions of the data object in the destination Virtual Storage Pool does not require exhaustive duplication of the Application Data contents therein. Finally, to arrive at second and subsequent states requires only the transmission of the changes tracked and maintained, as described above, without exhaustive traversal, transmission or replication of the contents of the data storage object.

Optimal Way for Data Restore Using the Object Manager and Data Mover

Intuitively, the operation of the Optimal Way for Data Restore is the converse of the Optimal Way for Data Backup. The procedure to recreate the desired state of a data object in a destination Virtual Storage Pool at a given point in time includes the following steps:
1. Identify a version of the data object in another Virtual Storage Pool that has a Difference Engine Provider, corresponding to the desired state to be recreated. This is the source data object in the source Virtual Storage Pool.
2. Identify a preceding version of the data object to be recreated in the destination Virtual Storage Pool.
3. If no version of the data object is identified in Step 2, then create a new destination object in the destination Virtual Storage Pool and copy the data from the source data object to the destination data object. The procedure is complete. Otherwise, proceed with the following steps.
4. If a version of the data object is identified in Step 2, then identify a data object in the source Virtual Storage Pool corresponding to the data object identified in Step 2.
5. If no data object is identified in Step 4, then create a new destination object in the destination Virtual Storage Pool and copy the data from the source data object to the destination data object. The procedure is complete. Otherwise, proceed with the following steps.
6. Create a new destination data object in the Destination Virtual Storage Pool by duplicating the data object identified in Step 2.
7. Employ the Difference Engine Provider for the source Virtual Storage Pool to obtain the set of differences between the data object identified in Step 1 and the data object identified in Step 4.
8. Copy the data identified by the list created in Step 7 from the source data object to the destination data object. The procedure is complete.

Access to the desired state is complete: it does not require external reference to other containers or other states. Establishing the desired state given a reference state requires neither exhaustive traversal nor exhaustive transmission, only the retrieved changes indicated by the provided representations within the source Virtual Storage Pool.

The Service Level Agreement

Figure 7:
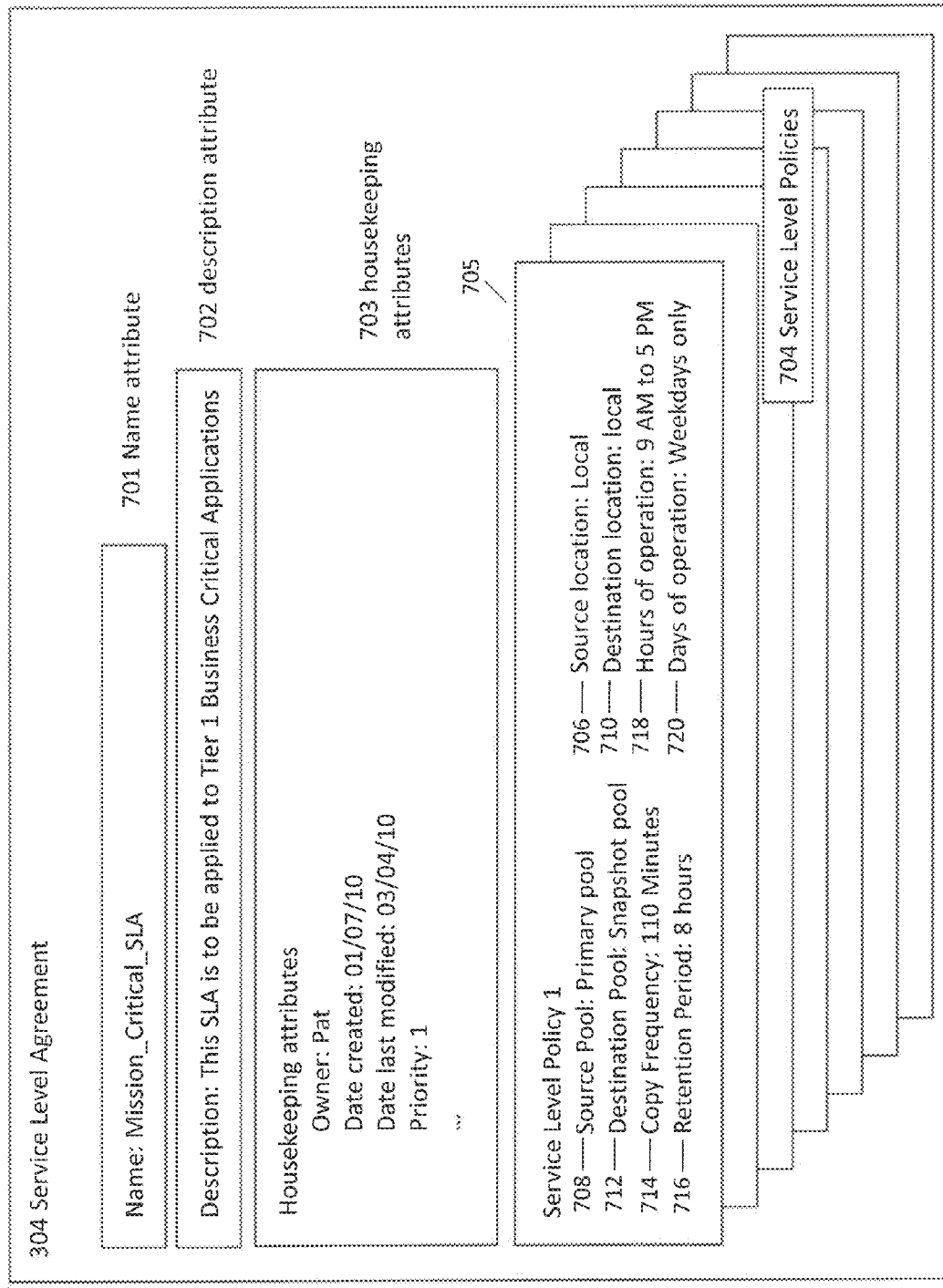
FIG. 7 shows the decomposition of the Service Level Agreement.

FIG. 7 illustrates the Service Level Agreement. The Service Level Agreement captures the detailed business requirements with respect to secondary copies of the application data. In the simplest description, the business requirements define when and how often copies are created, how long they are retained and in what type of storage pools these copies reside. This simplistic description does not capture several aspects of the business requirements. The frequency of copy creation for a given type of pool may not be uniform across all hours of the day or across all days of a week. Certain hours of the day, or certain days of a week or month may represent more (or less) critical periods in the application data, and thus may call for more (or less) frequent copies. Similarly, all copies of application data in a particular pool may not be required to be retained for the same length of time. For example, a copy of the application data created at the end of monthly processing may need to be retained for a longer period of time than a copy in the same storage pool created in the middle of a month.

The Service Level Agreement 304 of certain embodiments has been designed to represent all of these complexities that exist in the business requirements. The Service Level Agreement has four primary parts: the name, the description, the housekeeping attributes and a collection of Service Level Policies. As mentioned above, there is one SLA per application.

The name attribute 701 allows each Service Level Agreement to have a unique name.

The description attribute 702 is where the user can assign a helpful description for the Service Level Agreement.

The Service Level agreement also has a number of housekeeping attributes 703 that enable it to be maintained and revised. These attributes include but are not limited to the owner's identity, the dates and times of creation, modification and access, priority, enable/disable flags.

The Service Level Agreement also contains a plurality of Service Level Policies 705. Some Service level Agreements may have just a single Service Level Policy. More typically, a single SLA may contain tens of policies.

Each Service Level Policy includes at least the following, in certain embodiments: the source storage pool location 706 and type 708; the target storage pool location 710 and type 712; the frequency for the creation of copies 714, expressed as a period of time; the length of retention of the copy 716, expressed as a period of time; the hours of operation 718 during the day for this particular Service Level Policy; and the days of the week, month or year 720 on which this Service Level Policy applies.

Each Service Level Policy specifies a source and target storage pool, and the frequency of copies of application data that are desired between those storage pools. Furthermore, the Service Level Policy specifies its hours of operation and days on which it is applicable. Each Service Level Policy is the representation of one single statement in the business requirements for the protection of application data. For example, if a particular application has a business requirement for an archive copy to be created each month after the monthly close and retained for three years, this might translate to a Service level Policy that requires a copy from the Local Backup Storage Pool into the Long-term Archive Storage Pool at midnight on the last day of the month, with a retention of three years.

All of the Service Level Policies with a particular combination of source and destination pool and location, say for example, source Primary Storage pool and destination local Snapshot pool, when taken together, specify the business requirements for creating copies into that particular destination pool. Business requirements may dictate for example that snapshot copies be created every hour during regular working hours, but only once every four hours outside of these times. Two Service Level Policies with the same source and target storage pools will effectively capture these requirements in a form that can be put into practice by the Service Policy Engine.

This form of a Service Level Agreement allows the representation of the schedule of daily, weekly and monthly business activities, and thus captures business requirements for protecting and managing application data much more accurately than traditional RPO and RPO based schemes. By allowing hour of operation and days, weeks, and months of the year, scheduling can occur on a "calendar basis."

Taken together, all of the Service Level Policies with one particular combination of source and destinations, for example, "source: local primary and destination: local performance optimized", captures the non-uniform data protection requirements for one type of storage. A single RPO number, on the other hand, forces a single uniform frequency of data protection across all times of day and all days. For example, a combination of Service Level Policies may require a large number of snapshots to be preserved for a short time, such as 10 minutes, and a lesser number of snapshots to be preserved for a longer time, such as 8 hours; this allows a small amount of information that has been accidentally deleted can be reverted to a state not more than 10 minutes before, while still providing substantial data protection at longer time horizons without requiring the storage overhead of storing all snapshots taken every ten minutes. As another example, the backup data protection function may be given one Policy that operates with one frequency during the work week, and another frequency during the weekend.

When Service Level Policies for all of the different classes of source and destination storage are included, the Service Level Agreement fully captures all of the data protection requirements for the entire application, including local snapshots, local long duration stores, off-site storage, archives, etc. A collection of policies within a SLA is capable of expressing when a given function should be performed, and is capable of expressing multiple data management functions that should be performed on a given source of data.

Service Level Agreements are created and modified by the user through a user interface on a management workstation. These agreements are electronic documents stored by the Service Policy Engine in a structured SQL database or other repository that it manages. The policies are retrieved, electronically analyzed, and acted upon by the Service Policy Engine through its normal scheduling algorithm as described below.

Figure 8:
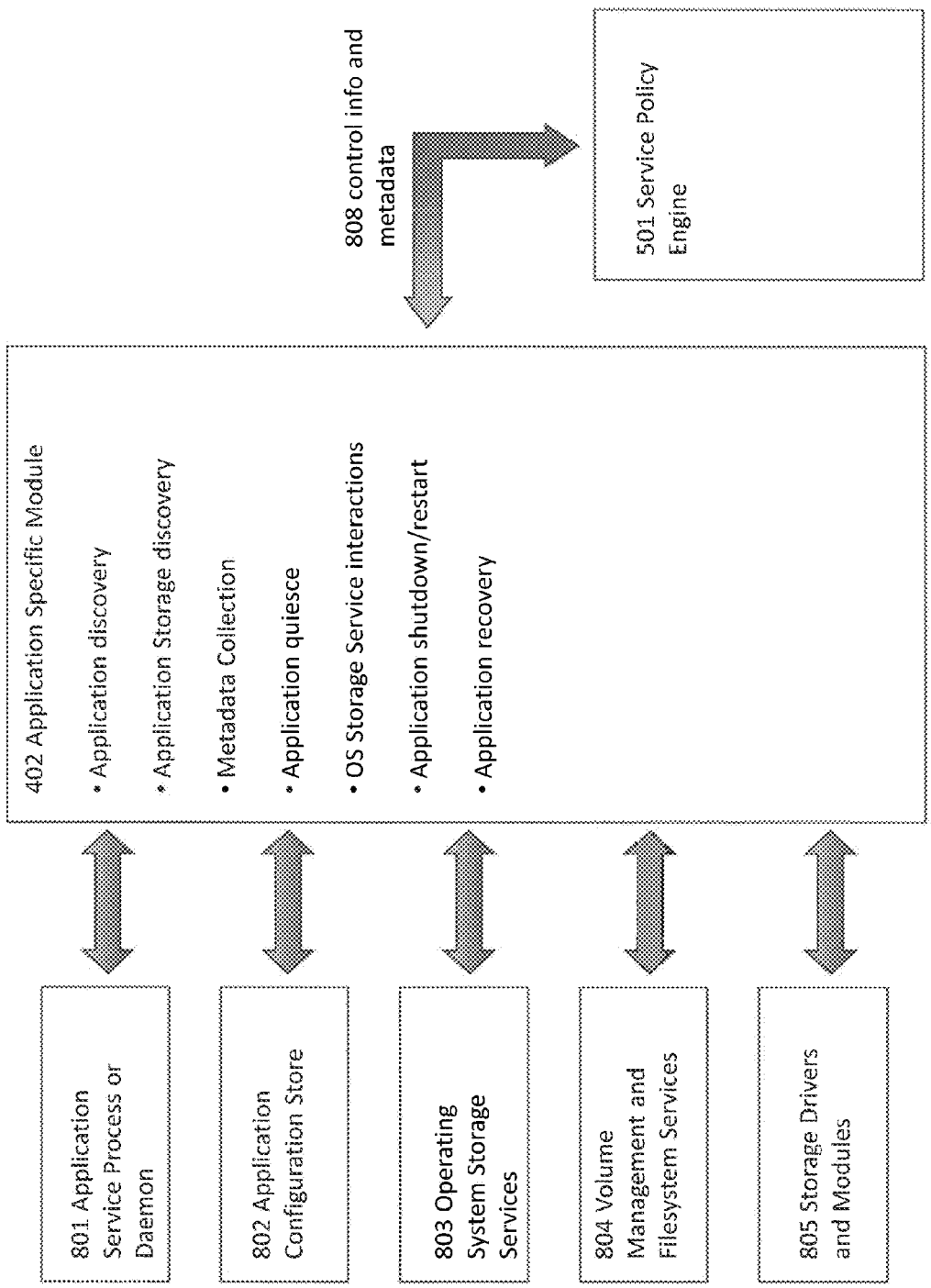
FIG. 8 illustrates the Application Specific Module.

FIG. 8 illustrates the Application Specific Module 402. The Application Specific module runs close to the Application 300 (as described above), and interacts with the Application and its operating environment to gather metadata and to query and control the Application as required for data management operations.

The Application Specific Module interacts with various components of the application and its operating environment including Application Service Processes and Daemons 801, Application Configuration Data 802, Operating System Storage Services 803 (such as VSS and VDS on Windows), Logical Volume Management and Filesystem Services 804, and Operating System Drivers and Modules 805.

The Application Specific Module performs these operations in response to control commands from the Service Policy Engine 406. There are two purposes for these interactions with the application: Metadata Collection and Application Consistency.

Metadata Collection is the process by which the Application Specific Module collects metadata about the application. In some embodiments, metadata includes information such as: configuration parameters for the application; state and status of the application; control files and startup/shutdown scripts for the application; location of the datafiles, journal and transaction logs for the application; and symbolic links, filesystem mount points, logical volume names, and other such entities that can affect the access to application data.

Metadata is collected and saved along with application data and SLA information. This guarantees that each copy of application data within the system is self contained and includes all of the details required to rebuild the application data.

Application Consistency is the set of actions that ensure that when a copy of the application data is created, the copy is valid, and can be restored into a valid instance of the application. This is critical when the business requirements dictate that the application be protected while it is live, in its online, operational state. The application may have interdependent data relations within its data stores, and if these are not copied in a consistent state will not provide a valid restorable image.

The exact process of achieving application consistency varies from application to application. Some applications have a simple flush command that forces cached data to disk. Some applications support a hot backup mode where the application ensures that its operations are journaled in a manner that guarantees consistency even as application data is changing. Some applications require interactions with operating system storage services such as VSS and VDS to ensure consistency. The Application Specific Module is purpose-built to work with a particular application and to ensure the consistency of that application. The Application Specific Module interacts with the underlying storage virtualization device and the Object Manager to provide consistent snapshots of application data.

For efficiency, the preferred embodiment of the Application Specific Module 402 is to run on the same server as Application 300. This assures the minimum latency in the interactions with the application, and provides access to storage services and filesystems on the application host. The application host is typically considered primary storage, which is then snapshotted to a performance-optimized store.

In order to minimize interruption of a running application, including minimizing preparatory steps, the Application Specific Module is only triggered to make a snapshot when access to application data is required at a specific time, and when a snapshot for that time does not exist elsewhere in the system, as tracked by the Object Manager. By tracking which times snapshots have been made, the Object Manager is able to fulfill subsequent data requests from the performance-optimized data store, including for satisfying multiple requests for backup and replication which may issue from secondary, capacity-optimized pools. The Object Manager may be able to provide object handles to the snapshot in the performance-optimized store, and may direct the performance-optimized store in a native format that is specific to the format of the snapshot, which is dependent on the underlying storage appliance. In some embodiments this format may be application data combined with one or more LUN bitmaps indicating which blocks have changed; in other embodiments it may be specific extents. The format used for data transfer is thus able to transfer only a delta or difference between two snapshots using bitmaps or extents.

Metadata, such as the version number of the application, may also be stored for each application along with the snapshot. When a SLA policy is executed, application metadata is read and used for the policy. This metadata is stored along with the data objects. For each SLA, application metadata will only be read once during the lightweight snapshot operation, and preparatory operations which occur at that time such as flushing caches will only be performed once during the lightweight snapshot operation, even though this copy of application data along with its metadata may be used for multiple data management functions.

The Service Policy Engine

Figure 9:
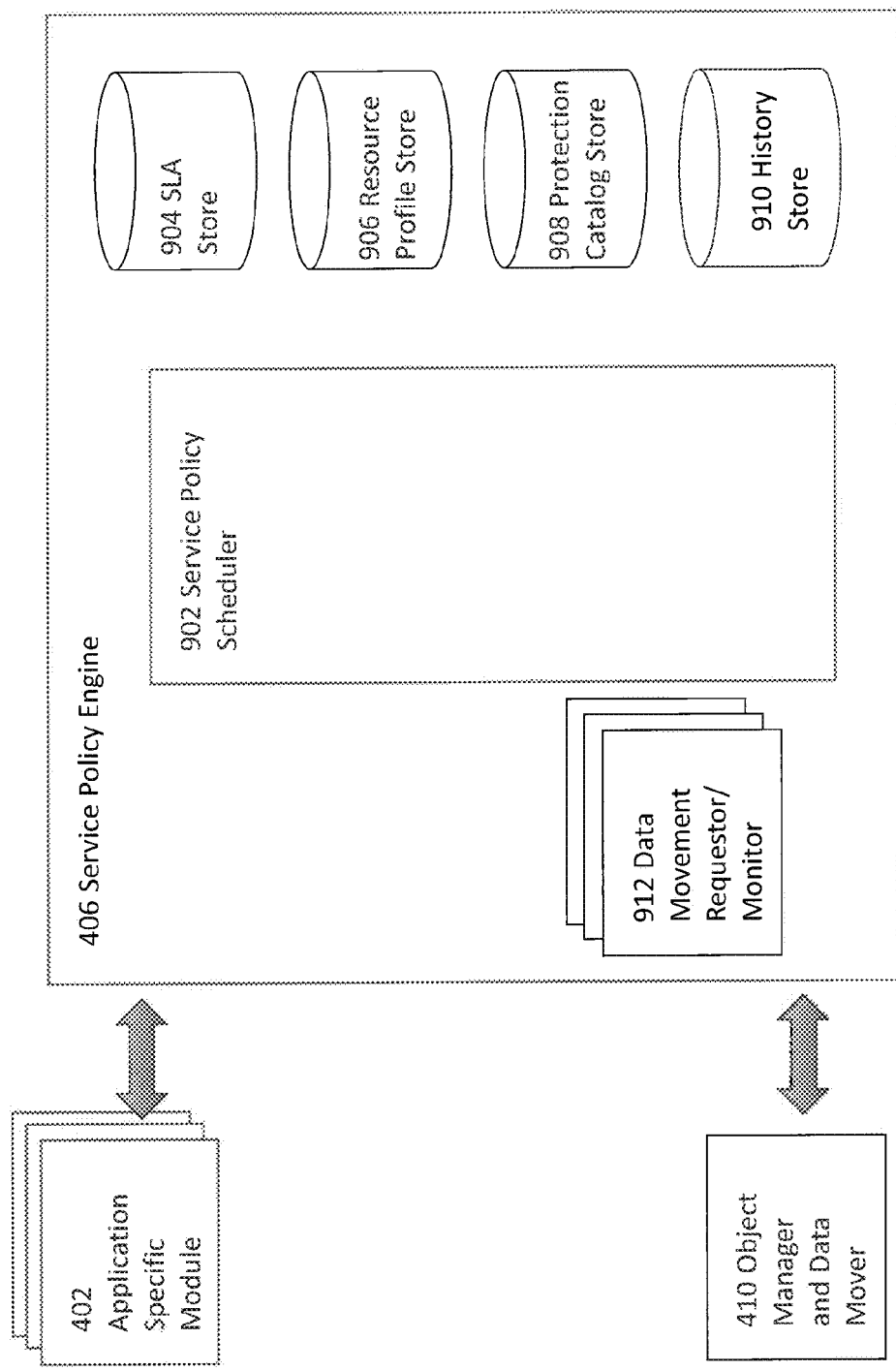
FIG. 9 shows the Service Policy Manager.

FIG. 9 illustrates the Service Policy Engine 406. The Service Policy Engine contains the Service Policy Scheduler 902, which examines all of the Service Level Agreements configured by the user and makes scheduling decisions to satisfy Service Level Agreements. It relies on several data stores to capture information and persist it over time, including, in some embodiments, a SLA Store 904, where configured Service Level Agreements are persisted and updated; a Resource Profile Store 906, storing Resource Profiles that provide a mapping between logical storage pool names and actual storage pools; Protection Catalog Store 908, where information is cataloged about previous successful copies created in various pools that have not yet expired; and centralized History Store 910.

History Store 910 is where historical information about past activities is saved for the use of all data management applications, including the timestamp, order and hierarchy of previous copies of each application into various storage pools. For example, a snapshot copy from a primary data store to a capacity-optimized data store that is initiated at 1 P.M. and is scheduled to expire at 9 P.M. will be recorded in History Store 910 in a temporal data store that also includes linked object data for snapshots for the same source and target that have taken place at 11 A.M. and 12 P.M.

These stores are managed by the Service Policy Engine. For example, when the user, through the Management workstation creates a Service Level Agreement, or modifies one of the policies within it, it is the Service Policy Engine that persists this new SLA in its store, and reacts to this modification by scheduling copies as dictated by the SLA. Similarly, when the Service Policy Engine successfully completes a data movement job that results in a new copy of an application in a Storage Pool, the Storage Policy Engine updates the History Store, so that this copy will be factored into future decisions.

The preferred embodiment of the various stores used by the Service Policy Engine is in the form of tables in a relational database management system in close proximity to the Service Policy Engine. This ensures consistent transactional semantics when querying and updating the stores, and allows for flexibility in retrieving interdependent data.

Figure 10:
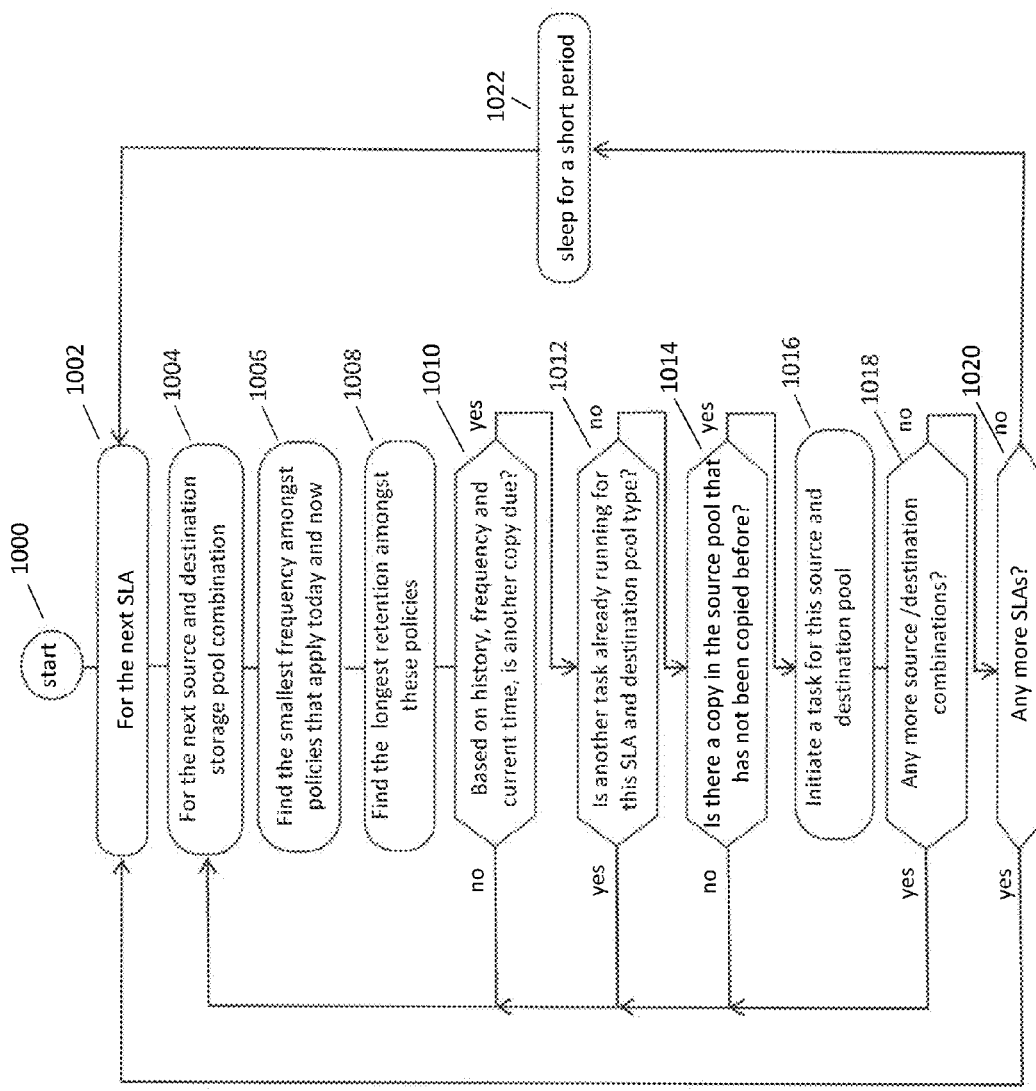
FIG. 10 is a flowchart of the Service Policy Scheduler.

The scheduling algorithm for the Service Policy Scheduler 902 is illustrated in FIG. 10. When the Service Policy Scheduler decides it needs to make a copy of application data from one storage pool to another, it initiates a Data Movement Requestor and Monitor task, 912. These tasks are not recurring tasks and terminate when they are completed. Depending on the way that Service Level Policies are specified, a plurality of these requestors might be operational at the same time.

The Service Policy Scheduler considers the priorities of Service Level Agreements when determining which additional tasks to undertake. For example, if one Service Level Agreement has a high priority because it specifies the protection for a mission-critical application, whereas another SLA has a lower priority because it specifies the protection for a test database, then the Service Policy Engine may choose to run only the protection for the mission-critical application, and may postpone or even entirely skip the protection for the lower priority application. This is accomplished by the Service Policy Engine scheduling a higher priority SLA ahead of a lower priority SLA. In the preferred embodiment, in such a situation, for auditing purposes, the Service Policy Engine will also trigger a notification event to the management workstation.

The Policy Scheduling Algorithm

FIG. 10 illustrates the flowchart of the Policy Schedule Engine. The Policy Schedule Engine continuously cycles through all the SLAs defined. When it gets to the end of all of the SLAs, it sleeps for a short while, e.g. 10 seconds, and resumes looking through the SLAs again. Each SLA encapsulates the complete data protection business requirements for one application; thus all of the SLAs represent all of the applications.

For each SLA, the schedule engine collects together all of the Service Level Policies that have the same source pool and destination pool 1004 the process state at 1000 and iterates to the next SLA in the set of SLAs in 1002. Taken together, this subset of the Service Level Policies represent all of the requirements for a copy from that source storage pool to that particular destination storage pool.

Among this subset of Service Level Policies, the Service Policy Scheduler discards the policies that are not applicable to today, or are outside their hours of operation. Among the policies that are left, find the policy that has the shortest frequency 1006, and based on the history data and in history store 910, the one with the longest retention that needs to be run next 1008.

Next, there are a series of checks 1010-1014 which rule out making a new copy of application data at this time— because the new copy is not yet due, because a copy is already in progress or because there is not new data to copy. If any of these conditions apply, the Service Policy Scheduler moves to the next combination of source and destination pools 1004. If none of these conditions apply, a new copy is initiated. The copy is executed as specified in the corresponding service level policy within this SLA 1016.

Next, the Scheduler moves to the next Source and Destination pool combination for the same Service Level agreement 1018. If there are no more distinct combinations, the Scheduler moves on to the next Service Level Agreement 1020.

After the Service Policy Scheduler has been through all source/destination pool combinations of all Service Level Agreements, it pauses for a short period and then resumes the cycle.

A simple example system with a snapshot store and a backup store, with only 2 policies defined, would interact with the Service Policy Scheduler as follows. Given two policies, one stating "backup every hour, the backup to be kept for 4 hours" and another stating "backup every 2 hours, the backup to be kept for 8 hours," the result would be a single snapshot taken each hour, the snapshots each being copied to the backup store but retained a different amount of time at both the snapshot store and the backup store. The "backup every 2 hours" policy is scheduled to go into effect at 12:00 P.M by the system administrator.

At 4:00 P.M., when the Service Policy Scheduler begins operating at step 1000, it finds the two policies at step 1002. (Both policies apply because a multiple of two hours has elapsed since 12:00 P.M.) There is only one source and destination pool combination at step 1004. There are two frequencies at step 1006, and the system selects the 1-hour frequency because it is shorter than the 2-hour frequency. There are two operations with different retentions at step 1008, and the system selects the operation with the 8-hour retention, as it has the longer retention value. Instead of one copy being made to satisfy the 4-hour requirement and another copy being made to satisfy the 8-hour requirement, the two requirements are coalesced into the longer 8-hour requirement, and are satisfied by a single snapshot copy operation. The system determines that a copy is due at step 1010, and checks the relevant objects at the History Store 910 to determine if the copy has already been made at the target (at step 1012) and at the source (at step 1014). If these checks are passed, the system initiates the copy at step 1016, and in the process triggers a snapshot to be made and saved at the snapshot store. The snapshot is then copied from the snapshot store to the backup store. The system then goes to sleep 1022 and wakes up again after a short period, such as 10 seconds. The result is a copy at the backup store and a copy at the snapshot store, where every even-hour snapshot lasts for 8 hours, and every odd-hour snapshot lasts 4 hours. The even-hour snapshots at the backup store and the snapshot store are both tagged with the retention period of 8 hours, and will be automatically deleted from the system by another process at that time.

Note that there is no reason to take two snapshots or make two backup copies at 2 o'clock, even though both policies apply, because both policies are satisfied by a single copy. Combining and coalescing these snapshots results in the reduction of unneeded operations, while retaining the flexibility of multiple separate policies. As well, it may be helpful to have two policies active at the same time for the same target with different retention. In the example given, there are more hourly copies kept than two-hour copies, resulting in more granularity for restore at times that are closer to the present. For example, in the previous system, if at 7:30 P.M. damage is discovered from earlier in the afternoon, a backup will be available for every hour for the past four hours: 4, 5, 6, 7 P.M. As well, two more backups will have been retained from 2 P.M. and 12 P.M.

The Content Addressable Store

FIG. 11 is a block diagram of the modules implementing the content addressable store for the Content Addressable Provider 610.

The content addressable store 610 implementation provides a storage resource pool that is optimized for capacity rather than for copy-in or copy-out speed, as would be the case for the performance-optimized pool implemented through snapshots, described earlier, and thus is typically used for offline backup, replication and remote backup. Content addressable storage provides a way of storing common subsets of different objects only once, where those common subsets may be of varying sizes but typically as small as 4 KiBytes. The storage overhead of a content addressable store is low compared to a snapshot store, though the access time is usually higher. Generally objects in a content addressable store have no intrinsic relationship to one another, even though they may share a large percentage of their content, though in this implementation a history relationship is also maintained, which is an enabler of various optimizations to be described. This contrasts with a snapshot store where snapshots intrinsically form a chain, each storing just deltas from a previous snapshot or baseline copy. In particular, the content addressable store will store only one copy of a data subset that is repeated multiple times within a single object, whereas a snapshot-based store will store at least one full-copy of any object.

The content addressable store 610 is a software module that executes on the same system as the pool manager, either in the same process or in a separate process communicating via a local transport such as TCP. In this embodiment, the content addressable store module runs in a separate process so as to minimize impact of software failures from different components.

This module's purpose is to allow storage of Data Storage Objects 503 in a highly space-efficient manner by deduplicating content (i.e., ensuring repeated content within single or multiple data objects is stored only once).

The content addressable store module provides services to the pool manager via a programmatic API. These services include the following:

Object to Handle mapping 1102: an object can be created by writing data into the store via an API; once the data is written completely the API returns an object handle determined by the content of the object. Conversely, data may be read as a stream of bytes from an offset within an object by providing the handle. Details of how the handle is constructed are explained in connection with the description of FIG. 12.

Temporal Tree Management 1104 tracks parent/child relationships between data objects stored. When a data object is written into the store 610, an API allows it to be linked as a child to a parent object already in the store. This indicates to the content addressable store that the child object is a modification of the parent. A single parent may have multiple children with different modifications, as might be the case for example if an application's data were saved into the store regularly for some while; then an early copy were restored and used as a new starting point for subsequent modifications. Temporal tree management operations and data models are described in more detail below.

Difference Engine 1106 can generate a summary of difference regions between two arbitrary objects in the store. The differencing operation is invoked via an API specifying the handles of two objects to be compared, and the form of the difference summary is a sequence of callbacks with the offset and size of sequential difference sections. The difference is calculated by comparing two hashed representations of the objects in parallel.

Garbage Collector 1108 is a service that analyzes the store to find saved data that is not referenced by any object handle, and to reclaim the storage space committed to this data. It is the nature of the content addressable store that much data is referenced by multiple object handles, i.e., the data is shared between data objects; some data will be referenced by a single object handle; but data that is referenced by no object handles (as might be the case if an object handle has been deleted from the content addressable system) can be safely overwritten by new data.

Object Replicator 1110 is a service to duplicate data objects between two different content addressable stores. Multiple content addressable stores may be used to satisfy additional business requirements, such as offline backup or remote backup.

These services are implemented using the functional modules shown in FIG. 11. The Data Hash module 1112 generates fixed length keys for data chunks up to a fixed size limit. For example, in this embodiment the maximum size of chunk that the hash generator will make a key for is 64 KiB. The fixed length key is either a hash, tagged to indicate the hashing scheme used, or a non-lossy algorithmic encoding. The hashing scheme used in this embodiment is SHA-1, which generates a secure cryptographic hash with a uniform distribution and a probability of hash collision near enough zero that no facility need be incorporated into this system to detect and deal with collisions.

The Data Handle Cache 1114 is a software module managing an in-memory database that provides ephemeral storage for data and for handle-to-data mappings.

The Persistent Handle Management Index 1104 is a reliable persistent database of CAH-to-data mappings. In this embodiment it is implemented as a B-tree, mapping hashes from the hash generator to pages in the persistent data store 1118 that contain the data for this hash. Since the full B-tree cannot be held in memory at one time, for efficiency, this embodiment also uses an in-memory bloom filter to avoid expensive B-tree searches for hashes known not to be present.

The Persistent Data Storage module 1118 stores data and handles to long-term persistent storage, returning a token indicating where the data is stored. The handle/token pair is subsequently used to retrieve the data. As data is written to persistent storage, it passes through a layer of lossless data compression 1120, in this embodiment implemented using zlib, and a layer of optional reversible encryption 1122, which is not enabled in this embodiment.

For example, copying a data object into the content addressable store is an operation provided by the object/handle mapper service, since an incoming object will be stored and a handle will be returned to the requestor. The object/handle mapper reads the incoming object, requests hashes to be generated by the Data Hash Generator, stores the data to Persistent Data Storage and the handle to the Persistent Handle Management Index. The Data Handle Cache is kept updated for future quick lookups of data for the handle. Data stored to Persistent Data Storage is compressed and (optionally) encrypted before being written to disk. Typically a request to copy in a data object will also invoke the temporal tree management service to make a history record for the object, and this is also persisted via Persistent Data Storage.

As another example, copying a data object out of the content addressable store given its handle is another operation provided by the object/handle mapper service. The handle is looked up in the Data Handle Cache to locate the corresponding data; if the data is missing in the cache the persistent index is used; once the data is located on disk, it is retrieved via persistent data storage module (which decrypts and decompresses the disk data) and then reconstituted to return to the requestor.

The Content Addressable Store Handle

Figure 12:
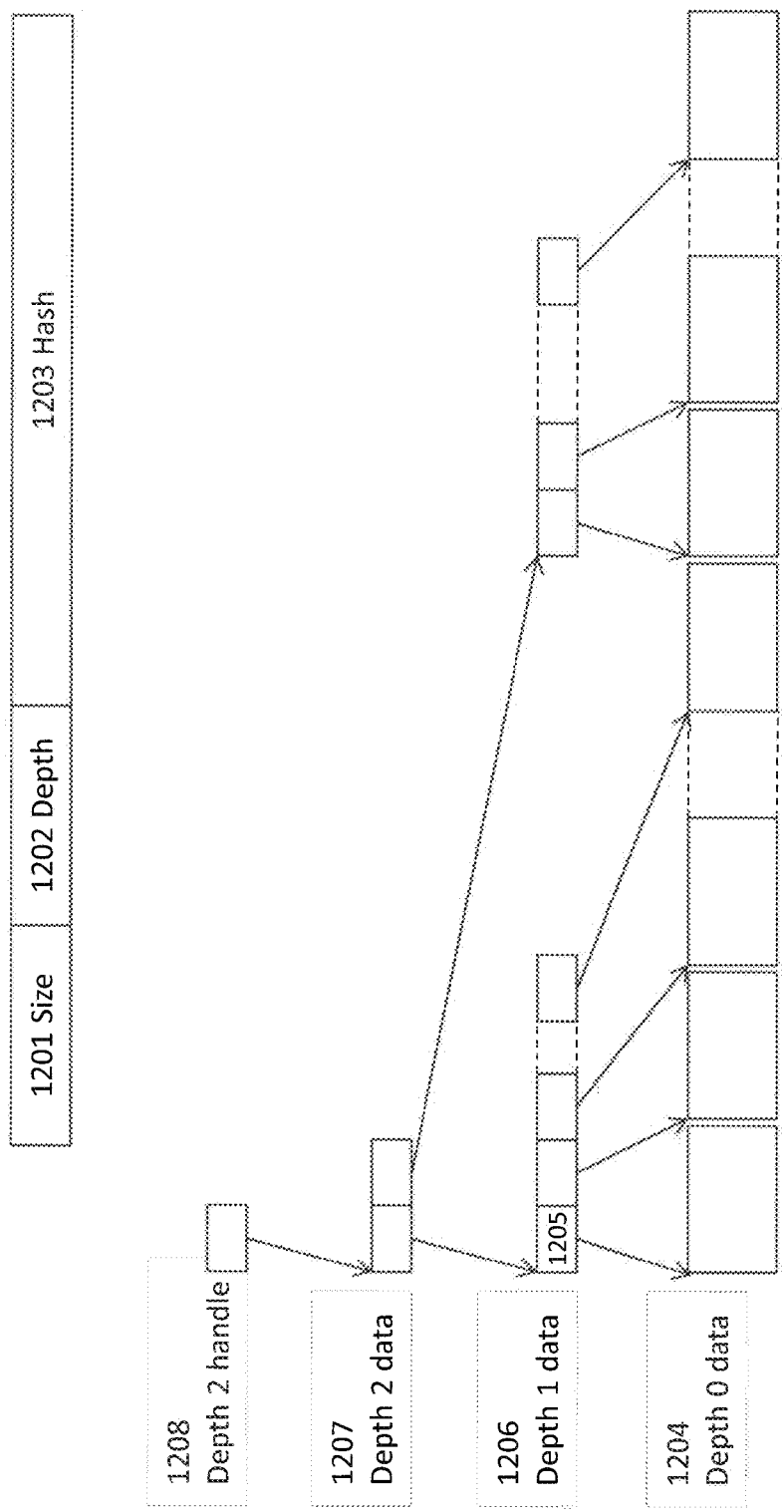
FIG. 12 shows the definition of an object handle within the CAS system.

FIG. 12 shows how the handle for a content addressed object is generated. The data object manager references all content addressable objects with a content addressable handle. This handle is made up of three parts. The first part 1201 is the size of the underlying data object the handle immediately points to. The second part 1202 is the depth of object it points to. The third 1203 is a hash of the object it points to. Field 1203 optionally includes a tag indicating that the hash is a non-lossy encoding of the underlying data. The tag indicates the encoding scheme used, such as a form of run-length encoding (RLE) of data used as an algorithmic encoding if the data chunk can be fully represented as a short enough RLE. If the underlying data object is too large to be represented as a non-lossy encoding, a mapping from the hash to a pointer or reference to the data is stored separately in the persistent handle management index 1104.

The data for a content addressable object is broken up into chunks 1204. The size of each chunk must be addressable by one content addressable handle 1205. The data is hashed by the data hash module 1102, and the hash of the chunk is used to make the handle. If the data of the object fits in one chunk, then the handle created is the final handle of the object. If not, then the handles themselves are grouped together into chunks 1206 and a hash is generated for each group of handles. This grouping of handles continues 1207 until there is only one handle 1208 produced which is then the handle for the object.

When an object is to be reconstituted from a content handle (the copy-out operation for the storage resource pool), the top level content handle is dereferenced to obtain a list of next-level content handles. These are dereferenced in turn to obtain further lists of content handles until depth-0 handles are obtained. These are expanded to data, either by looking up the handle in the handle management index or cache, or (in the case of an algorithmic hash such as run-length encoding) expanding deterministically to the full content.

Temporal Tree Management

Figure 13:
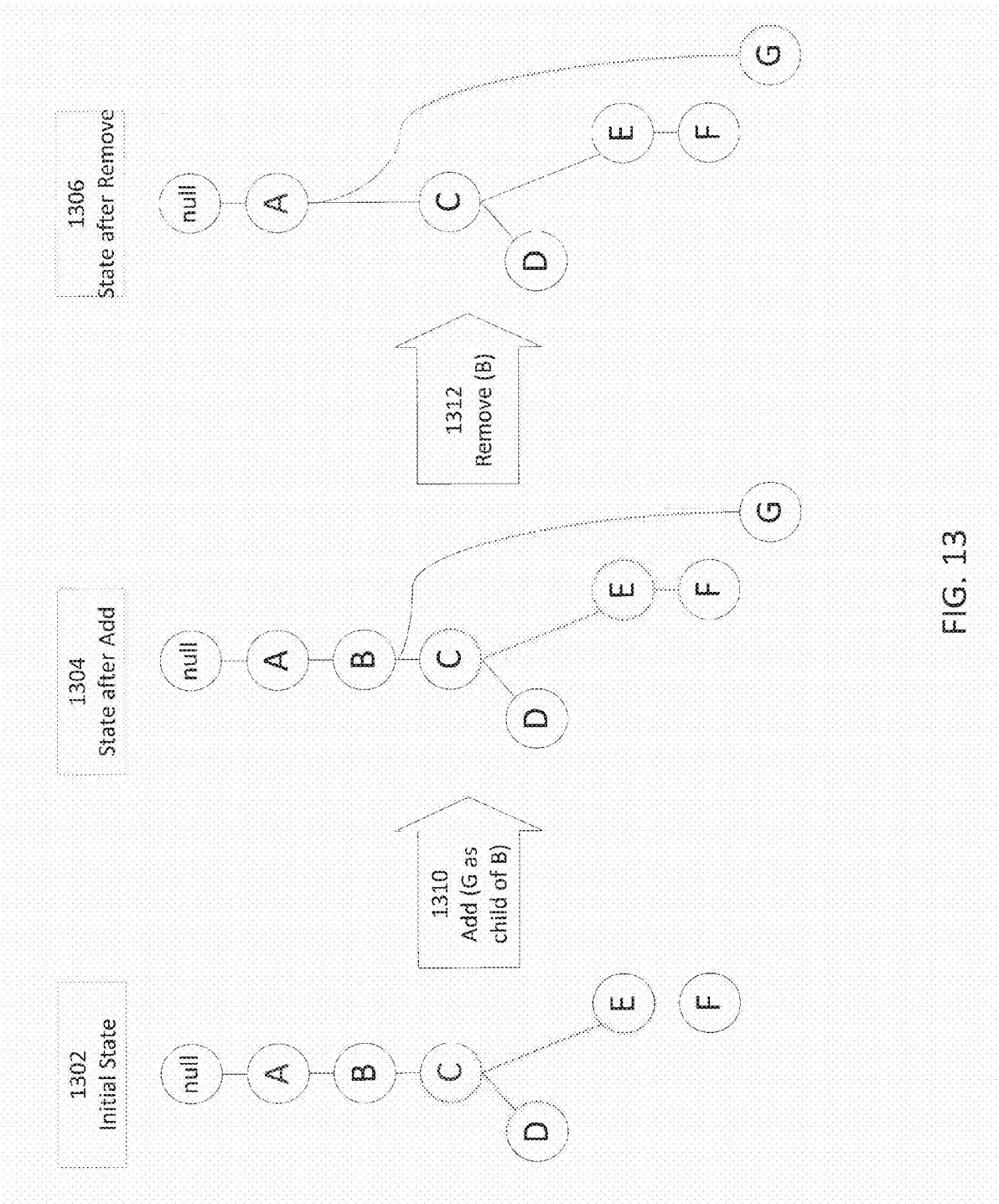
FIG. 13 shows the data model and operations for the temporal relationship graph stored for objects within the CAS.

FIG. 13 illustrates the temporal tree relationship created for data objects stored within the content addressable store. This particular data structure is utilized only within the content addressable store. The temporal tree management module maintains data structures 1302 in the persistent store that associate each content-addressed data object to a parent (which may be null, to indicate the first in a sequence of revisions). The individual nodes of the tree contain a single hash value. This hash value references a chunk of data, if the hash is a depth-0 hash, or a list of other hashes, if the hash is a depth-1 or higher hash. The references mapped to a hash value is contained in the Persistent Handle Management Index 1104. In some embodiments the edges of the tree may have weights or lengths, which may be used in an algorithm for finding neighbors.

This is a standard tree data structure and the module supports standard manipulation operations, in particular: 1310 Add: adding a leaf below a parent, which results in a change to the tree as between initial state 1302 and after-add state 1304; and 1312 Remove: removing a node (and reparenting its children to its parent), which results in a change to the tree as between after-add state 1304 and after-remove state 1306.

The "Add" operation may be used whenever an object is copied-in to the CAS from an external pool. If the copy-in is via the Optimal Way for Data Backup, or if the object is originating in a different CAS pool, then it is required that a predecessor object be specified, and the Add operation is invoked to record this predecessor/successor relationship.

The "Remove" operation is invoked by the object manager when the policy manager determines that an object's retention period has expired. This may lead to data stored in the CAS having no object in the temporal tree referring to it, and therefore a subsequent garbage collection pass can free up the storage space for that data as available for re-use.

Note that it is possible for a single predecessor to have multiple successors or child nodes. For example, this may occur if an object is originally created at time T1 and modified at time T2, the modifications are rolled back via a restore operation, and subsequent modifications are made at time T3. In this example, state T1 has two children, state T2 and state T3.

Different CAS pools may be used to accomplish different business objectives such as providing disaster recovery in a remote location. When copying from one CAS to another CAS, the copy may be sent as hashes and offsets, to take advantage of the native deduplication capabilities of the target CAS. The underlying data pointed to by any new hashes is also sent on an as-needed basis.

The temporal tree structure is read or navigated as part of the implementation of various services:

Garbage Collection navigates the tree in order to reduce the cost of the "mark" phase, as described below Replication to a different CAS pool finds a set of near-neighbors in the temporal tree that are also known to have been transferred already to the other CAS pool, so that only a small set of differences need to be transferred additionally Optimal-Way for data restore uses the temporal tree to find a predecessor that can be used as a basis for the restore operation. In the CAS temporal tree data structure, children are subsequent versions, e.g., as dictated by archive policy. Multiple children are supported on the same parent node; this case may arise when a parent node is changed, then used as the basis for a restore, and subsequently changed again.

CAS Difference Engine

The CAS difference engine 1106 compares two objects identified by hash values or handles as in FIGS. 11 and 12, and produces a sequence of offsets and extents within the objects where the object data is known to differ. This sequence is achieved by traversing the two object trees in parallel in the hash data structure of FIG. 12. The tree traversal is a standard depth- or breadth-first traversal. During traversal, the hashes at the current depth are compared. Where the hash of a node is identical between both sides, there is no need to descend the tree further, so the traversal may be pruned. If the hash of a node is not identical, the traversal continues descending into the next lowest level of the tree. If the traversal reaches a depth-0 hash that is not identical to its counterpart, then the absolute offset into the data object being compared where the non-identical data occurs, together with the data length, is emitted into the output sequence. If one object is smaller in size than another, then its traversal will complete earlier, and all subsequent offsets encountered in the traversal of the other are emitted as differences.

Garbage Collection Via Differencing

As described under FIG. 11, Garbage Collector is a service that analyzes a particular CAS store to find saved data that is not referenced by any object handle in the CAS store temporal data structure, and to reclaim the storage space committed to this data. Garbage collection uses a standard "Mark and Sweep" approach. Since the "mark" phase may be quite expensive, the algorithm used for the mark phase attempts to minimize marking the same data multiple times, even though it may be referenced many times; however the mark phase must be complete, ensuring that no referenced data is left unmarked, as this would result in data loss from the store as, after a sweep phase, unmarked data would later be overwritten by new data.

The algorithm employed for marking referenced data uses the fact that objects in the CAS are arranged in graphs with temporal relationships using the data structure depicted in FIG. 13. It is likely that objects that share an edge in these graphs differ in only a small subset of their data, and it is also rare that any new data chunk that appears when an object is created from a predecessor should appear again between any two other objects. Thus, the mark phase of garbage collection processes each connected component of the temporal graph.

Figure 14:
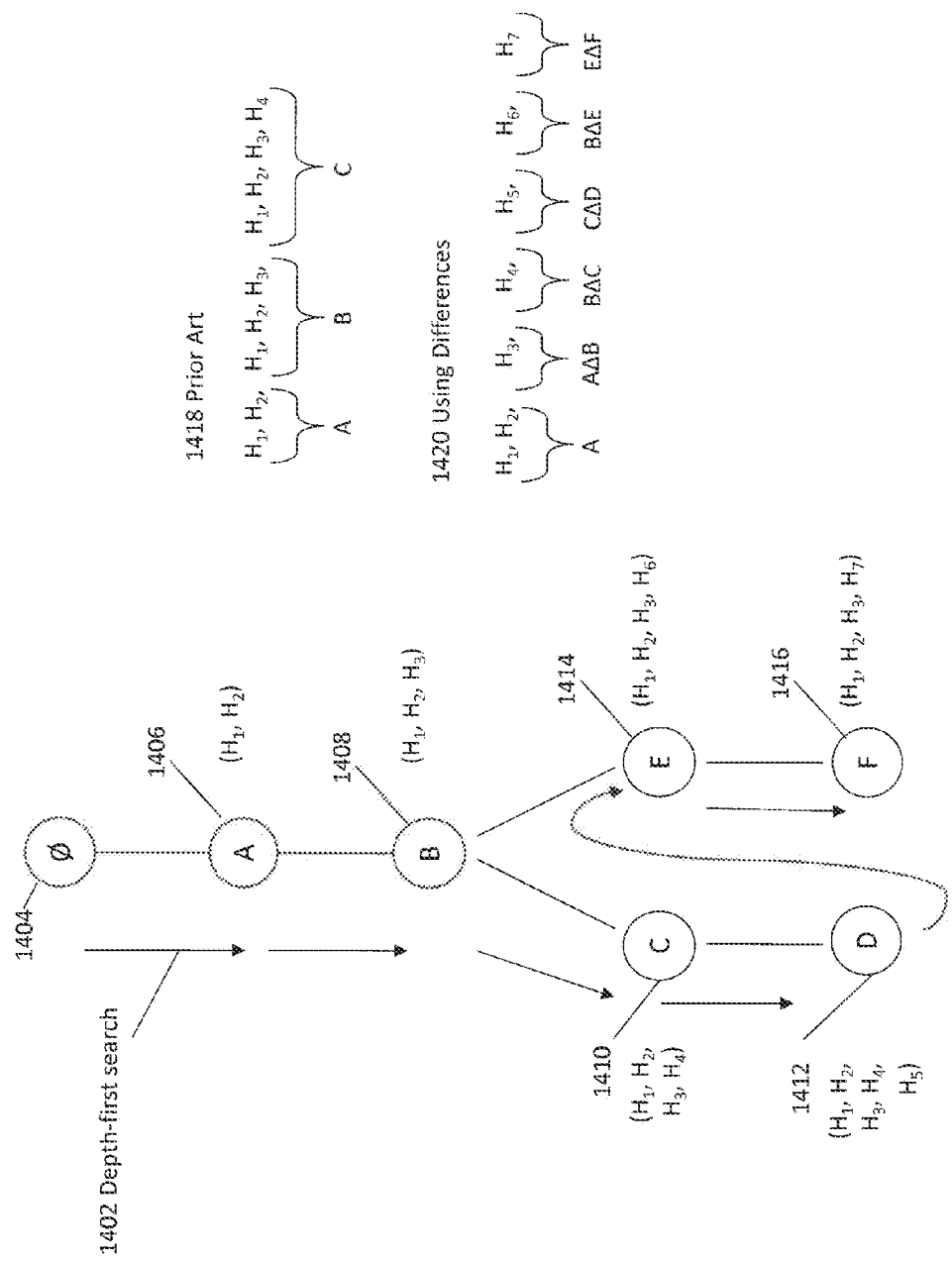
FIG. 14 is a diagram representing the operation of a garbage collection algorithm in the CAS.

FIG. 14 is an example of garbage collection using temporal relationships in certain embodiments. A depth-first search is made, represented by arrows 1402, of a data structure containing temporal relationships. Take a starting node 1404 from which to begin the tree traversal. Node 1404 is the tree root and references no objects. Node 1406 contains references to objects H1 and H2, denoting a hash value for object 1 and a hash value for object 2. All depth-0, depth-1 and higher data objects that are referenced by node 1406, here H1 and H2, are enumerated and marked as referenced.

Next, node 1408 is processed. As it shares an edge with node 1406, which has been marked, the difference engine is applied to the difference between the object referenced by 1406 and the object referenced by 1408, obtaining a set of depth-0, depth-1 and higher hashes that exist in the unmarked object but not in the marked object. In the figure, the hash that exists in node 1408 but not in node 1406 is H3, so H3 is marked as referenced. This procedure is continued until all edges are exhausted.

A comparison of the results produced by a prior art algorithm 1418 and the present embodiment 1420 shows that when node 1408 is processed by the prior art algorithm, previously-seen hashes H1 and H2 are emitted into the output stream along with new hash H3. Present embodiment 1420 does not emit previously seen hashes into the output stream, resulting in only new hashes H3, H4, H5, H6, H7 being emitted into the output stream, with a corresponding improvement in performance. Note that this method does not guarantee that data will not be marked more than once. For example, if hash value H4 occurs independently in node 1416, it will be independently marked a second time.

Copy an Object into the CAS

Figure 15:
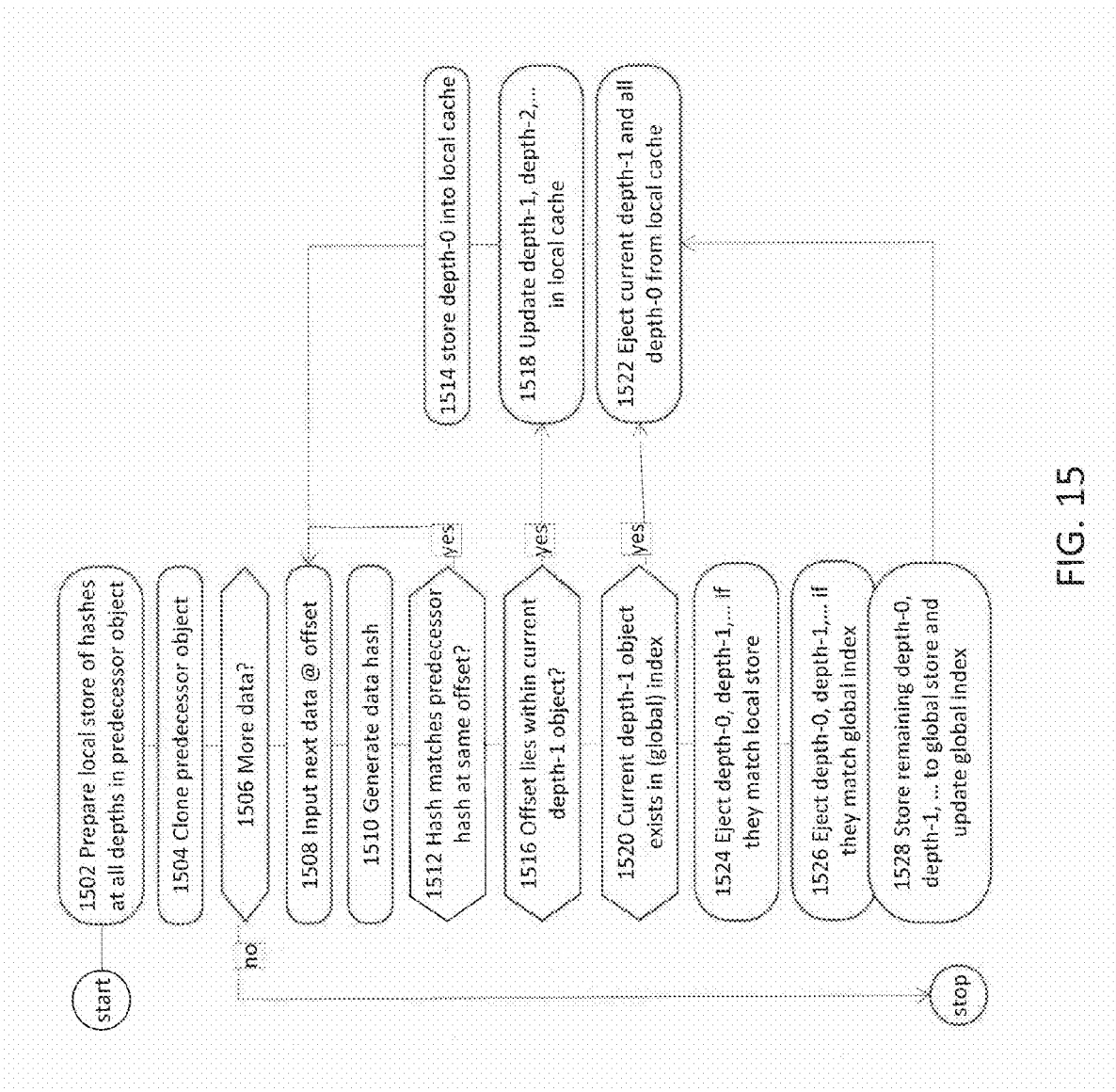
FIG. 15 is a flowchart for the operation of copying an object into the CAS.

Copying an object from another pool into the CAS uses the software modules described in FIG. 11 to produce a data structure referenced by an object handle as in FIG. 12. The input to the process is (a) a sequence of chunks of data at specified offsets, sized appropriately for making depth-0 handles, and optionally (b) a previous version of the same object. Implicitly, the new object will be identical to the previous version except where the input data is provided and itself differs from the previous version. The algorithm for the copy-in operation is illustrated in a flowchart at FIG. 15.

If a previous version (b) is provided, then the sequence (a) may be a sparse set of changes from (b). In the case that the object to be copied and is known to differ from a previous object at only a few points, this can greatly reduce the amount of data that needs to be copied in, and therefore reduce the computation and i/o activity required. This is the case, for example, when the object is to be copied in via the optimal way for data backup described previously.

Even if the sequence (a) includes sections that are largely unchanged from a predecessor, identifying the predecessor (b) allows the copy-in procedure to do quick checks as to whether the data has indeed changed and therefore to avoid data duplication at a finer level of granularity than might be possible for the difference engine in some other storage pool providing input to a CAS.

Implicitly then, the new object will be identical to the previous version except where the input data is provided and itself differs from the previous version. The algorithm for the copy-in operation is illustrated in a flowchart at FIG. 15.

The process starts as an arbitrarily-sized data object in the temporal store is provided, and proceeds to 1502, which enumerates any and all hashes (depth-0 through the highest level) referenced by the hash value in the predecessor object, if such is provided. This will be used as a quick check to avoid storing data that is already contained in the predecessor.

At step 1504, if a predecessor is input, create a reference to a clone of it in the content-addressable data store temporal data structure. This clone will be updated to become the new object. Thus the new object will become a copy of the predecessor modified by the differences copied into the CAS from the copying source pool.

At steps 1506, 1508, the Data Mover 502 pushes the data into the CAS. The data is accompanied by an object reference and an offset, which is the target location for the data. The data may be sparse, as only the differences from the predecessor need to be moved into the new object. At this point the incoming data is broken into depth-0 chunks sized small enough that each can be represented by a single depth-0 hash.

At step 1510, the data hash module generates a hash for each depth-0 chunk.

At step 1512, read the predecessor hash at the same offset. If the hash of the data matches the hash of the predecessor at the same offset, then no data needs to be stored and the depth-1 and higher objects do not need to be updated for this depth-0 chunk. In this case, return to accept the next depth-0 chunk of data. This achieves temporal deduplication without having to do expensive global lookups. Even though the source system is ideally sending only the differences from the data that has previously been stored in the CAS, this check may be necessary if the source system is performing differencing at a different level of granularity, or if the data is marked as changed but has been changed back to its previously-stored value. Differencing may be performed at a different level of granularity if, for example, the source system is a snapshot pool which creates deltas on a 32 KiB boundary and the CAS store creates hashes on 4 KiB chunks.

If a match is not found, the data may be hashed and stored. Data is written starting at the provided offset and ending once the new data has been exhausted. Once the data has been stored, at step 1516, if the offset is still contained within the same depth-1 object, then depth-1, depth-2 and all higher objects 1518 are updated, generating new hashes at each level, and the depth-0, depth-1 and all higher objects are stored at step 1514 to a local cache.

However, at step 1520, if the amount of data to be stored exceeds the depth-1 chunk size and the offset is to be contained in a new depth-1 object, the current depth-1 must be flushed to the store, unless it is determined to be stored there already. First look it up in the global index 1116. If it is found there, remove the depth-1 and all associated depth-0 objects from the local cache and proceed with the new chunk 1522.

At step 1524, as a quick check to avoid visiting the global index, for each depth-0, depth-1 and higher object in the local cache, lookup its hash in the local store established in 1502. Discard any that match.

At step 1526, for each depth-0, depth-1 and higher object in the local cache, lookup its hash in the global index 1116. Discard any that match. This ensures that data is deduplicated globally.

At step 1528: store all remaining content from the local cache into the persistent store, then continue to process the new chunk.

Reading an object out of the CAS is a simpler process and is common across many implementations of CAS. The handle for the object is mapped to a persistent data object via the global index, and the offset required is read from within this persistent data. In some cases it may be necessary to recurse through several depths in the object handle tree.

CAS Object Network Replication

As described under FIG. 11, the Replicator 1110 is a service to duplicate data objects between two different content addressable stores. The process of replication could be achieved through reading out of one store and writing back into another, but this architecture allows more efficient replication over a limited bandwidth connection such as a local- or wide-area network.

A replicating system operating on each CAS store uses the difference engine service described above together with the temporal relationship structure as described in FIG. 13, and additionally stores on a per-object basis in the temporal data structure used by the CAS store a record of what remote store the object has been replicated to. This provides definitive knowledge of object presence at a certain data store.

Using the temporal data structure, it is possible for the system to determine which objects exist on which data stores. This information is leveraged by the Data Mover and Difference Engine to determine a minimal subset of data to be sent over the network during a copy operation to bring a target data store up to date. For example, if data object 0 has been copied at time T3 from a server in Boston to a remote server in Seattle, Protection Catalog Store 908 will store that object 0 at time T3 exists both in Boston and Seattle. At time T5, during a subsequent copy from Boston to Seattle, the temporal data structure will be consulted to determine the previous state of object 0 in Seattle that should be used for differencing on the source server in Boston. The Boston server will then take the difference of T5 and T3, and send that difference to the Seattle server.

The process to replicate an object A is then as follows: Identify an object A0 that is recorded as having already been replicated to the target store and a near neighbor of A in the local store. If no such object A0 exists then send A to the remote store and record it locally as having been sent. To send a local object to the remote store, a typical method as embodied here is: send all the hashes and offsets of data chunks within the object; query the remote store as to which hashes represent data that is not present remotely; send the required data to the remote store (sending the data and hashes is implemented in this embodiment by encapsulating them in a TCP data stream).

Conversely, if A0 is identified, then run the difference engine to identify data chunks that are in A but not in A0. This should be a superset of the data that needs to be sent to the remote store. Send hashes and offsets for chunks that are in A but not in A0. Query the remote store as to which hashes represent data that is not present remotely; send the required data to the remote store.

Sample Deployment Architecture

Figure 16:
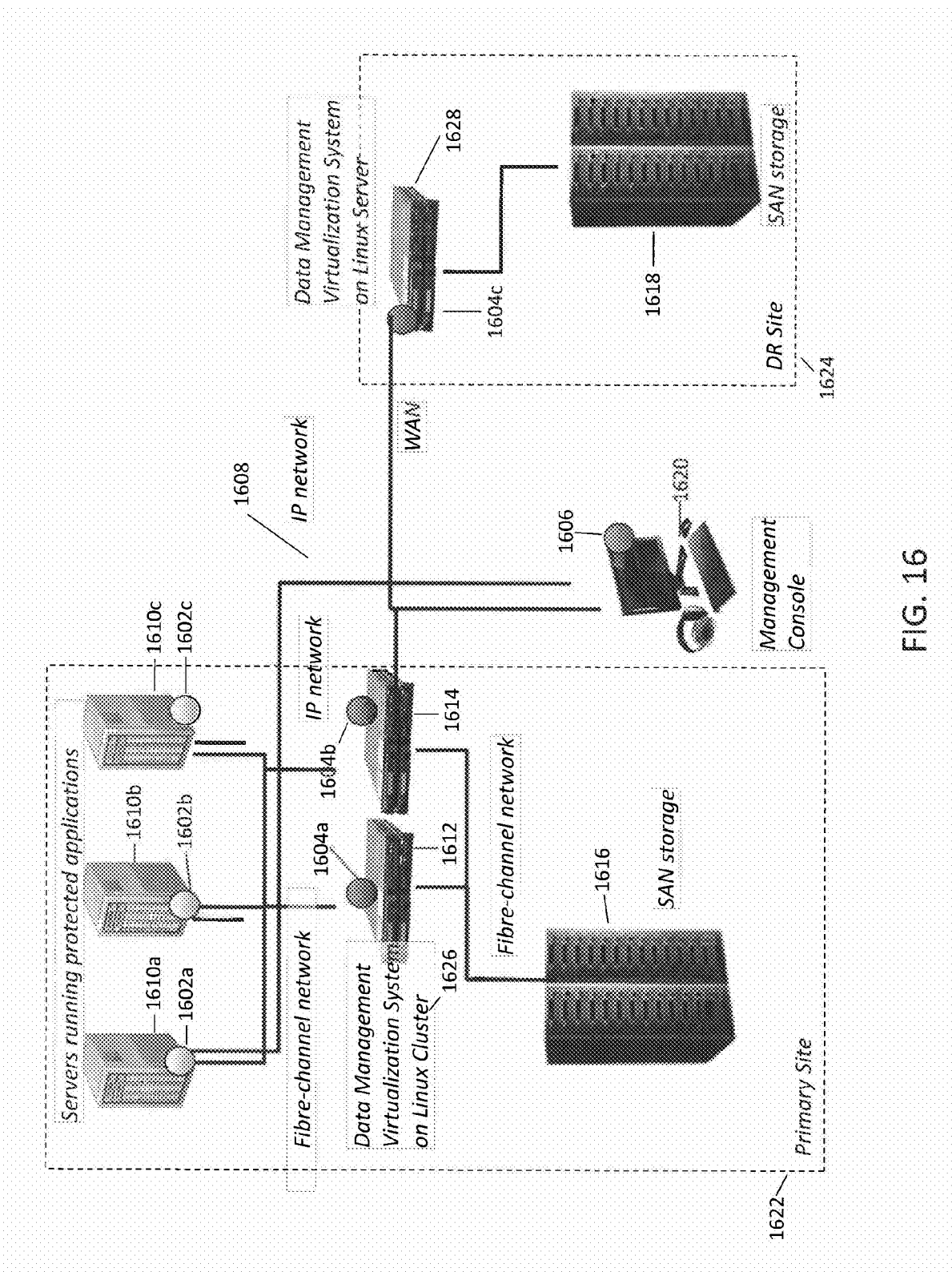
FIG. 16 is a system diagram of a typical deployment of the Data Management Virtualization system.

FIG. 16 shows the software and hardware components in one embodiment of the Data Management Virtualization (DMV) system. The software in the system executes as three distributed components:

The Host Agent software 1602*a*, 1602*b*, 1602*c* implements some of the application-specific module described above. It executes on the same servers 1610*a*, 1610*b*, 1610*c* as the application whose data is under management.

The DMV server software 1604*a*, 1604*b* implements the remainder of the system as described here. It runs on a set of Linux servers 1612, 1614 that also provide highly available virtualized storage services.

The system is controlled by Management Client software 1606 that runs on a desktop or laptop computer 1620.

These software components communicate with one another via network connections over an IP network 1608. Data Management Virtualization systems communicate with one another between primary site 1622 and data replication (DR) site 1624 over an IP network such as a public internet backbone.

The DMV systems at primary and DR sites access one or more SAN storage systems 1616, 1618 via a fibre-channel network 1626. The servers running primary applications access the storage virtualized by the DMV systems access the storage via fibre-channel over the fibre-channel network, or iSCSI over the IP network. The DMV system at the remote DR site runs a parallel instance of DMV server software 1604*c* on Linux server 1628. Linux server 1628 may also be an Amazon Web Services EC2 instance or other similar cloud computational resource.

Figure 17:
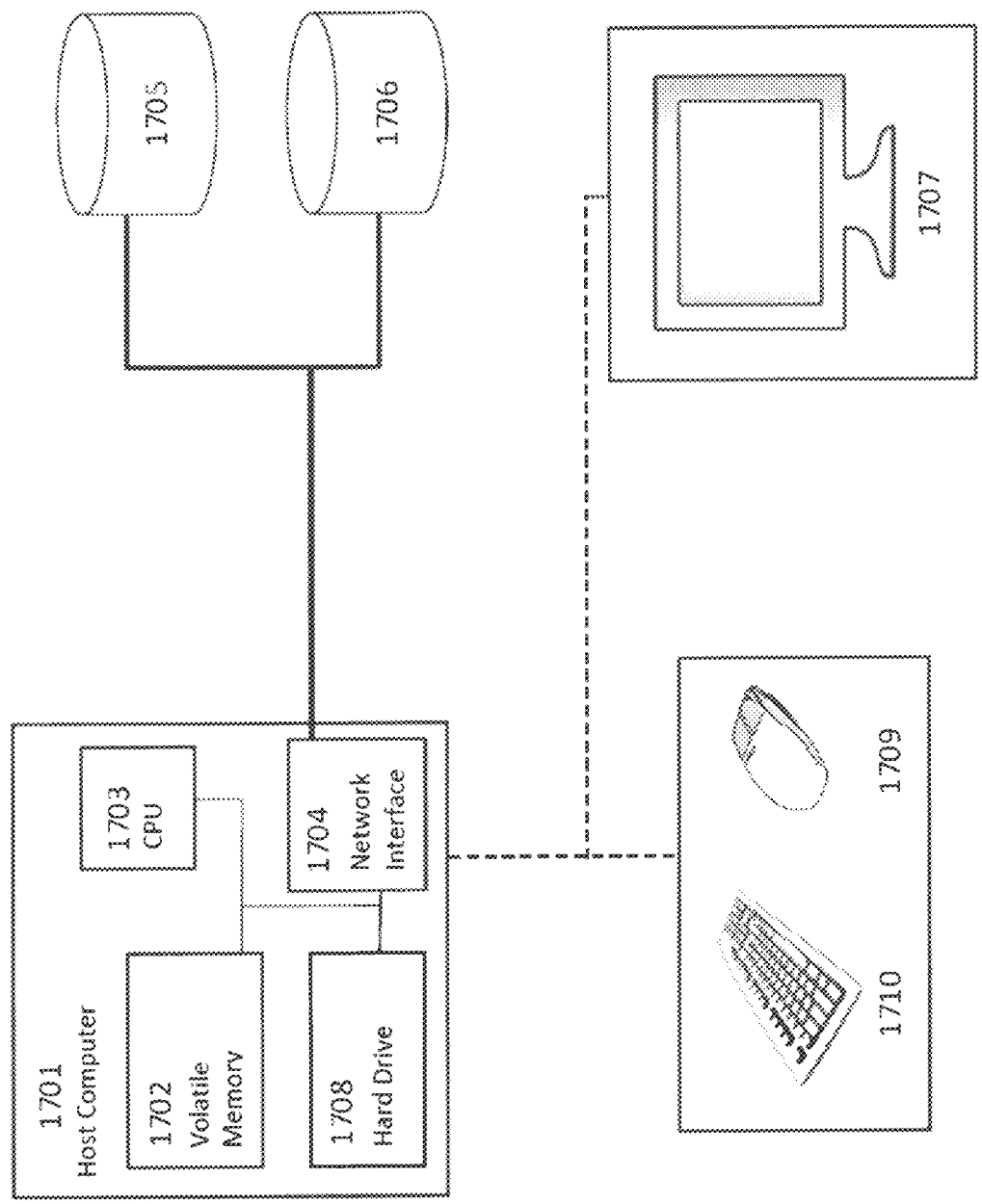
FIG. 17 is a schematic diagram of a characteristic physical server device for use with the Data Management Virtualization system.

FIG. 17 is a diagram that depicts the various components of a computerized system upon which certain elements may be implemented, according to certain embodiments of the invention. The logical modules described may be implemented on a host computer 1701 that contains volatile memory 1702, a persistent storage device such as a hard drive, 1708, a processor, 1703, and a network interface, 1704. Using the network interface, the system computer can interact with storage pools 1705, 1706 over a SAN or Fibre Channel device, among other embodiments. Although FIG. 17 illustrates a system in which the system computer is separate from the various storage pools, some or all of the storage pools may be housed within the host computer, eliminating the need for a network interface. The programmatic processes may be executed on a single host, as shown in FIG. 17, or they may be distributed across multiple hosts.

The host computer shown in FIG. 17 may serve as an administrative workstation, or may implement the application and Application Specific Agent 402, or may implement any and all logical modules described in this specification, including the Data Virtualization System itself, or may serve as a storage controller for exposing storage pools of physical media to the system. Workstations may be connected to a graphical display device, 1707, and to input devices such as a mouse 1709 and a keyboard 1710. Alternately, the active user's workstation may include a handheld device.

Throughout this specification we refer to software components, but all references to software components are intended to apply to software running on hardware. Likewise, objects and data structures referred to in the specification are intended to apply to data structures actually stored in memory, either volatile or non-volatile. Likewise, servers are intended to apply to software, and engines are intended to apply to software, all running on hardware such as the computer systems described in FIG. 17.

Data Fingerprint for Copy Accuracy Assurance

Figure 18:
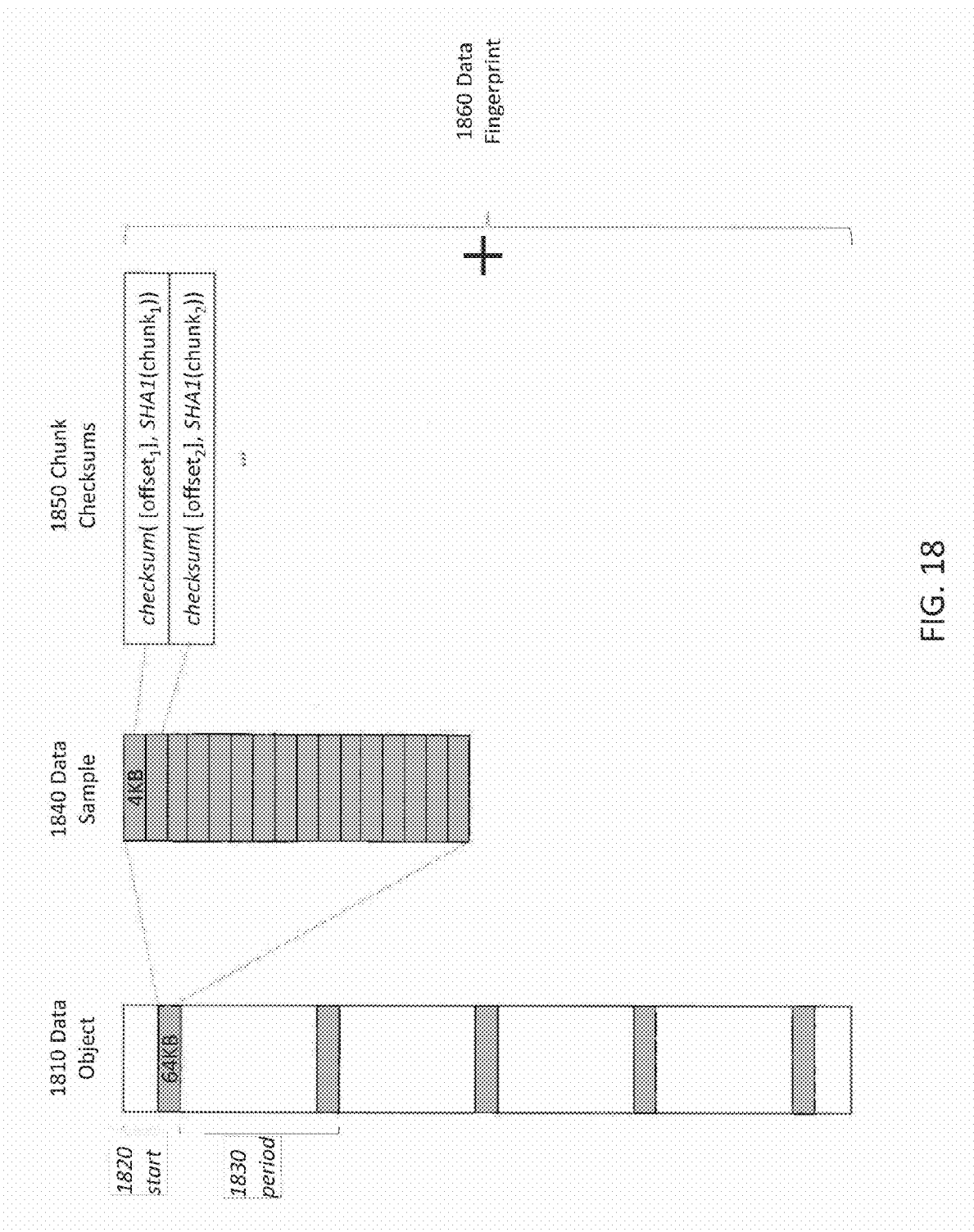
FIG. 18 is a schematic diagram showing the data model for a data fingerprint to be used in conjunction with certain embodiments of the invention.

FIG. 18 illustrates a method for generating a data fingerprint for an object stored in a virtual storage pool, according to certain embodiments of the invention.

A data fingerprint is a short binary digest of a data object that may be generated independently regardless of how the data object is stored, and is identical when generated multiple times against identical input data with identical parameters. Useful properties for the fingerprint are that it be of fixed size, that it be fast to generate for data objects in all storage pools, and that it be unlikely that different data objects have identical fingerprints.

A data fingerprint is different from a checksum or a hash. For example, a fingerprint is taken for only a sample of the object, not the whole object. Obtaining a binary digest of a small percentage of the data object is sufficient to provide a fingerprint for the whole data object. Since a data fingerprint only requires reads and computes on a small percentage of data, such fingerprints are computationally cheap or efficient compared to a checksum or hash.

These data fingerprints are also different in that a single data object may have multiple fingerprints. Over the life of a data object, multiple fingerprints are stored with the object as metadata, one per generation of the data object. The multiple fingerprints persist over multiple copies and generations of the data object.

Data fingerprints may be used to compare two objects to determine whether they are the same data object. If the data fingerprints for two objects differ, the two objects can definitively be said to be different. As with checksums, data fingerprints may thus be used to provide a measure or test of data integrity between copied or stored versions of a data object. Two data objects with the same data fingerprint may not necessarily be the same object.

As multiple fingerprints are taken of an object, data fingerprints may be used to compare two objects with increasing reliability. A fingerprint match on a subsequent revision increases confidence that all the previous copies were accurate. If a fingerprint does not match, this indicates that either this copy or previous copies were not accurate. With each next generation of the copy, a new fingerprint may be computed and validated against the corresponding fingerprint for that generation or revision.

If two data objects are compared by comparing their corresponding data fingerprints, and the corresponding fingerprints do not match, it is possible to conclude with certainty that the two data objects are different. However, if the corresponding fingerprints do match, it is not possible to conclude that the corresponding data objects are necessarily identical. For example, given two data objects that represent a digital photograph or image data, taking a data fingerprint may include taking a checksum or binary digest of a portion of each image. Comparing the two data objects based on a single portion of each image would not necessarily indicate that they are the same image. However, if multiple portions of the two images are identical, it is possible to conclude with increased certainty that the two images are the same image.

The calculation of a data fingerprint may require a selection function, which may be dynamic, that selects a subset or portion of the input data object. Any such function may be used; one specific example is described below in connection with certain embodiments. The function may select small portions of the data object that are spread out throughout the entirety of the data object. This strategy for selecting portions of data is useful for typical storage workloads, in which large chunks of data are often modified at one time; by selecting a relatively large number of non-contiguous portions or extents of data that are widely distributed within the data object, the selection function increases the probability that a large contiguous change in the data object may be detected. The function may change over time or may base its output on various inputs or parameters.

The choice of a selection function should ideally be done with an awareness of the content of a data object. Portions of the data object that are likely to change from generation to generation should be included in the fingerprint computation. Portions of the data object that are static, or tend to be identical for similar objects should not be included in the fingerprint. For example, disk labels and partition tables, which tend to be static should not generally be included in the fingerprint, since these would match across many generations of the same object. The tail end of a volume containing filesystems often tend to be unused space; this area should not be used in the computation of the fingerprint, as it will add computational and IO cost to the fingerprint, without increasing its discriminating value.

It is apparent that as the total size of the subset selected by the selection function increases, the probability that the data fingerprint captures all changes to the data increases, until the subset is equal to the whole data object, at which time the probability is 1. However, the selection function may balance the goal of increased probability of detecting changes with the goal of providing a consistently-fast fingerprinting time. This tradeoff is expressly permitted, as the disclosed system allows for multiple data fingerprints to be taken of the same data object. Multiple fingerprints can provide the increased error-checking probability as well, as when the number of fingerprints becomes large, the number of un-checked bytes in the data object decreases to zero.

A data fingerprinting function may operate as follows, in some embodiments. A data object, 1810, is any file stored within any virtual storage pool, for example a disk image stored as part of a data protection or archiving workflow. Start, 1820, is a number representing an offset or location within the file. Period, 1830, is a number representing a distance between offsets within the file. Data Sample, 1840, is a subset of data from within the data object. Chunk checksums, 1850, are the result of specific arithmetic checksum operations applied to specific data within the file. The data fingerprint, 1860, is a single numerical value derived deterministically from the content of the data object 1810 and the parameters start 1820 and period 1830. Other parameters and other parameterized functions may be used in certain embodiments.

The data samples 1840 are broken into fixed length chunks, in this illustration 4 KB. For each chunk a chunk checksum 1850 is calculated for the data stream, where the checksum includes the data in the chunk and the SHA-1 hash of the data in the chunk. One checksum algorithm used is the fletcher-32 method (http://en.wikipedia.org/wiki/Fletcher's_checksum). These chunk checksums are then added together modulo $2^{64}$, and the arithmetic sum of the chunk checksums is the data fingerprint 1860, parameterized by Start and Period. Other methods for combining the plurality of hash values or checksums into a single hash value may be contemplated in certain embodiments of the invention. A single hash value is preferred for simplicity. It is not necessary for the single hash value to reveal which data subsets were used in producing the chunk checksums.

In other embodiments, a data fingerprint may be performed using other functions that focus on interesting sections of a data object, where certain sections are determined to be interesting using various means. Interesting sections may be sections that are determined to change frequently, or that are likely to change frequently. A priori information about the content of the data object or the frequency of change of parts of the data object may be used. For example, when the system detects that a data object is a disk image, the system may ignore the volume partition map, as the partition map rarely changes. As another example, if the system knows that it is storing a Microsoft Word document, and that the headers of the document are unlikely to change, it may designate the body and text areas of the document as "interesting," and may choose to fingerprint those areas. Fingerprinting an "interesting" area may be performed in a manner similar to FIG. 18, in some embodiments, where the data samples are chosen by first identifying interesting data areas and then identifying areas to sample within the interesting data areas using an algorithm that generates a sparse subset of the interesting data areas.

In a preferred embodiment, the described fingerprinting algorithm has a very small overhead, and thus fingerprinting may be performed often. However, in cases such as when a pool includes offline tapes, fingerprinting all data may not have a reasonable overhead.

Figure 19:
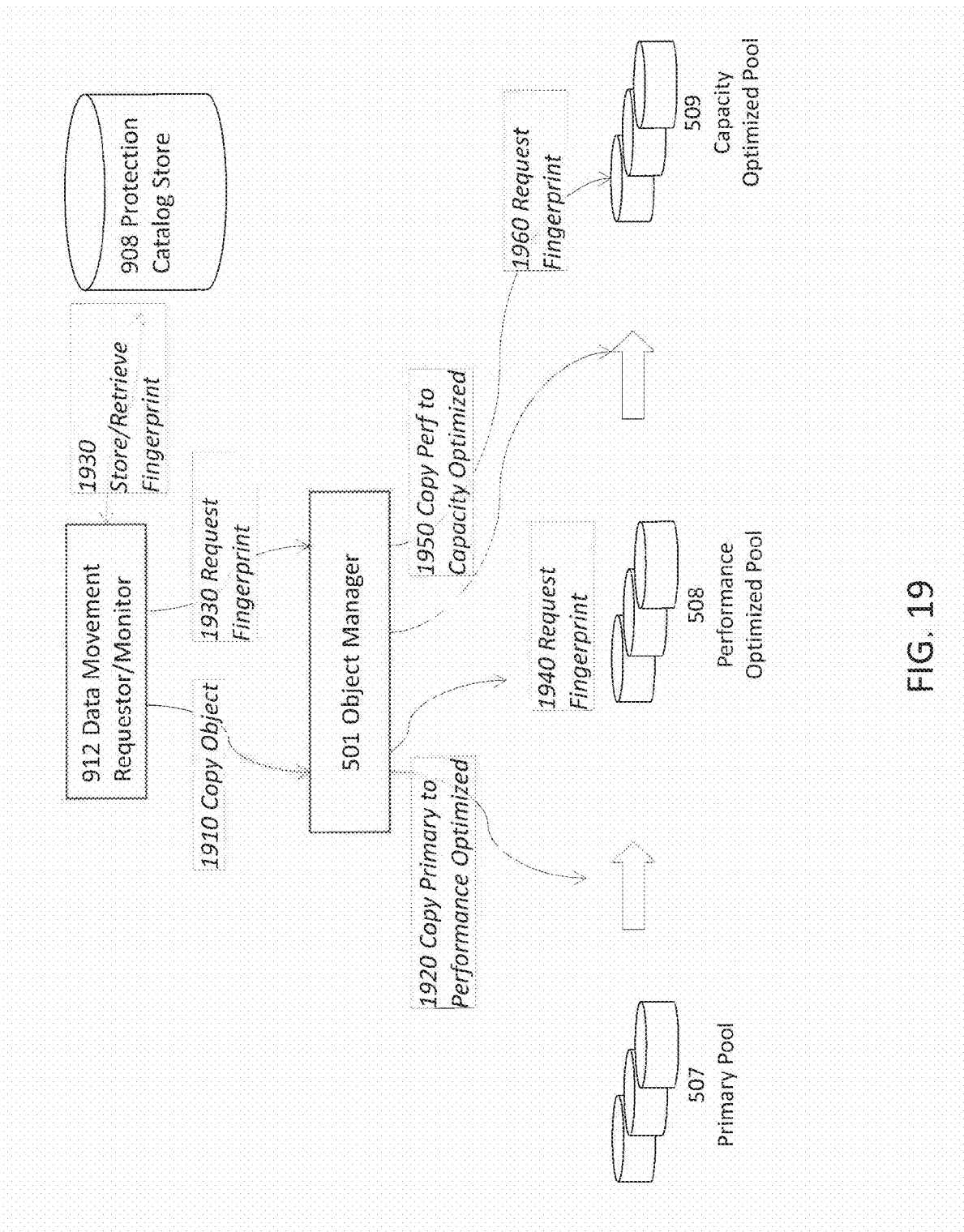
FIG. 19 is a system architecture diagram of a deployment of the Data Management Virtualization system that incorporates data fingerprinting.

FIG. 19 illustrates how the data fingerprint is used for assurance of accuracy in copy operations, according to certain embodiments of the invention.

In addition to the operations described above for the Object Manager 501, an additional operation is defined: that of generating a fingerprint for a data object, given a set of parameters (operation 1930). Every data object that is cataloged is fingerprinted and the fingerprint is stored with all other metadata.

When an object is cataloged, Object Manager 501 may make a request for a fingerprint on a data object to each pool. The first fingerprint is generated at the first storage-optimized pool or snapshot pool and stored in the catalog store. After a data object is first copied into the Performance Optimized Pool 508 using the lightweight snapshot operation, the data movement requestor 912 generates a set of parameters for a fingerprint, and uses them to request a fingerprint (operation 1910) from the object manager 501. In turn the object manager requests a fingerprint from the performance optimized pool (operation 1940). The performance optimized pool is capable of generating the fingerprint. In a preferred embodiment, every pool managed by pool manager 504 is capable of generating a fingerprint. The new fingerprint is stored into the protection catalog store 908, along with other metadata for the object as described above (operation 1930).

After any subsequent copy request (operation 1910), such as copy to capacity optimized pool (operation 1950), the fingerprint is requested from the target pool for the target object (operation 1930, operation 1960). Once generated, the stored fingerprint is then passed on to each subsequent pool, where the newly calculated fingerprint is then verified against the stored fingerprint to assure that copying errors have not occurred. Each subsequent pool may calculate the fingerprint again and validate the calculated fingerprint against the stored fingerprint.

To generate a fingerprint, the data object 1810 is sampled at regular intervals defined by Start 1820 and Period 1830 parameters. Each sample is a fixed size, in this illustration 64 KB. In one embodiment, the parameter Period is chosen such that it is approximately $\frac{1}{1000}$ of the size of the data object, and Start is chosen between 0 and Period according to a pseudo-random number generator.

For each new revision or generation of the data object, the start parameter may be modified, resulting in a data fingerprint of a different region of the data object. The object size, however, changes only in certain circumstances. If the object size stays constant the period stays constant. If the object size changes the period will change as well. A period of $\frac{1}{1000}$ (0.001) or another small fraction may be selected to ensure that calculating a fingerprint will take a small time and/or a constant time. Note that depending on the function used to generate the subset of the data object used for the data fingerprinting operation, other parameters may be modified instead of the start parameter. The result is to cause the data fingerprint to be generated from a different region of the data object, such that cumulative data fingerprints result in fingerprinting of an increasing proportion of the data object over time.

Multiple generations of a data object may be created as a result of interactions with service level agreements (SLAs), as described elsewhere in the present disclosure. For example, given a SLA that schedules a snapshot operation once every hour, an additional generation of a data object will be created every hour. For each additional generation, a new data fingerprint is created and sent. If the data object has not changed from the previous generation to the current generation, the data itself need not be sent, but a fingerprint is sent to the target data pool regardless, to incrementally increase the probability that the sparse data fingerprinting operation has captured all changes to the data throughout the data object.

As different storage pools may support different operations, the fingerprint operation may be supported by one or more storage pools in the system. The pools are brokered by the operation manager such as Pool Request Broker 602. In a preferred embodiment the fingerprint operation is supported by all pools.

Fingerprinting remains with the metadata for the lifetime of the data object. This allows fingerprinting to also be used during restore as well as during copy or other phases of data storage, access and recovery, which provides true end-to-end metadata from a data perspective. Fingerprinting during restore is performed as follows. When a restore operation is requested by Object Manager 501, a fingerprint operation may take place on the restored data. This fingerprint operation may take place before or after the restore operation. By using the fingerprint operation, all previously-stored revisions of the data object are used to verify the currently-restored copy of the data, according to the fingerprint verification method described above. This leverages incremental knowledge in a way different from that of typical I/O path CRC protection.

As disclosed above, each copy of an object between virtual storage pools is incremental, transferring only data from the source object known to be absent in the target pool. It follows from this that any errors in copying in one generation of an object will still be present in subsequent generations. Indeed such errors may be compounded. The use of a data fingerprint provides a check that copies of an object in different virtual storage pools have the same data content.

The choice of data fingerprint method also controls the level of confidence in the check: as the Period (1830) is made smaller, the cost of generating the fingerprint goes up, as more data needs to be read from the pool, but the chance of generating a matching fingerprint despite the data containing copying errors decreases.

However, for successive generations of a single object, different values may be used for the parameter Start (1820). This ensures that with repeated copying of successive generations of single object, the chance that any copying error might not be eventually caught reduces asymptotically to zero.

Copy Accuracy Assurance

Figure 20:
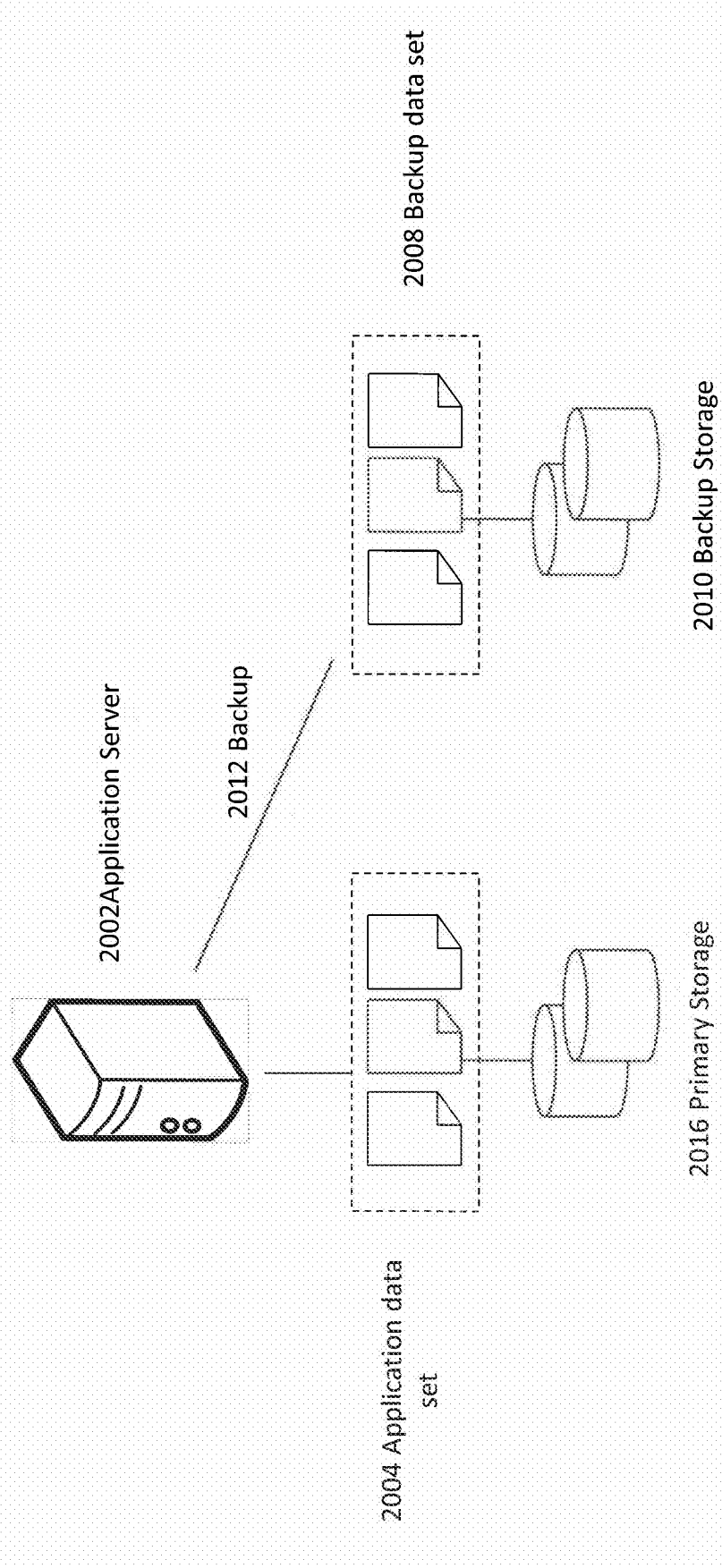
FIG. 20 is a system architecture diagram showing an application backing up a data set.

FIG. 20 illustrates file set 2004 created and used by application 2002 such as Microsoft SQL Server, Microsoft Exchange Server etc. to save application data. Backup application copies the file set as a backup data set 2008 to backup storage 2010 during backup operation 2012.

Applications such as Microsoft SQL Server, Microsoft Exchange Server etc. store application data in a set of files on primary storage 2016 (e.g., production storage). The format of each file, number of files used by each application and content of each file differ for each application. Backup application needs to copy the files created and used by application to file system on backup storage 2010.

To reduce the time required for backup operation and to reduce the storage consumed by backup data, backup application typically performs incremental backup. During incremental backup, only the changed blocks in each changed file are copied to backup storage. Incremental backup of applications is described in detail herein and in U.S. Provisional Application No. 61/905,346, filed on Nov. 18, 2013, entitled "Computerized Methods and Apparatus for Incremental Database Backup Using Change Tracking," the disclosure of which is herein incorporated in its entirety.

Figure 21:
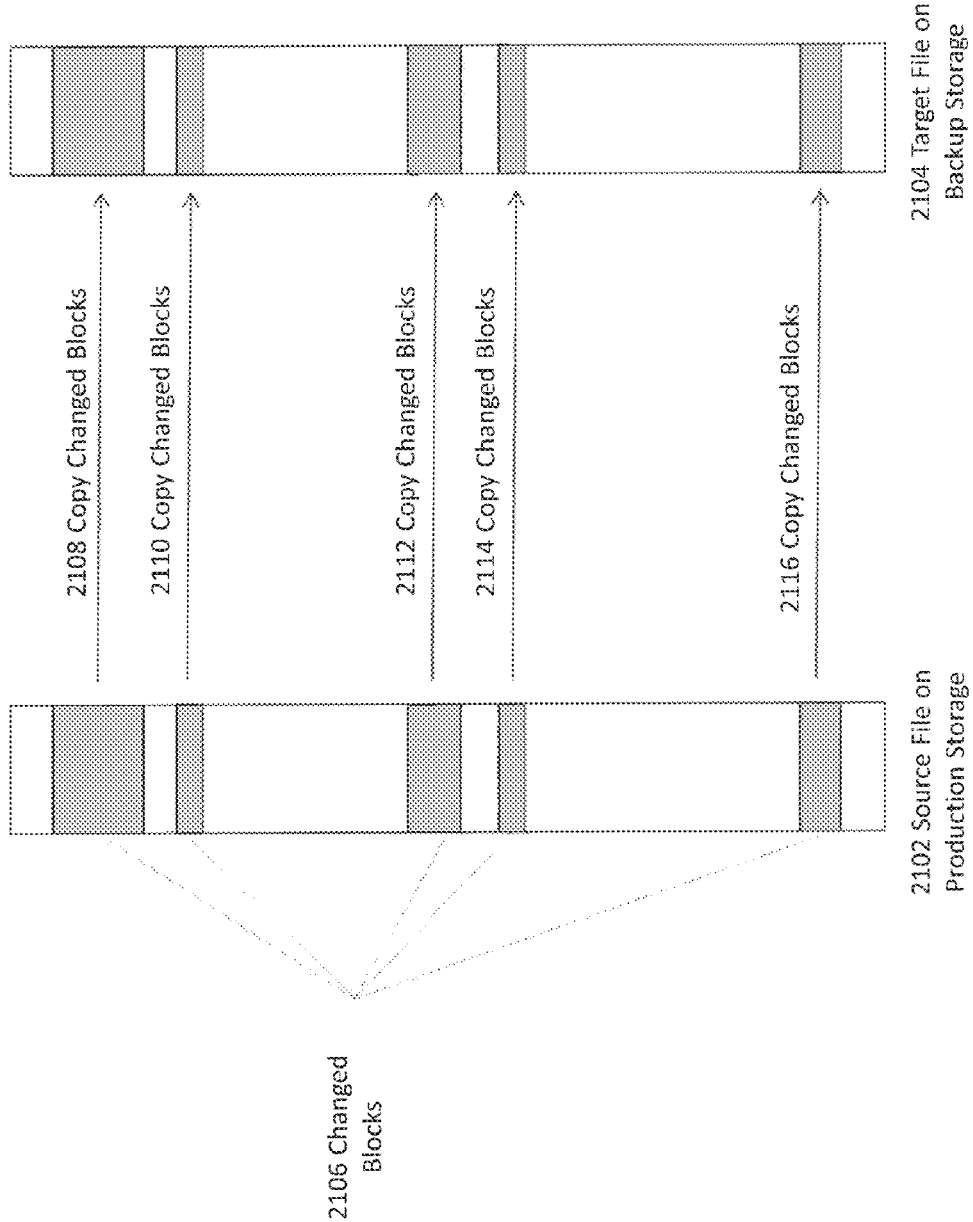
FIG. 21 is a diagram illustrating incremental copy of data files performed by a backup application during a backup process.

FIG. 21 illustrates incremental copy of each file performed by backup application during backup process. For each application data file 2102, backup application identifies changed blocks 2106 within the file since previous backup. It then copies 2108, 2110, 2112, 2114, 2116 the changed blocks 2106 to copy of the file on backup storage 2104. Note that changed blocks within a file can appear anywhere in the file and can differ in sizes.

If backup application for some reason does not identify changed blocks in a file correctly, or fails to copy changed blocks to copy of file on backup storage correctly, resultant backup image can be corrupt due to incomplete copy. Such a corrupt backup may not be restorable. Incomplete copies are described in detail in above.

Copy Accuracy Assurance mechanism as described in some embodiments of the present disclosure help prevent corrupt backups due to incorrect change block tracking information or failure to copy changed blocks.

Figure 22:
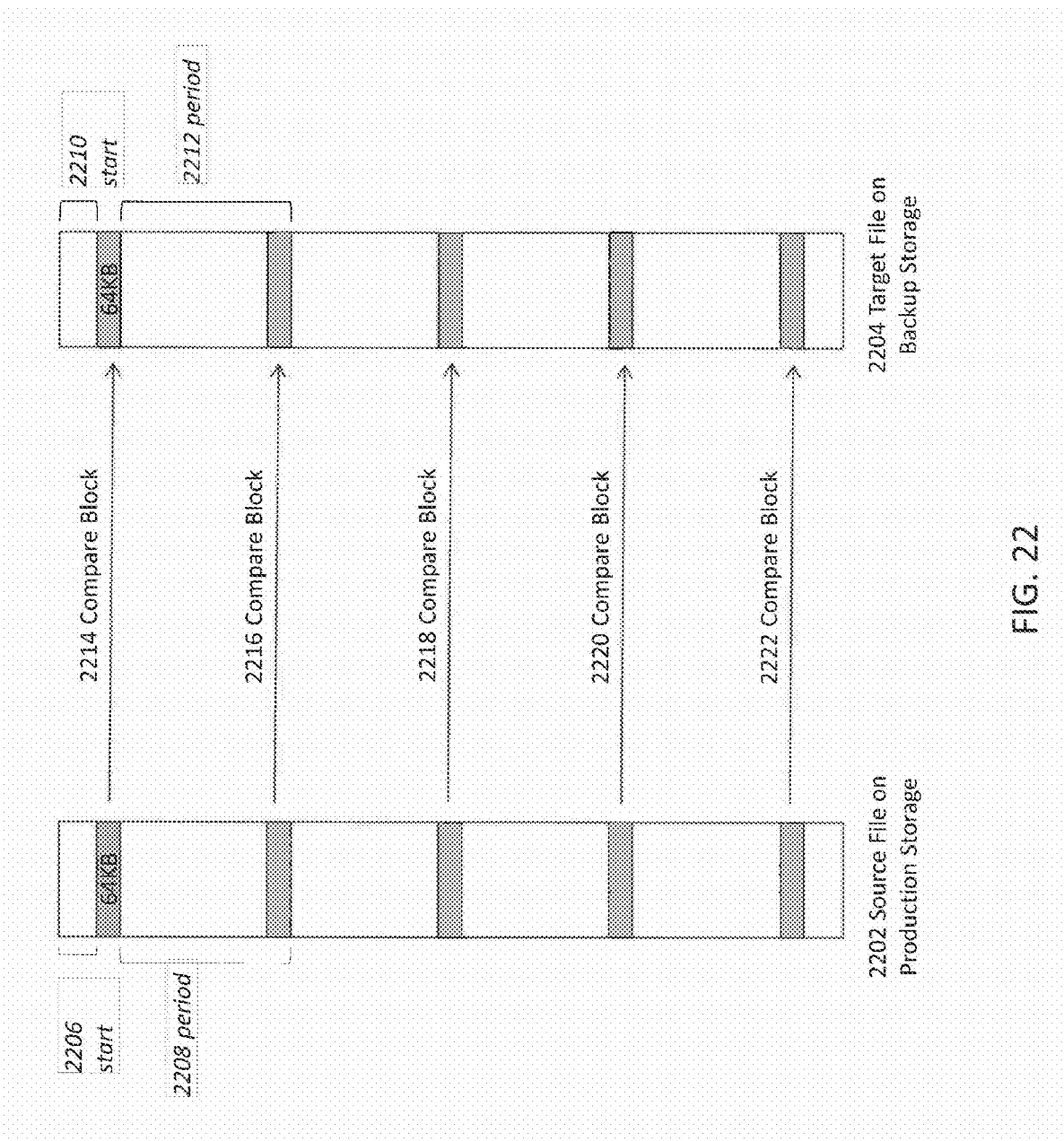
FIG. 22 is a diagram illustrating fingerprint verification, according to some embodiments of the present disclosure.

FIG. 22 illustrates one implementation of Copy Accuracy Assurance mechanism. In this implementation, random 64 KB blocks are read from frozen copy of file from Production Storage 2202 and backup copy of file on Backup Storage 2204 and compared 2214, 2216, 2218, 2220, 2222 to verify accuracy of copy. In some embodiments, these blocks are spaced uniformly throughout the length of the file. Starting offset 2206 2210 points to the beginning of first random block selected for verification. Period 2208 2212 is the spacing between blocks selected for verification. If any of the blocks between source and target are different, the two files are deemed as different. Uniform spacing is just one of the schemes that can use be used for selecting blocks for verification. Other schemes may be chosen depending on the application and content of files.

In this implementation, data fingerprint for file is not stored by backup application. Instead random sample is generated, compared and thrown away each time Copy Accuracy verification is invoked.

Each fingerprint verification operation can use a different set of random blocks for comparing source and target files. Each successful verification increases confidence in accuracy of copy.

Data fingerprinting is performed even if backup application detects no changes to application data files. This scheme increases confidence that the source and backup files are identical.

There are situations where backup application might want to compute fingerprint from the random sample of blocks instead of just sparsely comparing random sample of blocks and save computed fingerprint for future use as part of backup metadata. Saving computed fingerprint for a file allows backup application to verify the contents of backed up files when the copy is accessed for any purpose.

Figure 23:
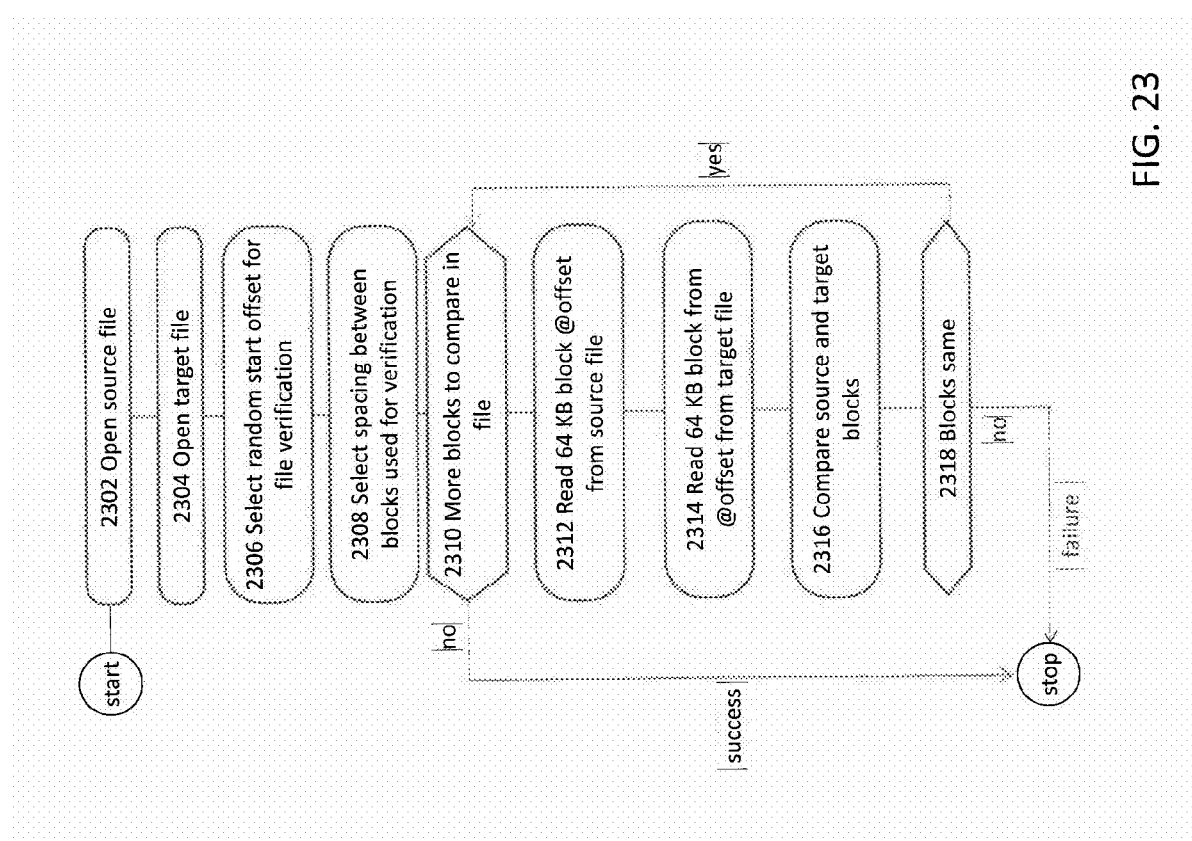
FIG. 23 is a flowchart illustrating a fingerprint verification process.

FIG. 23 is a flowchart illustrating a fingerprint verification process. During fingerprint verification, source file on Production Storage and target file on backup storage are compared to verify accuracy of copy. Backup application opens the source file at step 2302 and opens target file at step 2304. It then selects the random start offset for verification at step 2306. At step 2308, backup application selects the spacing between two consecutive blocks to read for verification. The number of blocks selected for verification depends on the size of file being verified. Backup application then determines if there are more blocks to compare in the file 2310. If there are more blocks to compare, backup application then reads block from source file at step 2312 and reads the corresponding block in target file at step 2314. At step 2316, backup application compares the source and target blocks. If the blocks are different, the fingerprint verification is considered as failed and further verification is stopped. If the compared blocks are the same then steps 2312 through 2318 are repeated until all selected blocks are compared. If all blocks selected for random verification are the same, the files are considered the same.

A different start offset is selected at step 2306 for each fingerprint verification operation. This increases the confidence in accuracy of copy.

Incremental Backup Using Change Tracking

Incremental backup of a database generally involves backing up a full copy of the database and then backing up just the changes to the database since the last full or incremental backup. Incremental backup can reduce the amount of data that needs to be backed up during each backup operation, storage space consumed by the backup image on backup device and/or the time required to backup the database.

Figure 24:
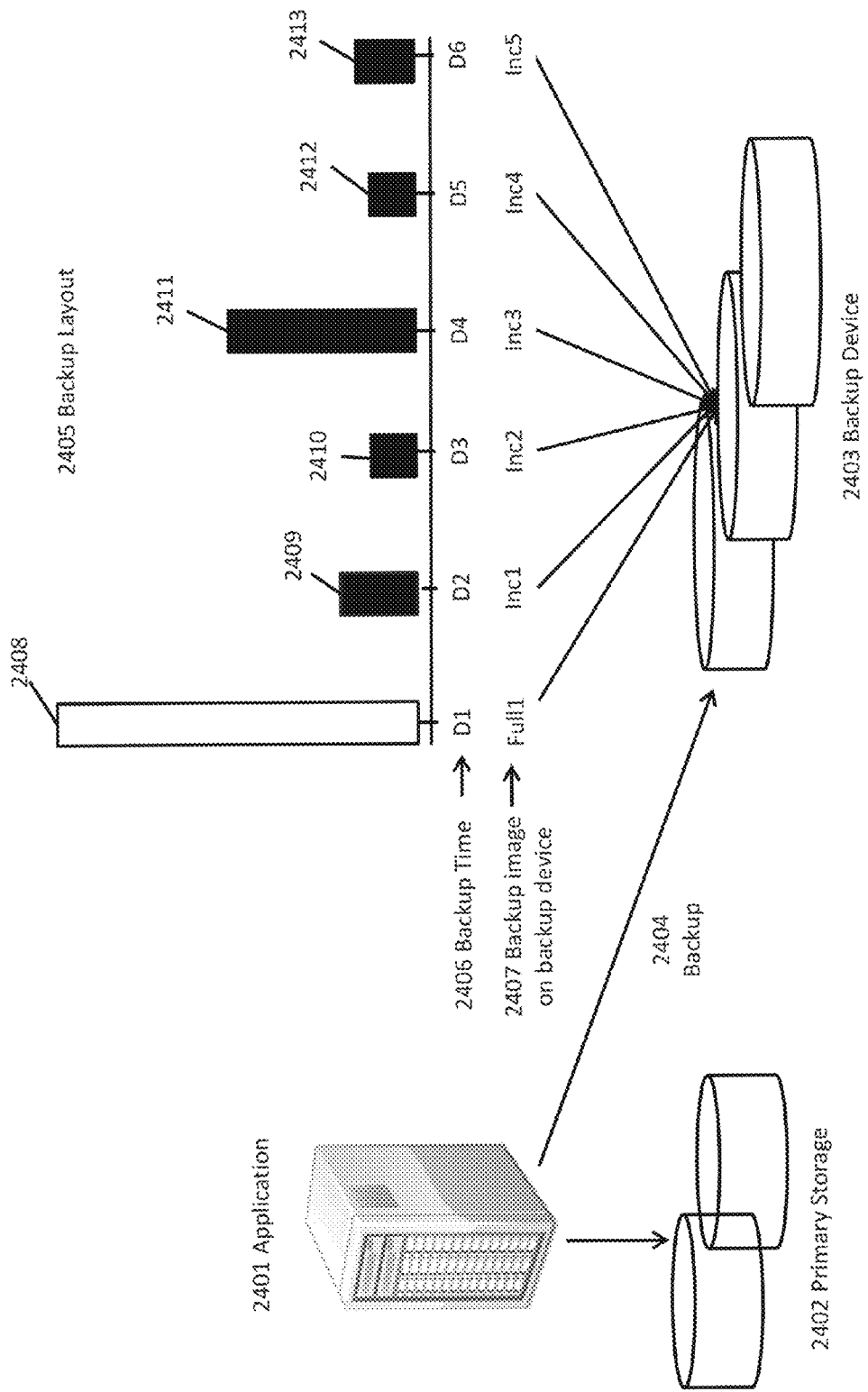
FIG. 24 is an exemplary diagram illustrating a traditional incremental backup.

FIG. 24 depicts a traditional incremental backup solution for databases. Database Application 2401 consumes primary storage 2402 for saving database files. Periodic database backup 2404 is performed by a backup application to a backup device 2403 that is different from the primary storage 2402. The backup device 2403 is typically external to the database server such as an external disk or tape device.

Backup applications typically perform a full backup of a database followed by series of incremental backups, each backup occurring at a distinct backup time 2406. The layout 2405 of backup image 2407 on backup device 2403 consists of a full copy of the database for the full backup 2408. Each subsequent incremental backup is stored as a separate backup image 2409, 2410, 2411, 2412, 2413 in an incremental backup format specific to the application that is being backed up on the backup device. The incremental backup format is usually different from a native file format for the database. So the incremental backup cannot be used interchangeably with database files.

This traditional approach to incremental backup of databases can have certain disadvantages. Restoring a database to a point in time state requires first restoring the last full backup and then applying subsequent incremental backups until the database is rolled forward to a desired point in time. This can increase the time required to restore a database. The larger time required for restore may mean a larger downtime for a business in the case of a disaster.

Another potential disadvantage is that restore using the backup taken with a traditional approach often requires that all incremental backups between the full backup and desired restore point are available at the time of restore. If any of the incremental backups are missing, the database cannot be restored.

Another potential disadvantage is that, to reduce the time required to restore the database and to avoid the need to retain the first full backup for indefinite period of time, full backup of database often needs to be performed periodically. Full database backup is slow and consumes the same The techniques described herein provide for monitoring changes made to a file using a change tracking driver. An incremental backup can be generated (e.g., for a database) using the change tracking driver by first copying all data for the first backup of the data, and then using the change tracking driver to only copy changed data since the first backup. Each incremental backup can be a stand-alone backup such that it includes a reference to the original data in the first backup, as well as references to all changes since the first backup for the respective incremental backup. Further, the data (and changes) can be copied in native form to provide for efficient restoration.

In the present disclosure, an approach is presented for incremental backup of databases (e.g., on servers running a Windows operating system) using a change tracking driver. This approach can overcome many of the disadvantages of a traditional incremental backup approach, as will be appreciated more fully herein.

Figure 25:
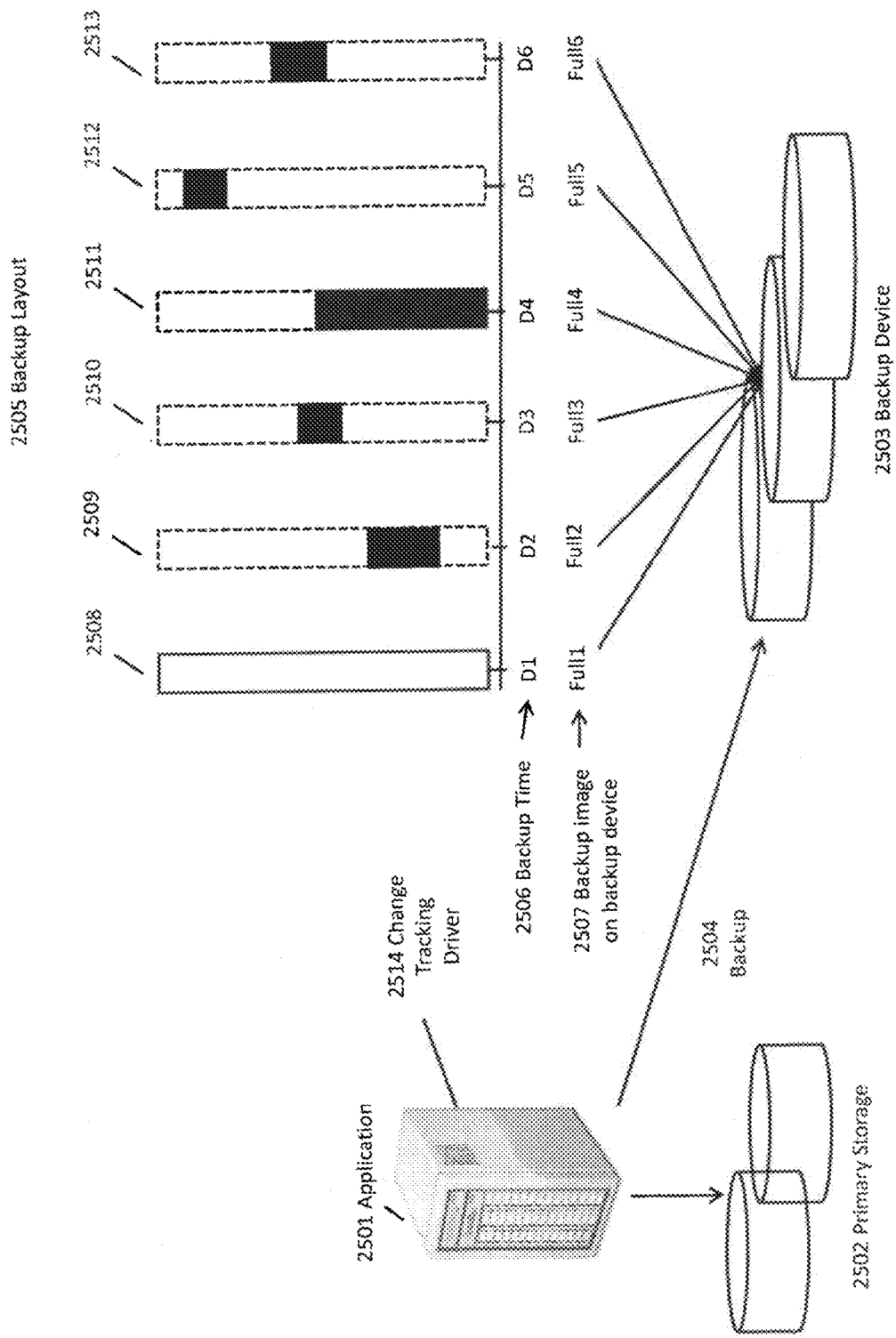
FIG. 25 is an exemplary diagram illustrating an incremental backup using a change tracking driver, according to some embodiments.

FIG. 25 is an exemplary diagram illustrating an incremental backup using a change tracking driver, according to some embodiments. FIG. 25 includes database application 2501 consuming primary storage 2502 for saving database files. Backup application backs up 2504 database application 2501 to backup device 2503. Change tracking driver 2514 is installed on the server that is running the database application 2501. Change tracking driver 2514 monitors changes to database files and records changes to those database files in a change-tracking bitmap (not shown, but discussed further herein).

In this exemplary approach shown in FIG. 25, a first backup (e.g., backup 2508) for each database file involves a full copy of the file to the backup device at a first backup time 2506. Subsequently, the changes to each database file, at subsequent backup times 2506, are captured in a native database format using the change-tracking driver 2514. During each incremental backup operation (e.g., incremental backups 2509, 2510, 2511, 2512, and 2513), the changed blocks within each database file are copied to copy of the file made during the previous backups on the backup device. Once changes to all files are copied to the backup device, a copy-on-write snapshot of the backup device is created to capture the point-in-time state of each database file. Each snapshot of backup device results in a full independent backup of the database 2509, 2510, 2511, 2512, and 2513 (e.g., because each snapshot includes references or pointers to both the original data and all changed data).

In this exemplary approach, only the changes made to the database files since the last backup are copied to the backup device during each incremental backup. However, each resultant backup image 2507 is a full point-in-time copy of the database in application native format as shown in backup layout 2505. Backup images 2508, 2509, 2510, 2511, 2512, and 2513 are all full copies of the database in the native format of the application that can be restored instantaneously. In some embodiments, the backups after the first initial backup (e.g., 2509-2513) reference the first backup (e.g., backup 2508) rather than copying all of the data for each incremental backup.

Each backup image on the backup device is a full, independent copy of the database in native database format and can be deleted without affecting any other backup images. For example, if backup 2510 is deleted, application 2501 can still be restored to any of backups 2511, 2512, or 2513. For example, backup 2511 includes a pointer to the original full backup data 2508, and also includes all of the changed data that was modified since backup 2508 (e.g., the changed data that is included in both backup 2509 and backup 2510, as well as any additional data that changed since backup 2510). Therefore, a restore operation simply loads the original data that is pointed to by the backup 2508, and merges in the changed data stored in backup 2511.

Figure 26A:
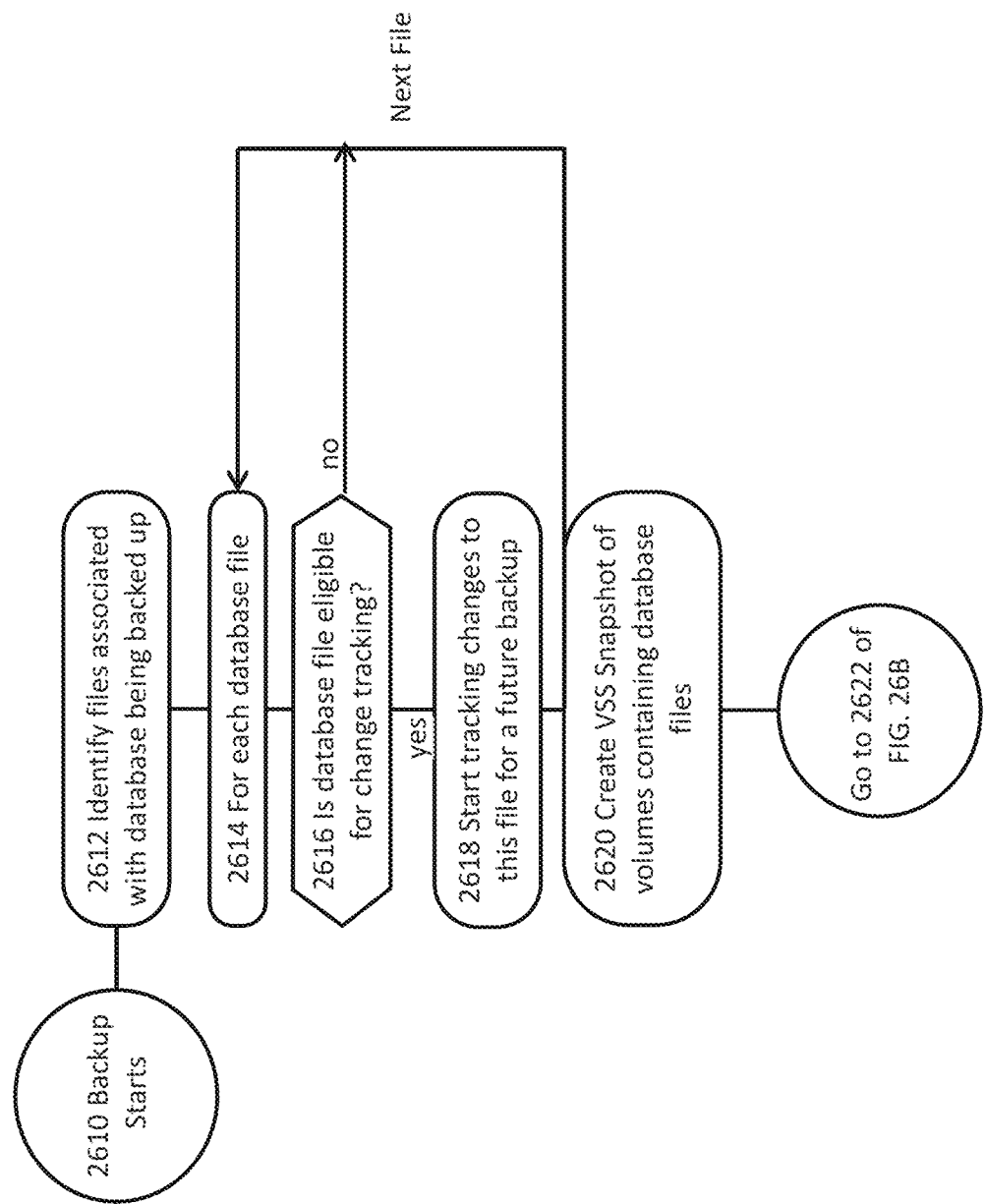

FIGS. 26A and 26B are exemplary flow charts illustrating a computerized method for incremental backup using a change tracking driver, according to some embodiments. Referring to FIG. 26A, a backup operation for a database starts at step 2610. The backup application identifies all data files for the database being backed up at step 2612. For each data file 2614, the backup application checks at step 2616 if the data file can be monitored for change tracking, and if so, the backup application starts a change tracking bitmap for the file at step 2618. The change tracking bitmap started in this step will record changes to the database file starting its creation time and will be used for the next backup. Referring to step 2616, criteria for change tracking can be pre-set for each file or file type. For example, a flag can be set for a file to indicate whether the file is eligible for change tracking based on file size and/or the type of file system. For example, it may not be worth tracking changes for a small file. As another example, it may only be desirable to backup a database for a particular type of file system (e.g., Microsoft Windows).

The backup application creates a VSS snapshot of all volumes that contain data files for the database at step 2620. U.S. patent application Ser. No. 13/920,976, entitled "System and Method for Providing Intra-Process Communication for an Application Programming Interface" addresses an example of a VSS snapshot process, which is hereby incorporated by reference herein in its entirety.

Referring to FIG. 26B, the method proceeds to step 2622 where, for each data file, the backup application checks if there is a change-tracking bitmap available that was created during the previous backup at step 2624. If the change-tracking bitmap is available and the bitmap is reliable (e.g., all the changes to the monitored file are recorded in the bitmap on disk successfully, monitoring process didn't terminate abnormally, etc.), the backup application retrieves the change-tracking bitmap for the file and copies each changed block from the database file from VSS snapshot to the backup device at step 2626. Once the changed blocks are copied for a data file to the backup device, the backup application deletes the change tracking bitmap used for this backup at step 2628.

Referring back to step 2624, if a change-tracking bitmap is not available for a file (e.g., if the file has not yet been backed up) or the contents of change-tracking bitmap are unreliable (e.g., all the changes to the monitored file are not recorded in the bitmap on disk successfully, monitoring process terminated abnormally etc.), then the entire file is copied to the backup device at step 2630. Once all files are copied to backup device, the backup application creates a snapshot of the backup device 2632 to preserve the point-in-time state of the backup device. The backup operation completes at step 2634 upon successful creation of snapshot.

FIG. 27 is an exemplary table illustrating the lifecycle of a change tracking bitmap, according to some embodiments. The table describes the lifecycle of change tracking bitmap(s) for each database file. During the first backup at backup time D1, a new bitmap with id 1 is created for a database file. This bitmap is used for tracking changes to the database file being monitored from the time of creation of the bitmap. During this backup, only one bitmap is in existence for the file. Since the bitmap was just created, it will not be used for incremental backup since there are not yet any changes to the file. Instead, the contents of the entire database file will be copied to the backup device.

At backup time D2, a second change tracking bitmap with bitmap id 2 will be created for the database file. During the backup operation, there are now two change tracking bitmaps in existence, one started at backup time D1 and the other started at backup time D2. Bitmap with id 1 will contain the record of changes made to the database file since the last backup made at time D1 until time D2, and the bitmap with id 2 is empty since there have not yet been any changes to the database file since D2. The bitmap with id 1 will be used for an incremental backup at backup time D2. Once the incremental backup is successful, the bitmap with id 1 will be deleted since the bitmap with id 2 is being used to track subsequent changes to the database file.

Each subsequent backup at times D3, D4, D5 and D6 will create a new change tracking bitmap with ids 3, 4, 5 and 6, respectively, for tracking changes to the database between the respective backup and the next backup. The new bitmap created at the beginning of last backup will be used for incremental backup of the database file during the following backup operation.

Figure 28:
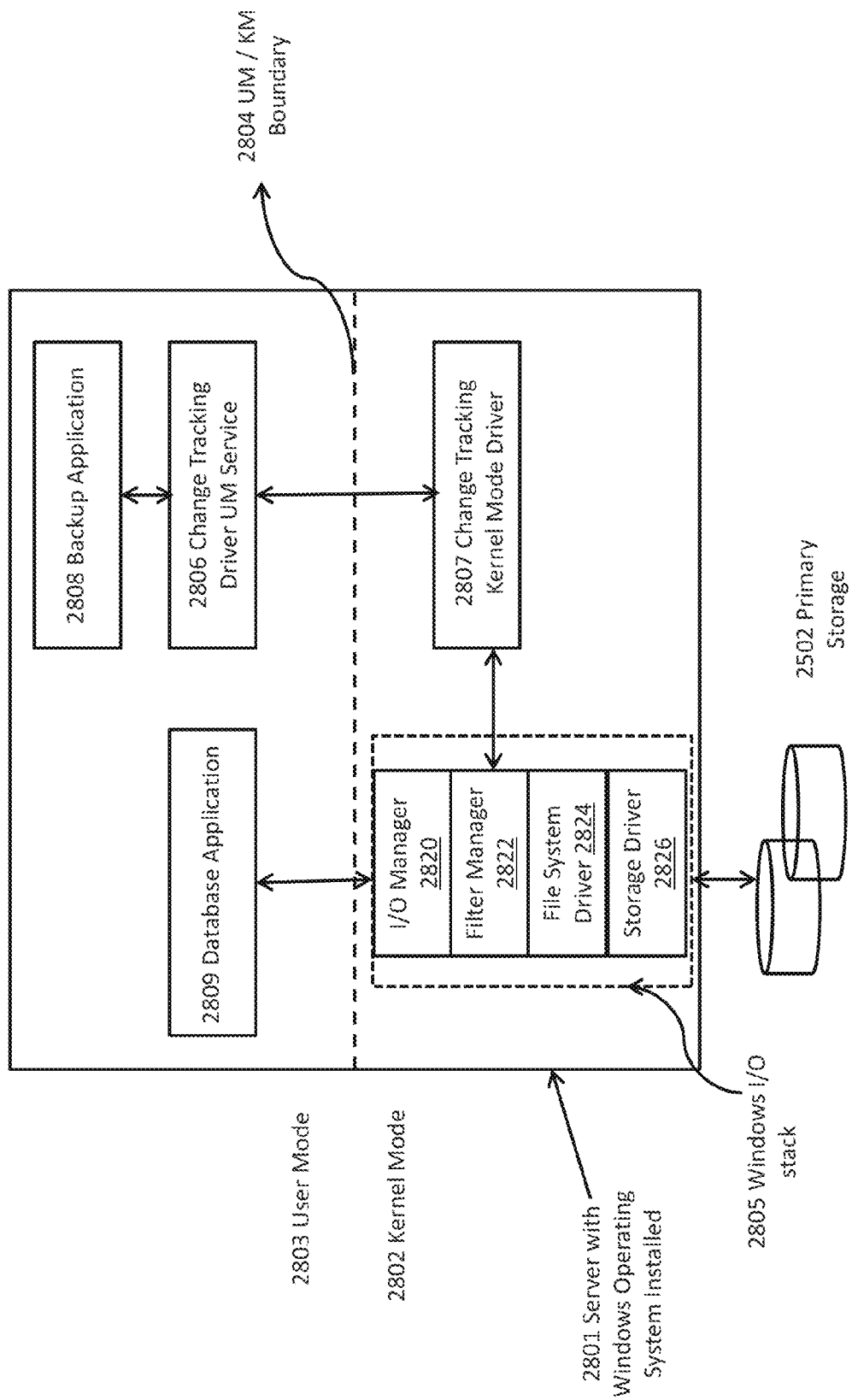
FIG. 28 is an exemplary diagram illustrating a change tracking driver deployment, according to some embodiments.

FIG. 28 is an exemplary diagram illustrating a change tracking driver deployment, according to some embodiments. As an illustrative non-limiting example, assume that the change tracking kernel mode driver is installed on a server 2801 with a Windows operating system (one of skill in the art can appreciate that any type of computer and/or operating system can be used without departing from the spirit of the techniques described herein). The change-tracking driver is composed of two components, a Kernel Mode (KM) windows min-filter driver 2807 located in kernel mode 2802 and User Mode (UM) 2803 service 2806 located in user mode 2803.

KM driver 2807 interacts with the filter manager 2822 in the windows I/O stack 2805, which includes the I/O manager 2820, the filter manager 2822, the File System driver 2824, and the storage driver 2826. Anytime database application 2809 modifies a file, the filter manager 2822 intercepts the I/O request and sends it to KM driver 2807. The KM driver 2807 checks if the file being modified needs to be monitored and notifies UM Service 2806, across the UM/KM Boundary 2804, if the file is being monitored. UM service 2806 is responsible for serving requests from backup application 2808 and manipulating change-tracking bitmaps in response to notifications for KM driver 2807. Backup application 2808 is responsible for performing actions necessary for backing up a desired database.

UM service 2806 records changes made to a monitored database file in a change-tracking bitmap. Each change-tracking bitmap is saved on the disk at a location chosen by backup application 2808. The on-disk copy of the bitmap is memory-mapped into UM service process 2806 for recording changes to the file. The modified bitmap is saved on the disk once the changes are recorded in the bitmap.

In some embodiments, all communication between KM driver 2807 and UM server 2806 is asynchronous to avoid, for example, database I/O performance degradation.

Figure 29:
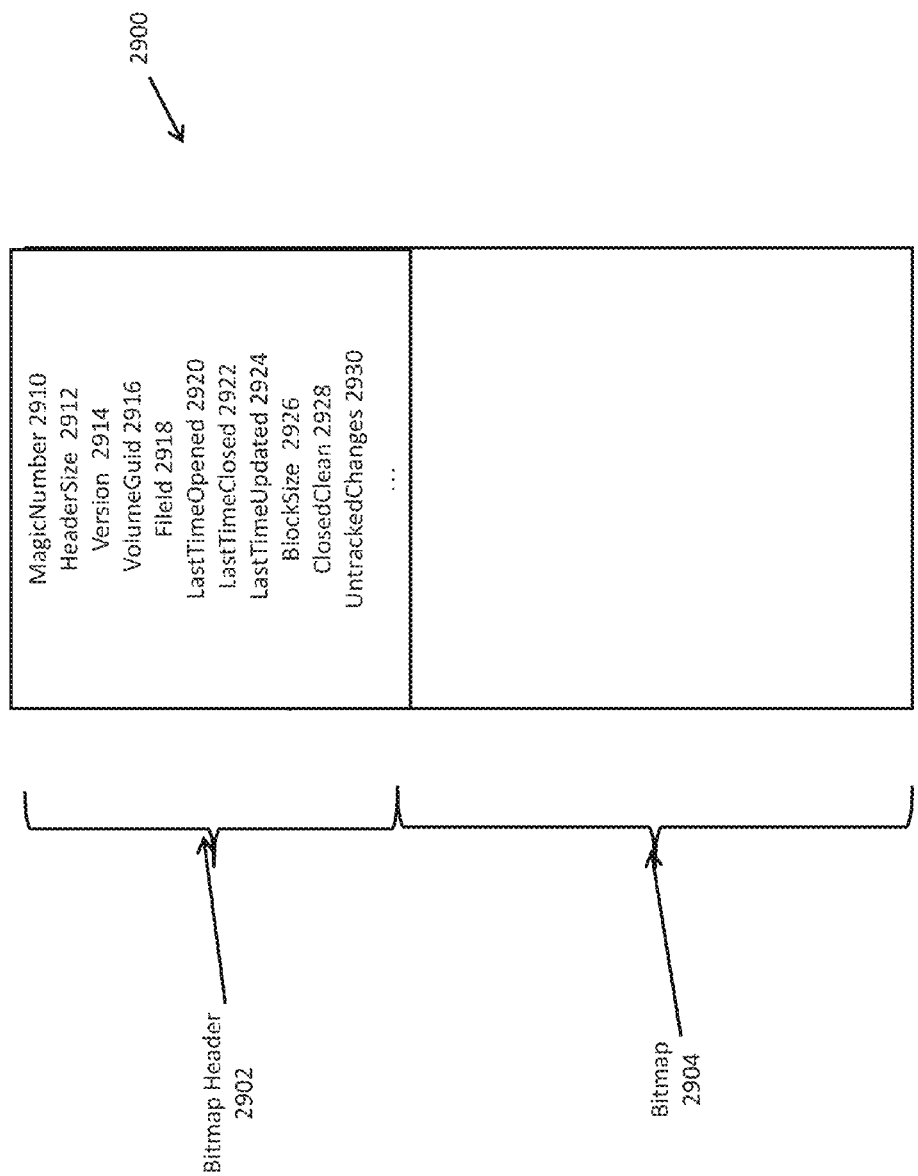
FIG. 29 is an exemplary diagram illustrating a change tracking bitmap, according to some embodiments.

FIG. 29 is an exemplary diagram illustrating a change tracking bitmap data structure 2900, according to some embodiments. The bitmap data structure 2900 consists of a header 2902 that describes the bitmap and its state. Immediately following the header 2902 is a bitmap 2904 that includes a record of changes made to the database file being monitored using this bitmap 2900.

The header 2902 can include various fields. The header 2902 in this example includes the following fields: Magic-Number 2910, HeaderSize 2912, Version 2914, VolumeGuid 2916, FileId 2918, LastTimeOpened 2920, LastTimeClosed 2922, LastTimeUpdated 2924, BlockSize 2926, Closed-Clean 2928 and UntrackedChanges 2930. Field MagicNumber 2910 is a unique identifier used to indicate that a bitmap is created by this change tracking driver. Field HeaderSize 2912 indicates the size of the bitmap header. Field Version 2914 indicates the version of the bitmap format. Field VolumeGuid 2916 indicates the file system volume the monitored file resides on. Field FileId 2918 is the file identifier for the monitored file. Field LastTimeOpened 2920 indicates the last time the bitmap file on disk was opened for reading or modification. Field LastTimeClosed 2922 indicates the time the bitmap file on disk was closed the last time. Field LastTimeUpdated 2924 indicates the time the bitmap was updated the last time. Field BlockSize 2926 indicates the grain size used for tracking changes to monitored file.

There are two fields in this example, ClosedClean 2928 and UntrackedChanges 2930, in bitmap header 2902 that help determine the reliability of each bitmap. Field Closed-Clean 2928 indicates that the bitmap was saved on the disk successfully after recording file changes in the bitmap. This field is set to FALSE when a bitmap is opened for modification. The field is set to TRUE when the bitmap is saved to the disk. Backup application can discard a bitmap as unreliable if this field is set to FALSE when a bitmap is retrieved for backup operation.

Field UntrackedChanges 2930 indicates whether there were changes made to the file being monitored that were not recorded in the change-tracking bitmap. This can happen for a number of reasons including UM service crash, malfunctioning of software etc. Backup application can discard a bitmap as unreliable if this field is set to TRUE when a bitmap is retrieved for backup operation.

Figure 30:
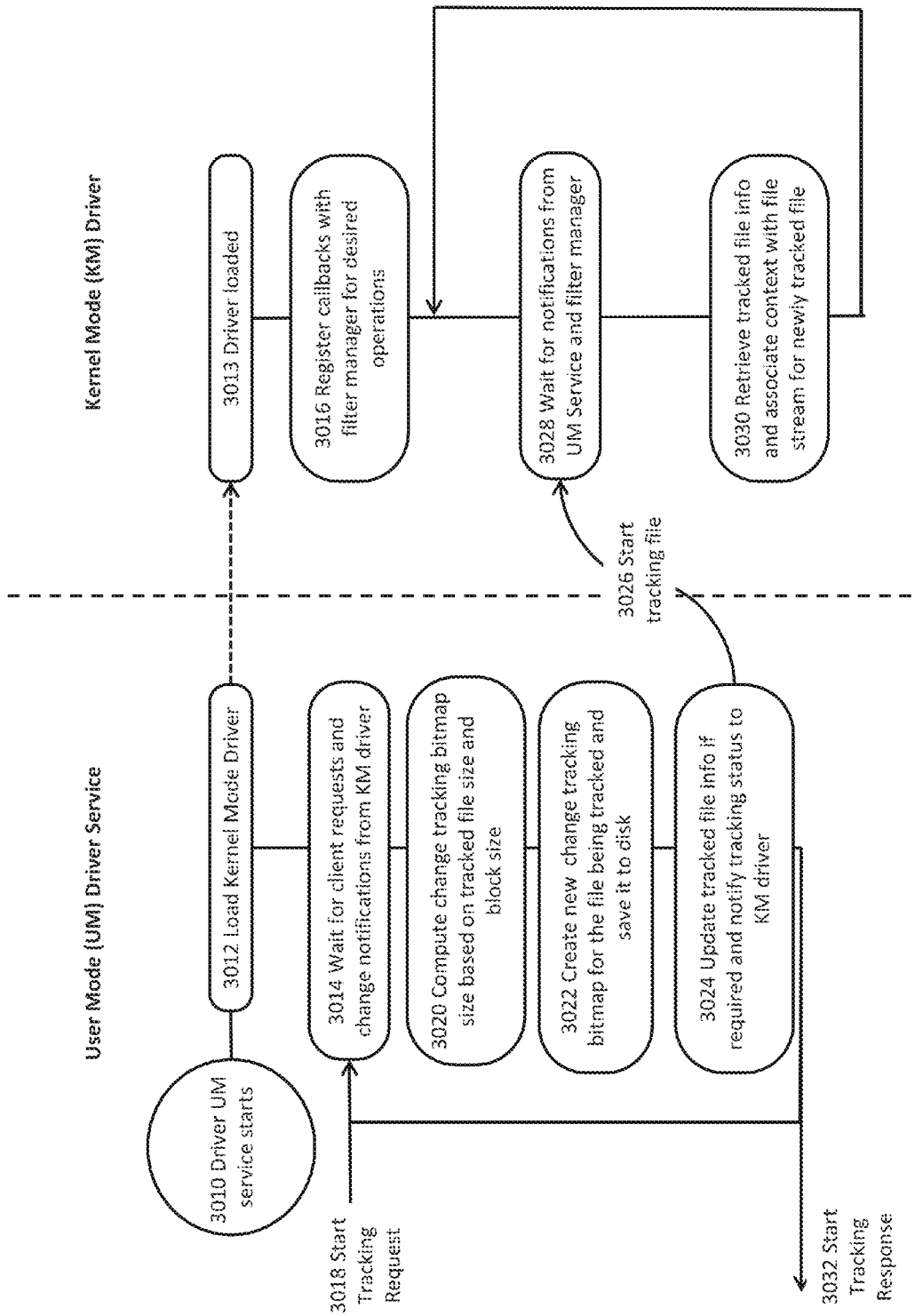
FIG. 30 is an exemplary flow chart illustrating a computerized method for starting change tracking for a file, according to some embodiments.

FIG. 30 is an exemplary flow chart illustrating a computerized method for starting change tracking for a file, according to some embodiments. UM driver service starts at step 3010. It loads KM driver at startup at step 3012 and waits for client requests and notifications from KM driver at step 3014. KM driver is loaded 3013, and registers callbacks with Filter Manager so that it gets notified when certain file operations such as file creation, deletion, modification etc. occur at step 3016. KM driver then waits to receive notifications from either the UM service or the Filter Manager at step 3028.

When a request to start a new change-tracking bitmap for a file is received from backup application at step 3018, UM service computes the size of the new bitmap using the size of file being tracked and the block size backup application requested for change tracking at step 3020. It then creates a new bitmap and saves it to a file on disk at step 3022. If this is the first bitmap started for the file, UM service updates the list of tracked file at step 3024 and notifies the KM driver that a new file tracking has been started at step 3026. UM service also begins tracking a response 3032. At step 3030, in response to the notification, KM driver associates a context with the file being tracked to indicate file-tracking status. KM driver then relies on the associated context to determine if file change notifications for the file should be sent to the UM service. Tracked file information can be stored in a file on a disk or in windows registry.

Figure 31:
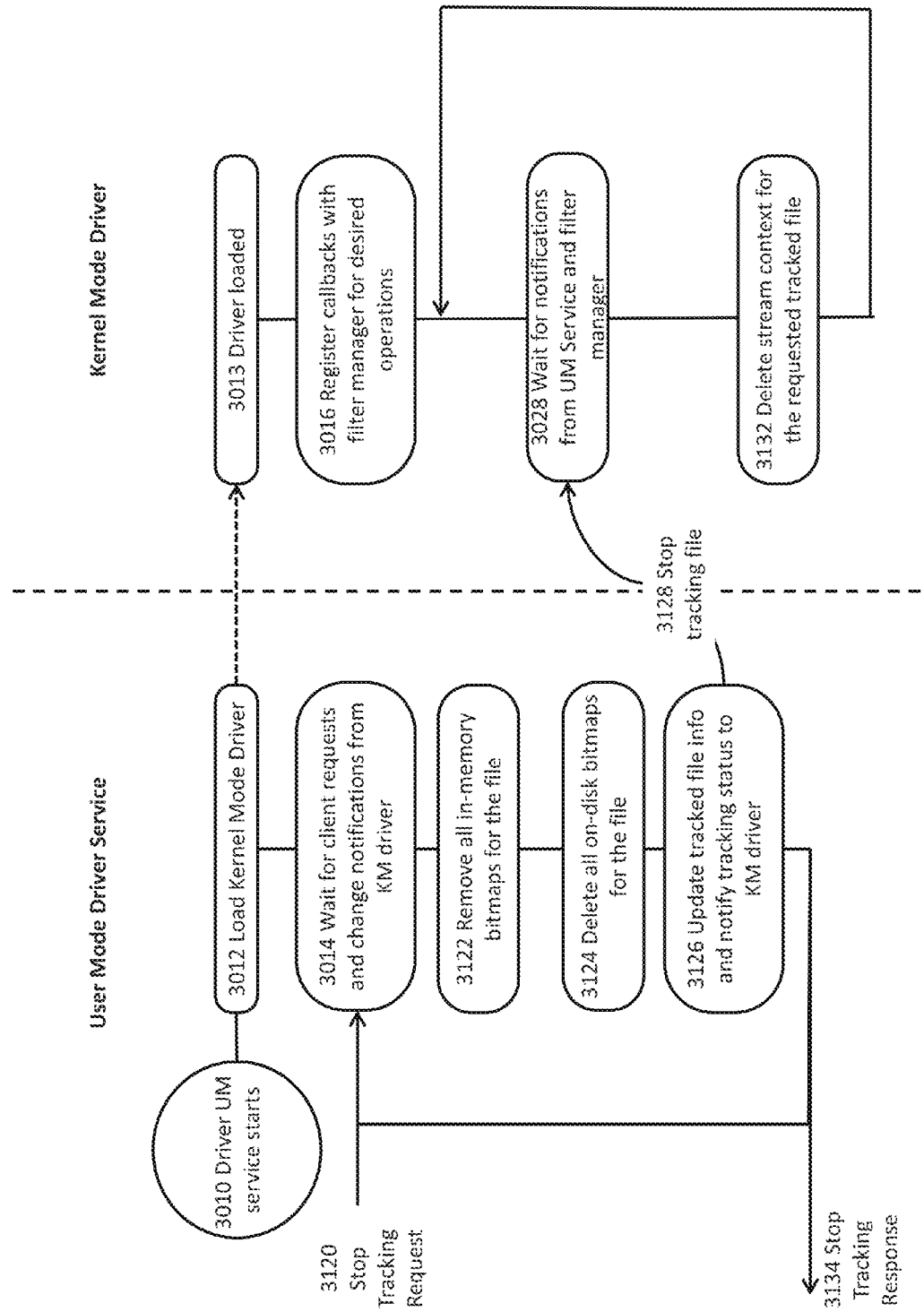
FIG. 31 is an exemplary flow chart illustrating a computerized method for terminating change tracking for a file, according to some embodiments.

FIG. 31 is an exemplary flow chart illustrating a computerized method for terminating change tracking for a file, according to some embodiments. This operation can be performed, for example, when a database no longer needs to be backed up or when a backup application wants to discard all change tracking bitmaps for a file. When a stop-tracking request for a file is received from a backup application at step 3120, UM service first removes all in-memory bitmaps for the file at step 3122. It then deletes all on-disk bitmaps for the file at step 3124. UM service removes the file from list of tracked file at step 3126 and notifies KM driver, which waits for notifications from the UM Service 3028, that the file tracking has been stopped at step 3128. In response to notification from UM service, KM driver deletes the context previously associated with the tracked file at step 3132 and UM Mode Driver Service stops monitoring the file 3134.

Figure 32:
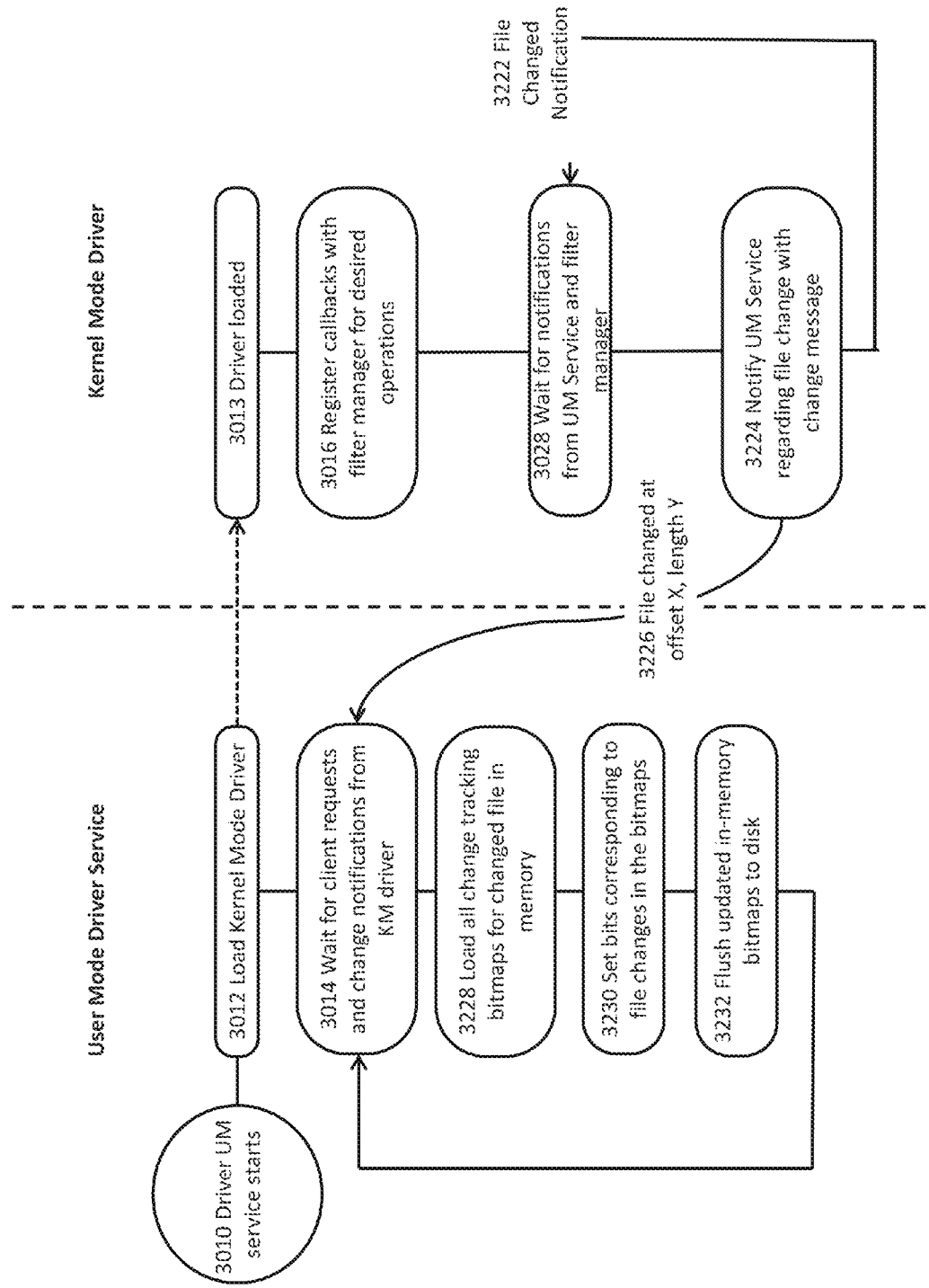
FIG. 32 is an exemplary flow chart illustrating processing of file modification notifications from the system, according to some embodiments.

FIG. 32 is an exemplary flow chart illustrating file modification notifications from the system, according to some embodiments. Filter Manager notifies KM driver when a file gets modified at step 3222. KM driver checks the context associated with the file and notifies UM Service 3224 of the change if the file is monitored at step 3226. In response to file change notification from KM driver, UM service loads all change-tracking bitmaps for the file in memory at step 3228. UM service computes the bits to set in bitmap using offset and length received with file change notification and the block size used for monitoring the file. UM service then sets the bits in bitmap at step 3230 and saves the modified bitmaps to disk at step 3232. This completes the processing of file change notification and UM service waits for additional notifications from KM driver.

Figure 33:
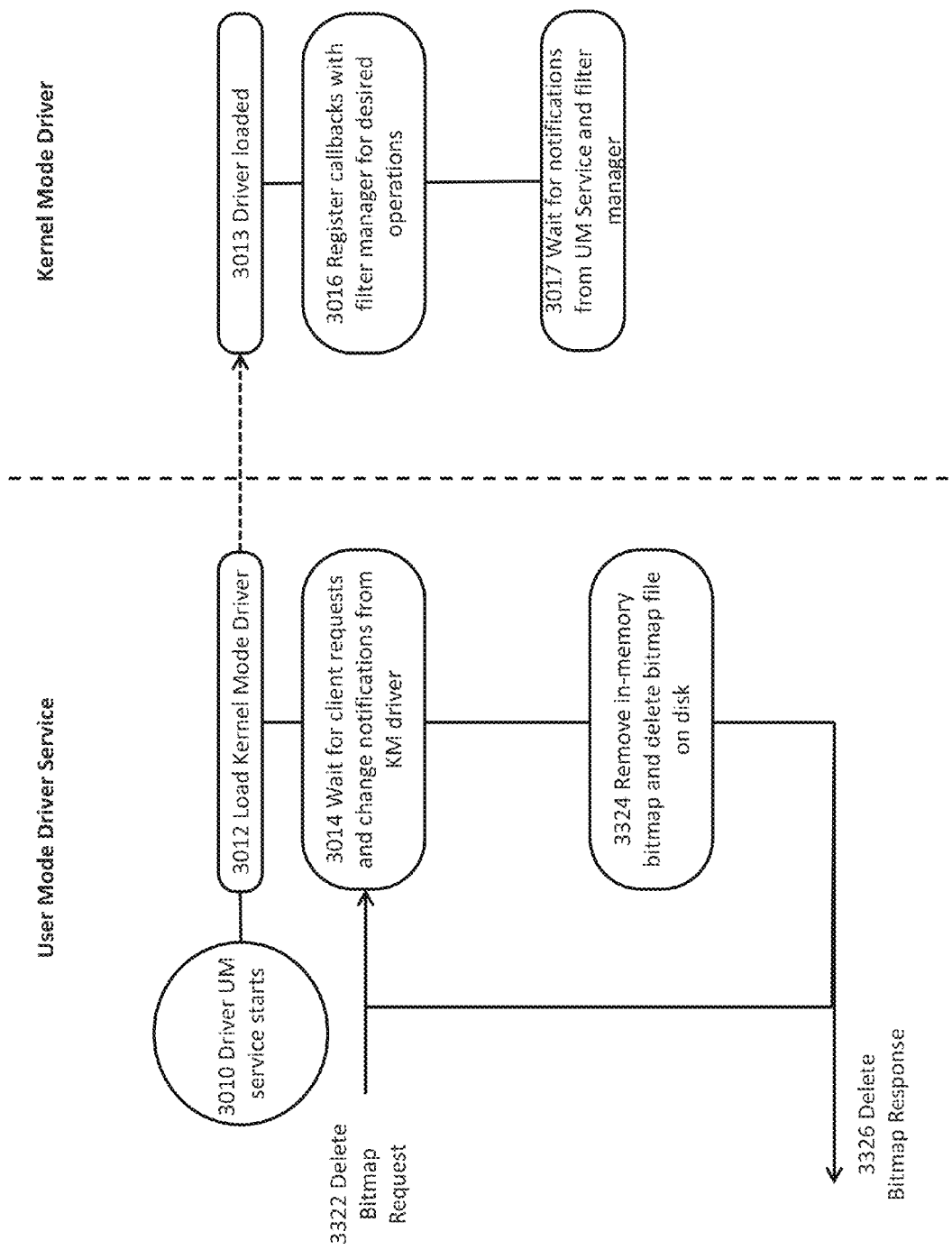
FIG. 33 is an exemplary flow chart illustrating a computerized method for deleting a change tracking bitmap, according to some embodiments.

FIG. 33 is an exemplary flow chart illustrating a computerized method for deleting a change tracking bitmap, according to some embodiments. UM service receives request to delete change-tracking bitmap from backup application at step 3322. In response to the request, UM service removes the bitmap from memory and deletes the bitmap on disk at step 3324. UM service then sends response to backup application at step 3326 and starts waiting for new requests.

This method can also be used for backing up Virtual Machines hosted by a hypervisor such as a Microsoft Hyper-V Server by installing the backup application and change tracking driver on the hypervisor. In some embodiments of this configuration, the backup application and the change tracking driver are installed on the hypervisor and not inside any of the hosted Virtual Machines.

Storage allocated to Virtual Machines are Virtual Hard Disk files (for example VHD, VHDx, AVHDx files for Hyper-V Server) hosted on native file system on the hypervisor. These files can be backed up in their native format using change tracking driver. These Virtual Hard Disk files can be presented to any hypervisor to access and retrieve data that was backed up previously.

In addition to the Virtual Hard Disk files, configuration files for each VM can be backed up. This allows for reconstructing an exact clone of a Virtual Machine when access to the previously backed up state of Virtual Machine is needed.

Backup of Virtual Machines in native format can allow for near instant restore and/or cloning of previously backed up VM by presenting a copy of previously backed up Virtual Disk Files to any hypervisor. This can reduce impact on business in case of disasters and provides for business continuity.

Figure 34:
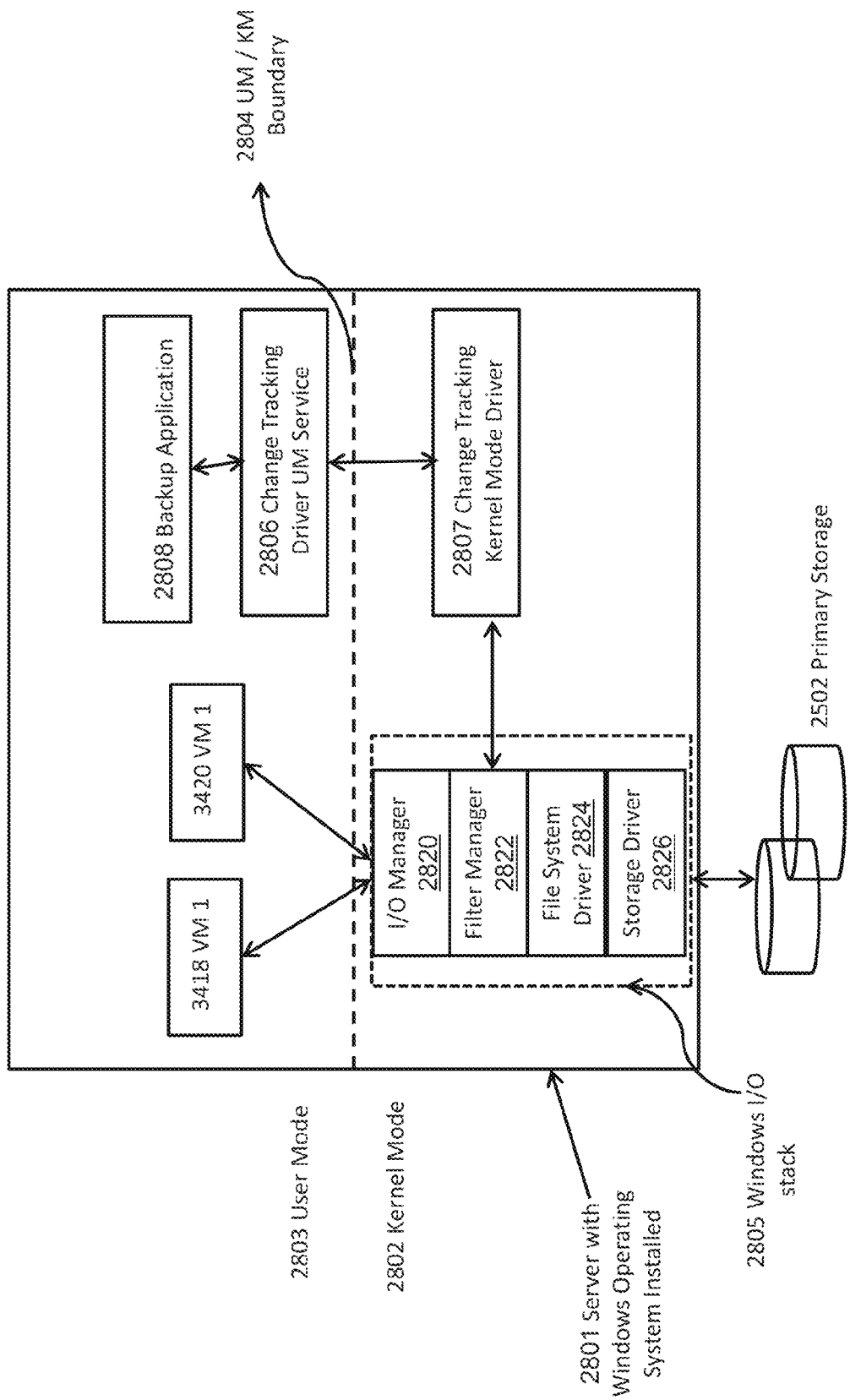
FIG. 34 is an exemplary diagram illustrating a change tracking driver deployment on Hyper-V Server, according to some embodiments.

FIG. 34 is an exemplary diagram illustrating a change tracking driver deployment on Hyper-V Server, according to some embodiments. As an illustrative nonlimiting example, assume that change tracking kernel mode driver is installed on Hyper-V Server 2801 (one of skill in the art can appreciate that any type of computer and/or operating system can be used without departing from the spirit of the techniques described herein). The change tracking driver is composed of two components, a Kernel Mode (KM) windows minifilter driver 2807 and User Mode (UM) service 2806.

KM driver 2807 interacts with filter manager 2822 in the windows I/O stack 2805, which includes the I/O Manager 2820, the filter manager 2822, the File System driver 2824, and the storage driver 2826. Anytime any data is written to one of the disks in Virtual Machines 3418, 3420, a Virtual Hard Disk file gets modified. The filter manager in the hypervisor I/O stack intercepts the modification request and sends it to KM driver 2807. The KM driver checks if the Virtual Disk file needs to be monitored and notifies UM Server 2801 if needed. In response to I/O notification from KM driver 2807, UM service 2806 updates the change tracking bitmap for the file. Backup application 2808 is responsible for performing actions necessary to backup the desired Virtual Machine.

In some embodiments, communication between KM driver 2807 and UM service 2806 is performed asynchronously to avoid, for example, I/O performance degradation for the Virtual Machine.

Some embodiments of the present disclosure describe a computerized method of creating an incremental backup of application data by creating a snapshot associated with a current incremental backup of a data file using a change tracking bitmap such that a data file associated with the current incremental backup can be restored from just the snapshot associated with the current incremental backup and an initial backup without needing to access one or more previously generated incremental backups of the data file, each created at an earlier point in time than the point in time for the current incremental backup, the method comprising: receiving, by a computing device, a data file to be monitored by the computing device; identifying, by the computing device, a prior change tracking bitmap associated with the data file, the prior change tracking bitmap comprising data indicative of changes made since a backup created at an earlier point in time than the point in time for the current incremental backup; determining, by the computing device, blocks of data of the data file changed since the prior change tracking bitmap for the prior incremental backup; transmitting, by the computing device, to a backup device blocks of data of the data file changed since the prior change tracking bitmap for the prior incremental backup; and creating, by the computing device, a copy-on-write snapshot of the backup device to capture a point-in-time state of the data file, such that the data file associated with the current incremental backup can be restored from just the snapshot associated with the current incremental backup and the initial backup without needing to access one or more previously generated incremental backups of the data file, each created at an earlier point in time than the point in time for the current incremental backup.

In some embodiments, the backup device includes data indicative of all changes made for each of a set of backups created at an earlier point in time other than the point in time for the current incremental backup. The method can further include transmitting instructions, from a computing device, to a backup application to create a current change tracking bitmap associated with the current incremental backup for tracking changes to the data file after the current incremental backup. The method can further include deleting, by the computing device, the prior change tracking bitmap after creating the current change tracking bitmap. In some embodiments, if the change tracking bitmap does not exist, the method can further include transmitting instructions to the backup application to copy the entire data file to create an initial backup of the data file and to create an initial change tracking bitmap for tracking changes made to the data file after generation of the initial backup. In some embodiments, if the data file has a prior change tracking bitmap the method can further include determining if the prior change tracking bitmap is reliable. Receiving, by a change tracking drive, a data file to be monitored further can further include determining if the data file is eligible for change tracking. In some embodiments, the data file comprises at least one of a database file and a virtual file. In some embodiments, the virtual file comprises at least one of a configuration file and a virtual hard disk file for a virtual machine, facilitating near instant restore and cloning of previously backed up virtual machines. In some embodiments, the backup created at an earlier point in time comprises a backup created most recent in time to the current incremental backup.

Data Cloning

Backup images of an application are often created based on a pre-defined service level agreement ("SLA") that defines the frequency of the backup (e.g., daily, weekly, monthly, etc.) and other parameters, such as the application source, the backup target, etc. Over time, a backup SLA often results in multiple backup images being created for the application. Differences between backup images are often captured as a set of bitmaps. It is often desirable to instead generate a live copy of the application, such as for testing and development purposes. It is further often desirable to remove sensitive data (e.g., confidential information, such as social security numbers, account numbers, passwords, etc.) from the live copy of the application before using the live copy for testing and development.

The disclosed techniques enable creating space-efficient, policy-independent copies of backup images that can be leveraged to provide a mechanism for rapid test-and-development capabilities, referred to herein as live clone images. The live clone is an exact copy of a backup image. It is a "live" copy of production data such that data as it is being stored can be mounted/executed without needing to change the data format, compared to storing deduplicated data or snapshots, which cannot be mounted/executed as stored. A synthesized bitmap can be created based on bitmaps associated with subsequent backups since the creation of the live clone. The synthesized bitmap can be used to refresh the live clone by only copying changed data indicated in the synthesized bitmap. The live clone image can be prep-mounted for a scrub operation (e.g., to remove sensitive information before testing or development), which includes generating both a copy of the live clone and a bitmap indicative of the data scrubbed during the scrub operation. If the scrub operation is approved, then the bitmap and copy can be discarded. If the scrub operation is not approved, the bitmap can be used to copy only changed data from the copy of the live clone.

Figure 35:
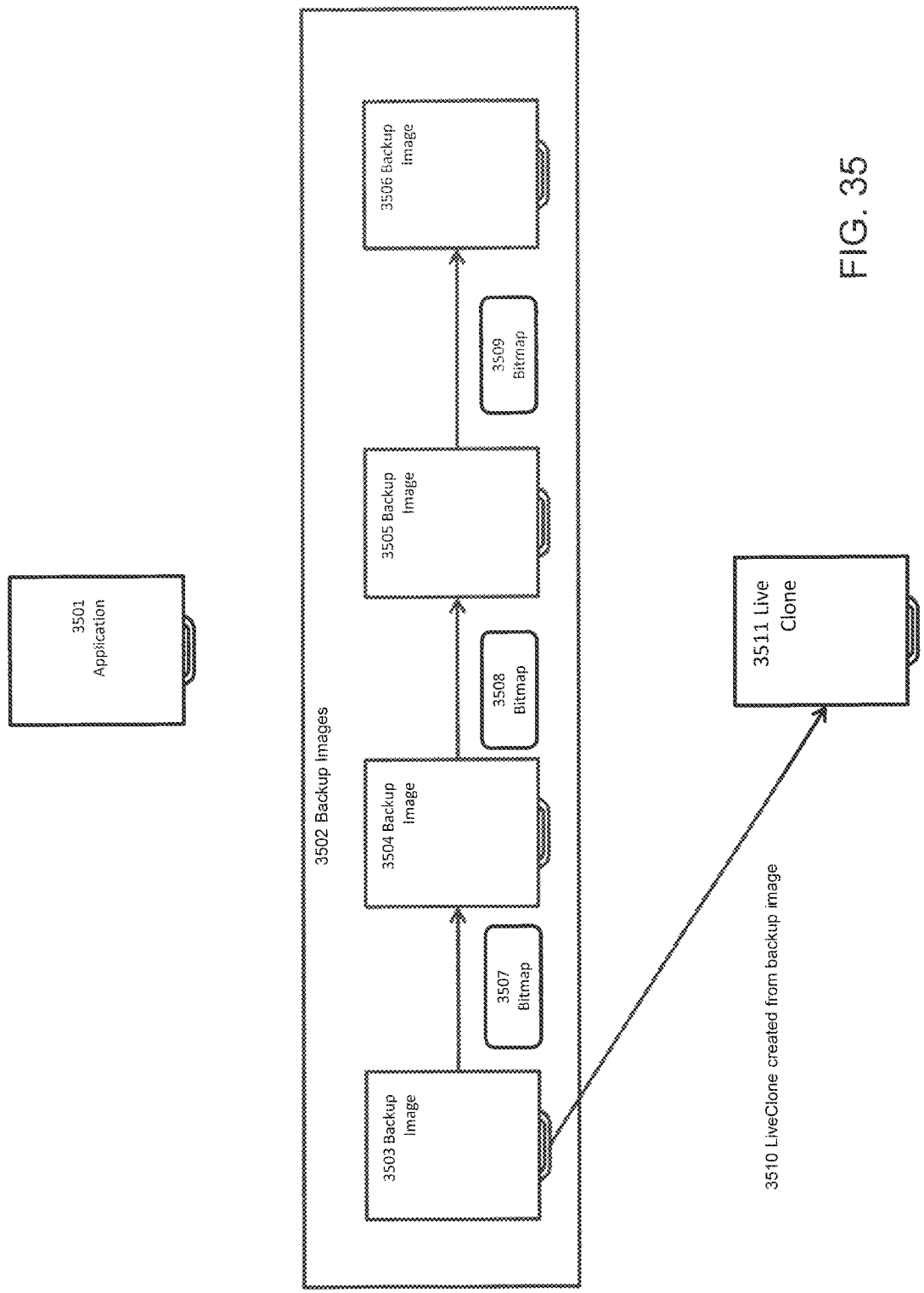
FIG. 35 is an exemplary diagram illustrating the creation process of a live clone image from a backup image of application, according to some embodiments.

FIG. 35 is an exemplary diagram illustrating the creation process of a live clone image from a backup image of application 3501, according to some embodiments. Backup images 3502 of application 3501 are created based on a pre-defined SLA. Over time this will result in multiple backup images 3503, 3504, 3505, 3506 being created for the application 3501. Differences between backup images are captured as a set of bitmaps 3507, 3508, 3509 for backup image 3504, 3505, and 3506, respectively.

The live clone is created, as indicated via arrow 3510, by copying data blocks from the source backup image 3503 into a new live clone image 3511. At the end of the live clone creation process the live clone image 3511 is an exact copy of the source backup image 3503.

Figure 36A:
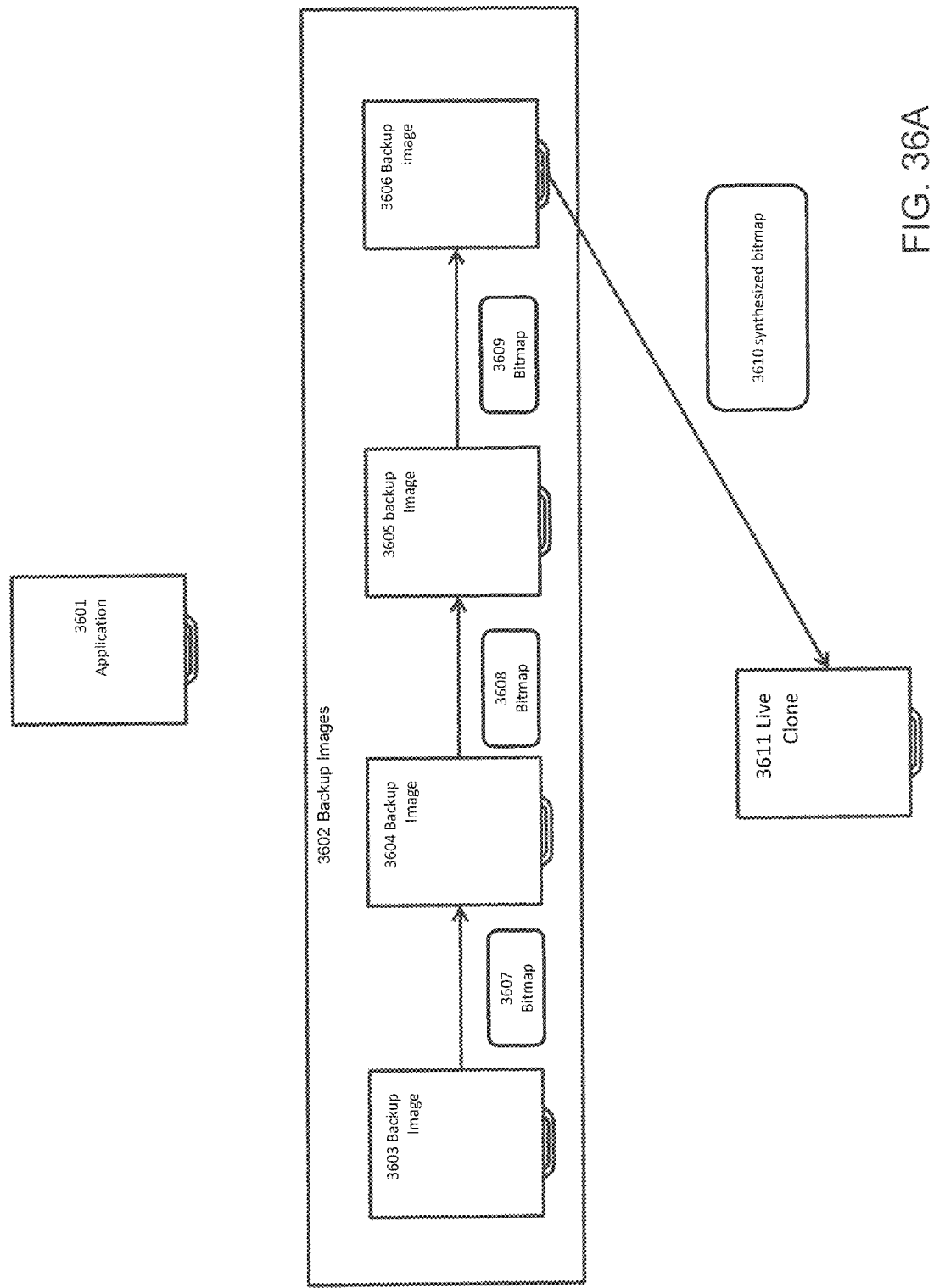
FIG. 36A is an exemplary diagram illustrating the refresh process for a live clone image from a previously created backup image of an application, according to some embodiments.

FIG. 36A is an exemplary diagram illustrating the refresh process for live clone image 3611 from a previously created backup image 3606, according to some embodiments. As described above for FIG. 35, backup images 3602 of application 3601 are created based on a pre-defined SLA, resulting in backup images 3603, 3604, 3506, and 3606 and associated bitmaps 3607, 3608, and 3609. The live clone 3611 can be refreshed by creating a synthesis of all prior backup images (e.g., bitmaps 3607, 3809, and 3609), as indicated via arrow 3610. The synthesized bitmap 3610 can be used to only copy changed data blocks into the existing live clone image 3611.

Figure 36B:
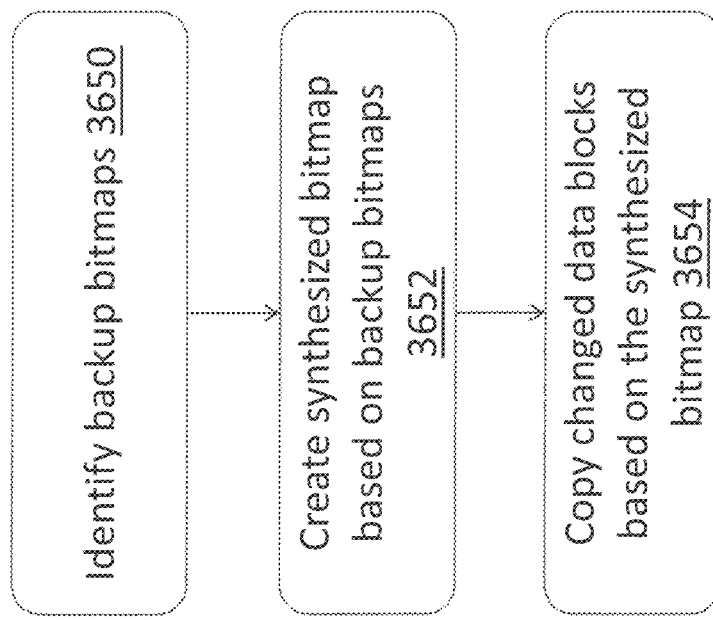
FIG. 36B is an exemplary diagram illustrating a computerized method for refreshing a live clone image from a previously created backup image of an application, according to some embodiments.

FIG. 36B is an exemplary diagram illustrating a computerized method for the refresh process shown in FIG. 36A, according to some embodiments. At step 3650, the backup bitmaps (e.g., flash-copy bitmaps maintained by the hardware) generated between the most recent backup image used to create or refresh the live clone image (e.g., backup image 3603) and the backup image to which the live clone is to be refreshed (e.g., backup image 3606) are identified. At step 3652, a synthesized bitmap is created based on the bitmaps identified in step 3650 (e.g., bitmaps 3607, 3608, and 3609). At step 3654, the changed data blocks are copied based on the synthesized bitmap. At the end of the refresh operation the live clone image 3611 is an exact copy of the source backup image 3606. For example, U.S. patent application Ser. No. 13/920,981, entitled "Smart Copy Incremental Backup," describes an example of bitmaps or extents that can be used with the techniques described herein, which is hereby incorporated by reference herein in its entirety.

Referring to step 3654, once the changed blocks are identified using the bitmap, the corresponding blocks are copied from the disks belonging to the source image to the disks belonging to the destination volume.

Figure 37:
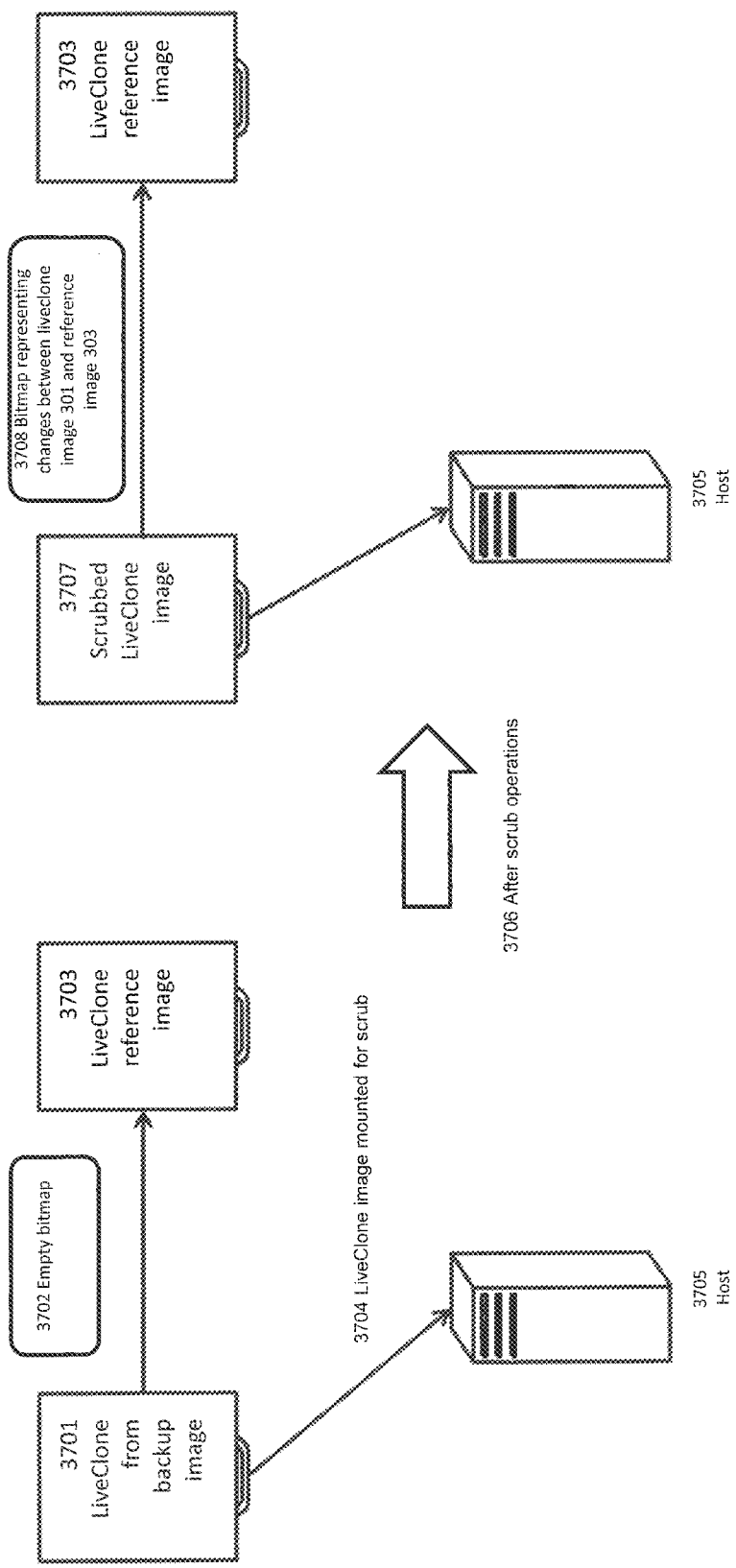
FIG. 37 is an exemplary diagram illustrating the prep-mount process for a live clone image to scrub the live clone image, according to some embodiments.

FIG. 37 is an exemplary diagram of the prep-mount process for a live clone image which has been previously created (e.g., as described in FIG. 35) or refreshed (e.g., as described in FIGS. 36A and 36B) to scrub the live clone image, according to some embodiments.

The prep-mount operation is different from a traditional mount operation in that the prep-mount operation is used to scrub sensitive data from the live clone backup image 3701 before it is used (e.g., for development and/or testing). In some embodiments, during a prep-mount of a live clone, a reference image 3703 of the live clone is created. The live clone reference image 3703 contains flash-copies of the disks that are contained within the live clone image 3701. The system can use a bitmap to keep track of changes the host 3705 makes to the live clone 3701. Because the reference image 3703 is created from the live clone image 3701 before the live clone image 3701 is mounted to the host 3705 (e.g., and therefore before any changes are made by the host 3705), there is an empty bitmap 3702 associated with the flash-copy mapping between the live clone image 3701 and the reference image 3703.

The host 3705 can modify the contents of the live clone image 3701 one it is mounted, as indicated by arrow 3704, to the specified host 3705. The scrub operation 3706 therefore creates a modified live clone image 3707 that is different from the original live clone image 3701, which is therefore also different than the reference image 3703. These changes are represented by the bitmap 3708 that indicates the changes made by the host 3705. For example, if a production database contains sensitive information like social security numbers, a scrub operation would be necessary, where the liveclone image is mounted to a scrubbed host and scripts run against the mounted image to mask the social security numbers. For example, U.S. Provisional Patent Application No. 61/905,342, entitled "Test-and-Development Workflow Automation," provides an exemplary use of a liveclone during a workflow automation, which is hereby incorporated by reference herein in its entirety.

Figure 38A:
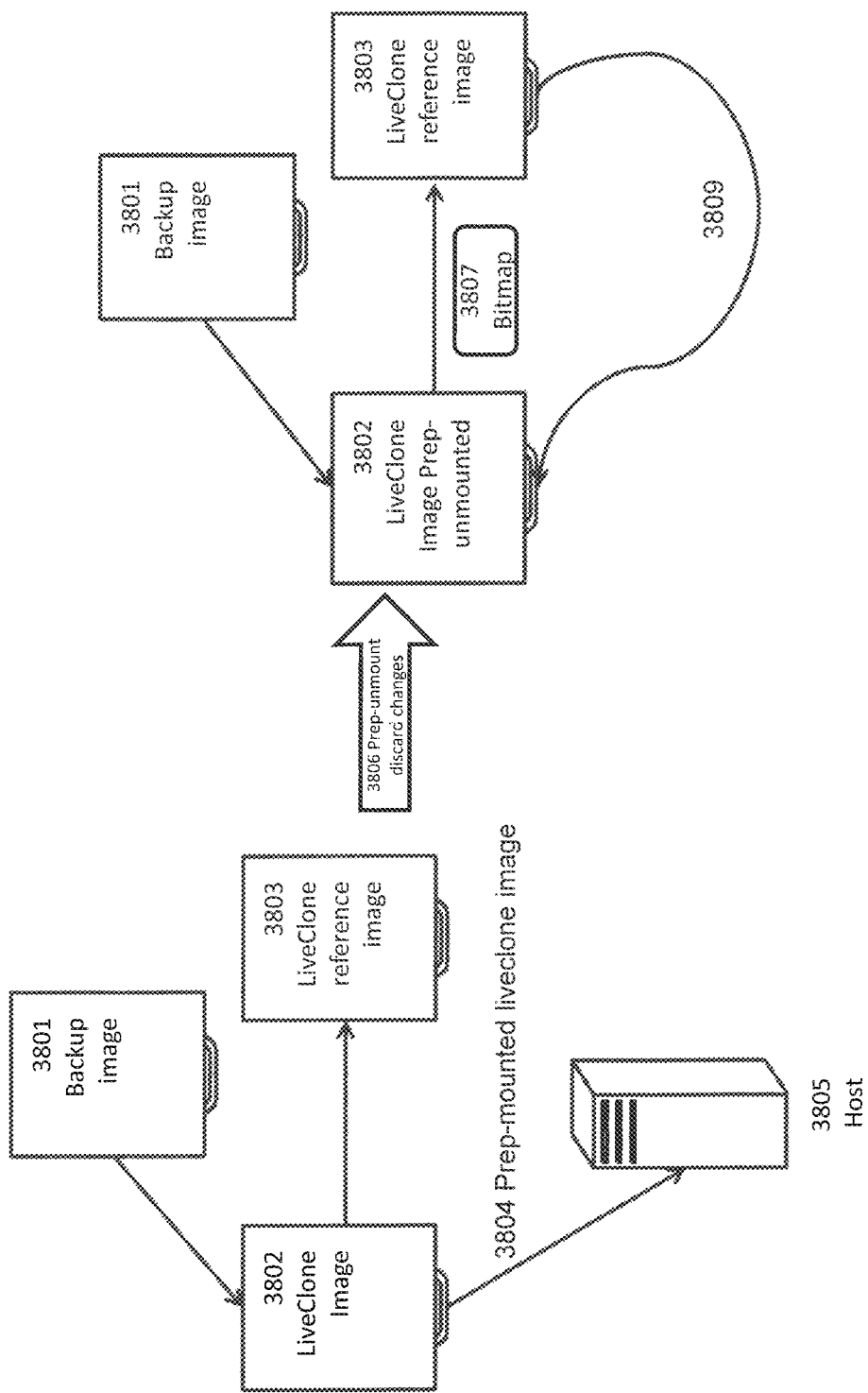
FIGS. 38A and 38B are exemplary diagrams illustrating a prep-unmount operation on a live clone image that has been prep-mounted to a host, according to some embodiments.
Figure 38B:
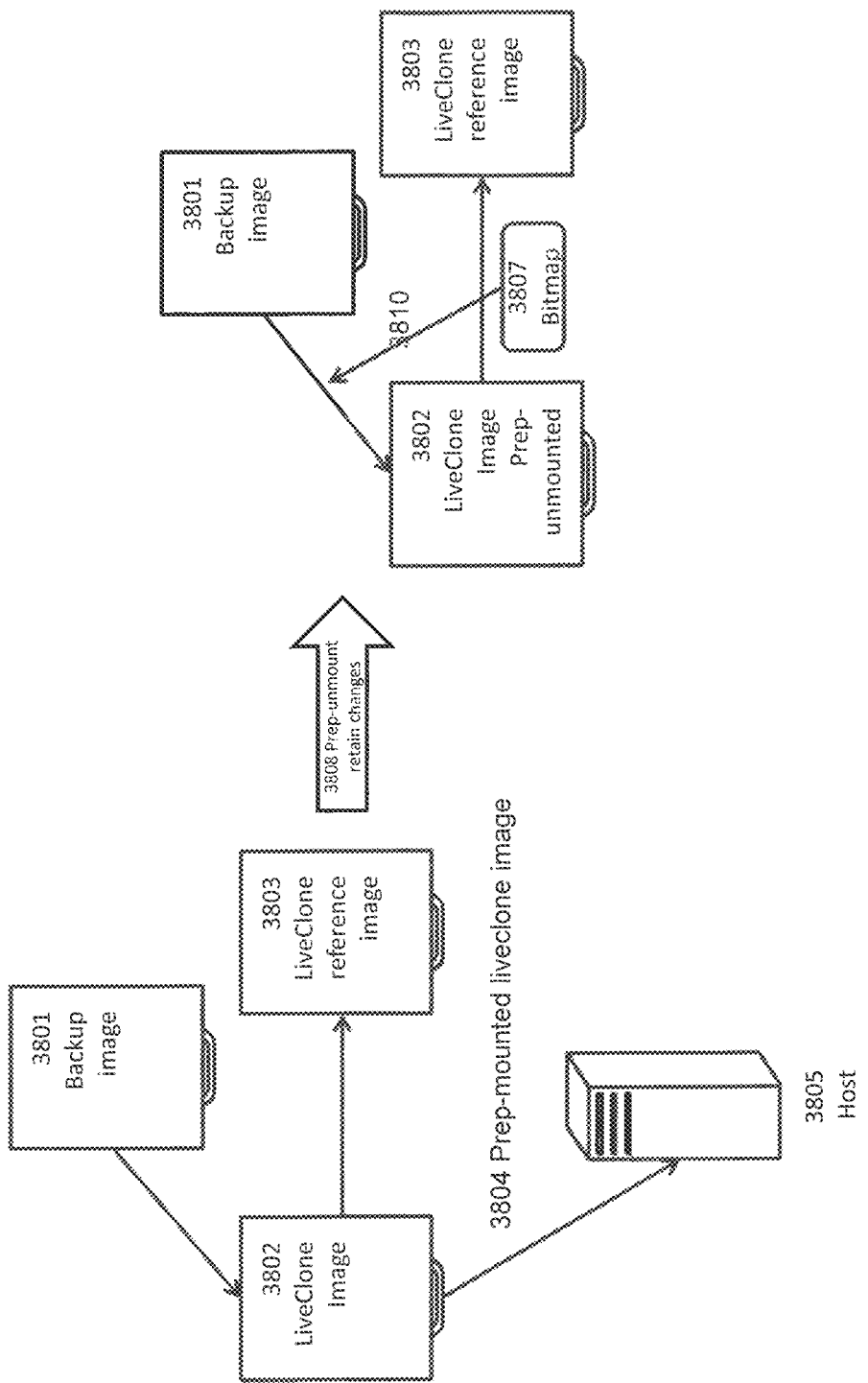

FIGS. 38A and 38B are exemplary diagrams illustrating the prep-unmount operation on a live clone image 3802 that has been created (e.g., as described in FIG. 35) or refreshed (e.g., as described in FIGS. 36A and 36B) from a backup image 3801, and which that has been prep-mounted 3804 to a host 3805 (e.g., as described in FIG. 3). During prep-unmount operation the user can choose to either discard (e.g., as shown via arrow 3806 in FIG. 38A) the changes made to the prep-mounted live clone image 3802 or to preserve the changes (e.g., as shown via arrow 3808 in FIG. 38B) made to the live clone image 3801.

Referring to FIG. 38A, if the user decides to discard 3806 the changes made to the prep-mounted live clone image 3802 (e.g., the changed made during the scrub operation), then the bitmap 3807 can be used to reverse the changes. The bitmap 3807 maintains the changes between the live clone image 3802 and the live clone reference image 3803. The bitmap 3807 can be used to generate a list of changed blocks that will be copied, as indicated via arrow 3809, from the disks within the reference image 3803 to the live clone image 3802. Therefore, arrow 3809 indicates a bitmap-based incremental data transfer to restore the contents of the live clone image 3802 after the live clone image 3807 is unmounted from the host 3805. At the end of the copy operation 3809 the live clone reference image 3803 is discarded.

Referring to FIG. 38B, if the user decides to retain the changes made to the live clone image 3802, then the bitmap 3807 that represents the changes between the prep-mounted (e.g., described in FIG. 37) live clone image 3802 and the reference image 3803 is now preserved and associated with the live clone image 3802 and its source image 3801, as indicated via arrow 3810. The bitmap captures data that has been changed since the liveclone image was prep-mounted. This allows the user to "discard" changes made to the live clone. At the end of the prep-unmount operation, the reference live clone image 3803 is discarded.

Workflow Automation

Traditional means to provision up-to-date data for development and testing of business applications often involve a lot of manual processes and require coordination from multiple parties with distinct skill sets. It is rare that organizations have efficient test data management software to manage the movement of data in support of their development efforts. Because of this, a typical development project might require 5 to 10 individual copies of a production database and drive 50+ TB of storage requirements. And the time to provision 50 TB of copies for test and development can take weeks.

Figure 39A:
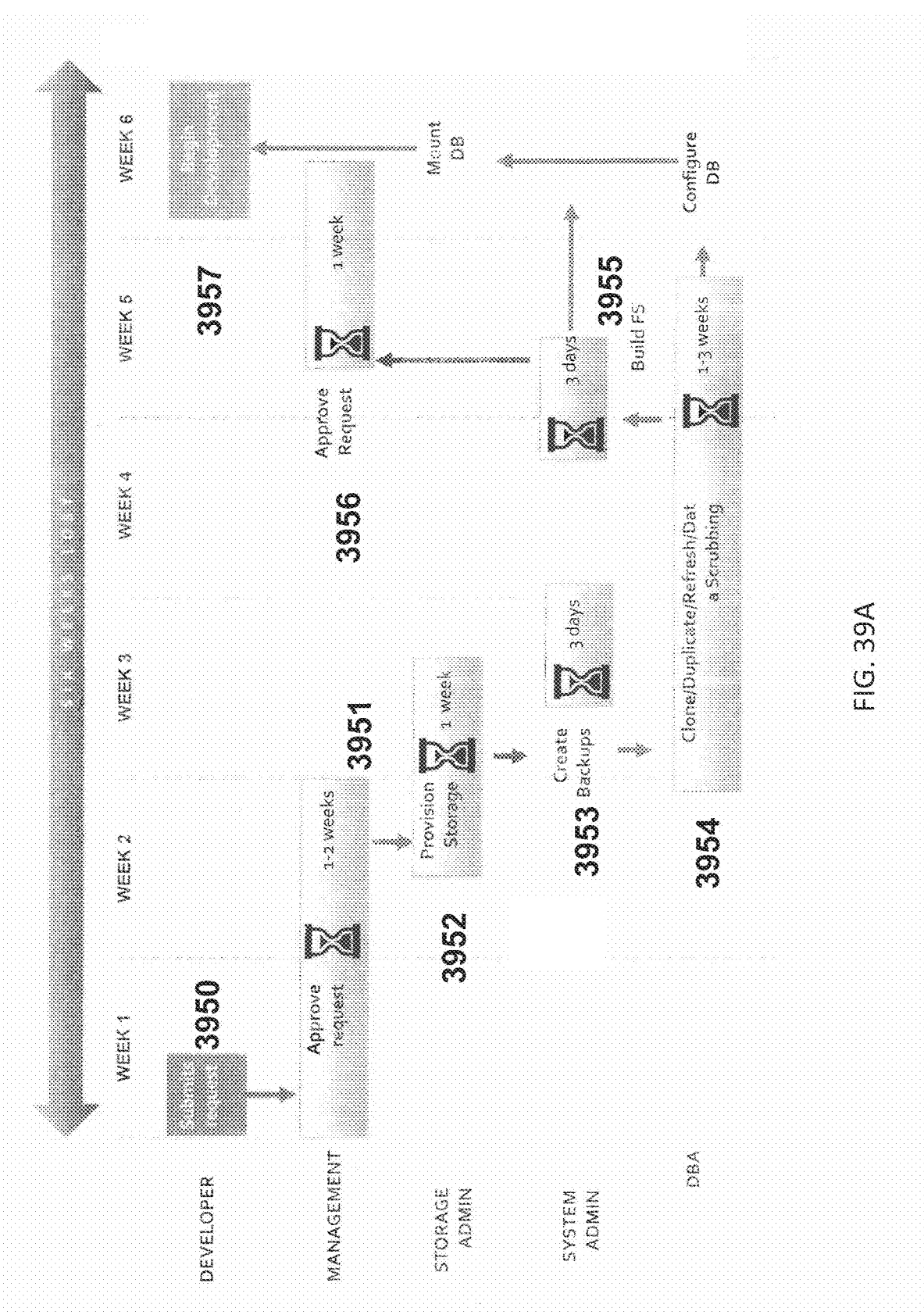
FIG. 39A is a flow diagram of an exemplary current process to procure copy of production data for testing and developing business applications (Test-and-Development) for a business service.

FIG. 39A shows an example workflow of provisioning a copy of production data for test and development. First a developer submits a request for data in step 3950. It takes about 1-2 weeks for management to approve the request in step 3951. It then takes a storage administrator about 1 week to provision required storage resources in step 3952 and a system administrator about 3 days to create backup images in step 3953. A database administrator now takes over and it would takes him or her about 1-3 weeks to clone, refresh and scrub the backup data in step 3954. It then takes about 3 days for the system administrator to rebuild the file system from the cloned and scrubbed backup data in step 3955. The process next goes to management to get approval in about 1 week in step 3956. Finally the developer can begin development work in step 3957. About 5-6 weeks have passed since the original request was submitted until development can begin.

Likewise, because many organizations usually lack test data management software that can easily update a data set without disrupting production systems, teams are often left to use out-of-date data, which can often provoke additional and unnecessary development cycles and "bug" fixes when an application update comes face to face with the reality of current data.

The end result of this traditional process is that development teams are left waiting, less development occurs in a given timeframe, milestones and roadmap dates are missed, application quality suffers, delivery dates are extended and potential revenue-generation is deferred.

The techniques described herein allow a workflow to be defined that specifies a series of automation steps, trigger points, and serial and parallel operations for generating a live copy of a database (e.g., for testing and/or development). The workflow specification can be saved and later run in an automated fashion to generate (or update) the live copy, including removing sensitive data that should not be present in a test or development dataset. The workflow can include optional paths and decision points which determine what to do in certain unexpected situations. At the beginning of the next cycle of the workflow, there is an implicit cleanup of resources left in use by the last cycle.

Automated Test-and-Development Process

FIG. 39B illustrates a flow diagram of a Test-and-Development process leveraging workflow automation technology. The computerized process can reduce complex interactions between different functional groups and significantly expedites availability of production data for development and testing.

A production application (e.g., production application 3900 in FIG. 39C) receives a Service Level Agreement (SLA) in step 3980 from a storage administrator. A SLA describes the data protection characteristics for each stage of the data lifecycle of a business application. Applying the SLA will create snapshot backup images of production data with predefined schedules. For example, U.S. patent application Ser. No. 12/947,385, entitled "System and Method for Managing Data with Service Level Agreements that may Specify Non-Uniform Copying of Data," describes SLAs, and is incorporated by reference herein in its entirety. A developer (e.g., who is in need of copy of production data) creates and applies a workflow to the production application in step 3981. A workflow models the underlying data flow for the test-and-development process and defines an automated procedure to drive that data flow. When a workflow service (e.g., Workflow Service 3914 in FIG. 39C) activates the workflow, it starts the operations to clone, refresh and scrub backup images of the production data in step 3982. The cloned and sanitized data is then mounted to all requested test and development applications in step 3983. The fully automated process from step 3981 to step 3983 takes about 12-15 hours.

The disclosed test data management functionality can deliver benefits while enabling organizations to better meet the needs of the development and test teams. For example, some potential benefits can include:

Providing an instant clone enables the creation of a development sandbox without impacting production or taking substantial resource time to provision.

Instant mount can be used to rapidly feed data to masking and sub-setting processes.

A LiveClone enables data to be updated automatically from production in a space efficient manner, allowing development and test team to work with near real time data over the lifecycle of the project.

Development and test teams can gain instant access to copies for the development lifecycle without additional license requirements, thereby reducing project costs.

With more rapid data access timelines, application development project schedules can be accelerated.

By using up-to-date instances of production data for development, testing, and QA, code quality is improved, rework requirements are reduced, and business acceptance is completed much more quickly.

Test-and-Development Workflow Automation

Figure 39C:
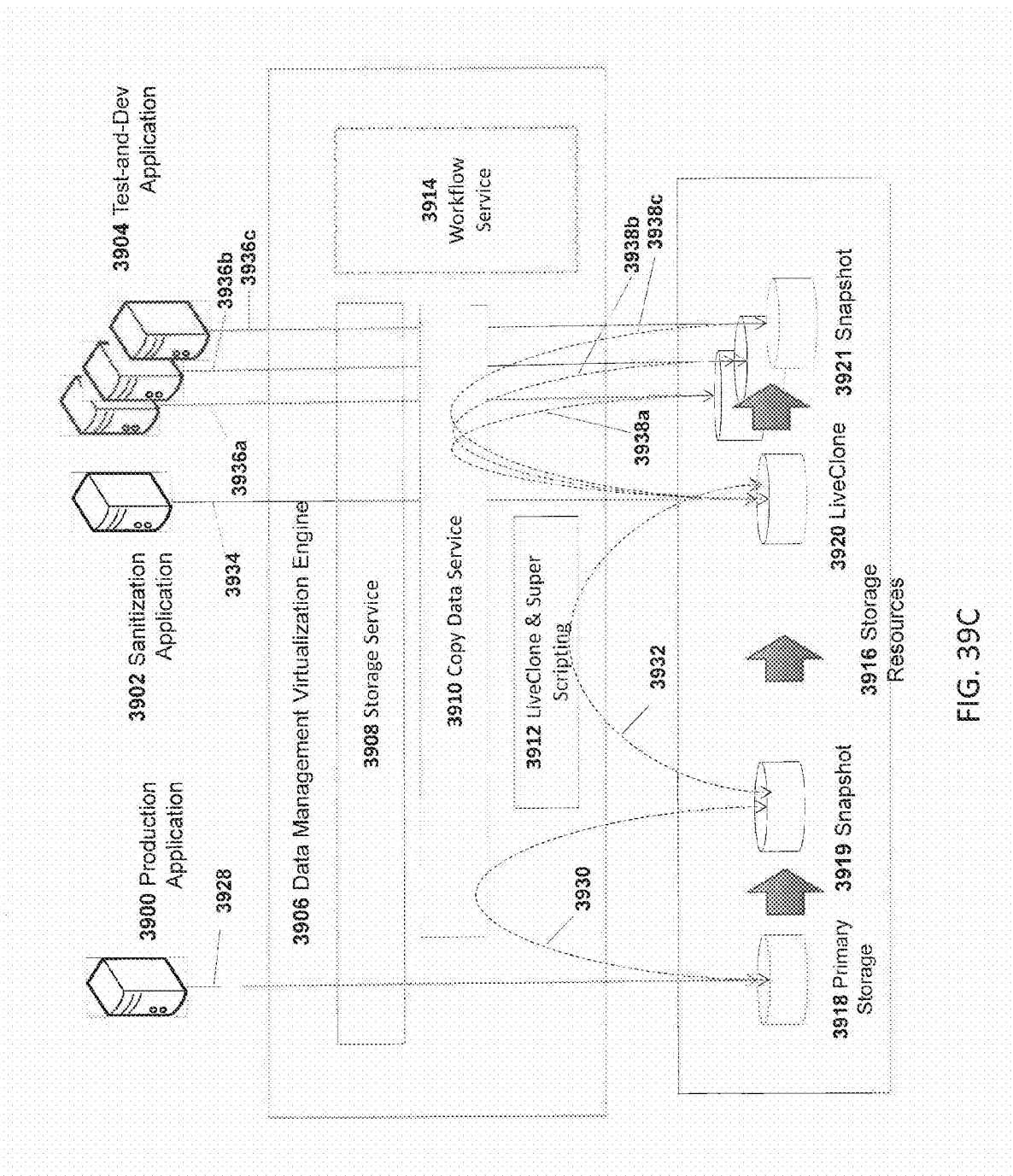
FIG. 39C is an exemplary diagram that illustrates the data flow for the Test-and-Development process in accordance with some embodiments.

FIG. 39C illustrates the data flow for the Test-and-Development process leveraging workflow automation technology. FIG. 39C includes production application 3900, sanitization application 3902, test-and-development application 3904. FIG. 39C also includes data management virtualization engine 3906 and related subcomponents, including storage service 3908, copy data service 3910, LiveClone and Super Scripting Service 3912 and workflow service 3914. FIG. 39C also includes Storage Resources 3916 and all the contained data volumes related with the test-and-development process, primary storage 3918, snapshot 3919, LiveClone 3920 and snapshot 3921.

FIG. 39C illustrates the interactions of Workflow Service 3914 with other components of the Data Management Virtualization Engine 3906 to generate the snapshot(s) 3921 from the Primary Storage 3918 for use by the Test-and-Development Application 3904. For example, U.S. patent application Ser. No. 12/947,385 describes an exemplary Data Management Virtualization system in FIGS. 2-4 and their associated description, which is hereby incorporated by reference herein in its entirety. Production Application 3900 is customer's deployed business application. For example, a customer may utilize the techniques described herein when it wants to develop and test new applications or new releases of the same application, which are depicted by Test-and-Development Application 3904. Test-and-Development Application 3904 requires testing with real production data owned by Application 3900. However data owned by Application 3900 contains sensitive information, which are not allowed to leave the production environment by legislation or company policies. Examples of such sensitive information can be customers' social security numbers, names, phone numbers or other privacy related matters. It can also be any documents deemed to be critical to the business unit operation and should not leave production environment in clear text. In order to procure the production data from Application 3900 and make it available for Test-and-Development Application 3904, Sanitization Application 3902 is deployed to "cleanse" the production data removing or scrambling the sensitive information before passing it on to Test-and-Development Application 3904. Workflow Service 3914 automates and coordinates the data movement and transformation by invoking and coordinating functions and features embodied by Storage Service 3908, Copy Data Service 3910 and LiveClone & Super Scripting Service 3912, which run side by side within a single Data Management Virtualization Engine 3906. This process is explained in more detail below.

Primary Storage 3918 is where application data is stored through its lifecycle. Primary Storage 3918 is mounted to Production Application 3900 through Storage Service 3908, as shown by line 3928. Similarly storage resources LiveClone 3920 is mounted to Sanitization Application 3902 (as indicated by line 3934) and finally storage resources Snapshot 3921 is mounted to Test-and-Development Application 3904 (as indicated by lines 3936a-3936c), all through Storage Service 3908.

Referring to the Workflow Service 3914, the Workflow Service 3914 is configured to execute a workflow (e.g., workflow 4000a-4000f in FIG. 40) that is defined to move production data from Application 3900 to Test-and-Development Application 3904 using Sanitization Application 3902 to "scrub" the production data. When the Workflow Service 3914 starts execution of a workflow, Workflow Service 3914 coordinates other data services within the same Data Management Virtualization Engine 3906 (e.g., services from the Storage Service 3908, the Copy Data Service 3910 and the LiveClone & Super Scripting 3912) to run each defined workflow item (e.g., WorkflowItem 4104 of FIG. 41). A workflow item models a single step of data transformation of the entire process and is a basic operation unit of the workflow. The end result is a succession of provisioned storage resources, embodied by Snapshot 3919, LiveClone 3920 and Snapshot 3921. The arrows 3930, 3932, and 3938a-3938c show the data flow of the production data between provisioned storage resources 3916 by the services of the Data Management Virtualization Engine 3906, which is explained more fully below. Arrows 3930, 3932, and 3938a-3938c are dashed to indicate the data flow across the Storage Resources 3916 that is coordinated by the Workflow Service 3914.

Data protection lifecycle requirements of Production Data 3900 stored on Primary Storage 3918 are normally captured by a Service Level Agreement (SLA), which controls for example when and how often backups and snapshots are created for data on the Primary Storage 3918. In the example shown in FIG. 39C, when the SLA for Application 3900 is enforced, Copy Data Service 3910 creates Snapshot 3919 from Primary Storage 3918 (this is shown by the line 3930). Snapshot 3919 is a staging data volume, which contains a point in time backup image of the Primary storage 3918.

When a workflow trigger (e.g., Trigger 4106 of FIG. 41, described in more detail therein) is activated, Workflow Service 3916 starts execution of WorkItem objects defined by the Workflow. The execution of a workflow item invokes its associated work action (e.g., WorkAction 4110 of FIG. 41). For example, a live clone action (e.g., LiveCloneAction 4111 of FIG. 41), which is a subtype of WorkAction, creates storage resources LiveClone 3920 through LiveClone & Super Scripting Service 3912. This is shown via arrow 3932. A liveclone is a staging data volume, which contains a clone from a backup image for the purposes of test and development. Liveclone 3920 can be refreshed incrementally from Snapshot 3919, making these operations inexpensive. Workflow triggers, WorkItems and WorkActions are described in more detail with reference to FIG. 41.

Upon creation of LiveClone 3920, Workflow Service 3914 mounts the LiveClone backup image to Sanitization Application 3902 through Storage Service 3908's mount operation, shown via line 3934. Sanitization Application 3902 utilizes LiveClone & Super Scripting Service 3912 to invoke a pre-script before the mount operation and a post-script after the mount operation. In some embodiments, the pre-script prepares the sanitization application before the LiveClone backup image is mounted. For example the pre-script should shutdown the database so that underlying data files can be swapped with the LiveClone backup image. In some embodiments, the post-script contains the application specific logic to remove or scramble the sensitive information contained in the backup image. When Workflow Service 3914 notices the completion of the scripts invocation, it calls into LiveClone & Super Scripting Service 3912 and Storage Service 3908 again to unmount LiveClone 3920 from Sanitization 3902 while preserving all the changes made by the scripts. The production data is now copied, sanitized and ready for consumption.

The last step of executing a workflow is to mount Liveclone 3920 to each requested Test-and-Development Application 3904. In doing so Workflow Service 3914 calls into Copy Data Service 3910 to create as many requested snapshot copies of LiveClone 3920 to produce the resulting Snapshot(s) 3921, as indicated by arrows 3938a-3938c. Depending on the configuration, Workflow Service 3914 can mount instances of Snapshot 3921 sequentially or in parallel to each requested Test-and-Development Application 3904, as indicated by lines 3936a-3936c (e.g., so each testing and/or development group has their own copy of the data).

Figure 40:
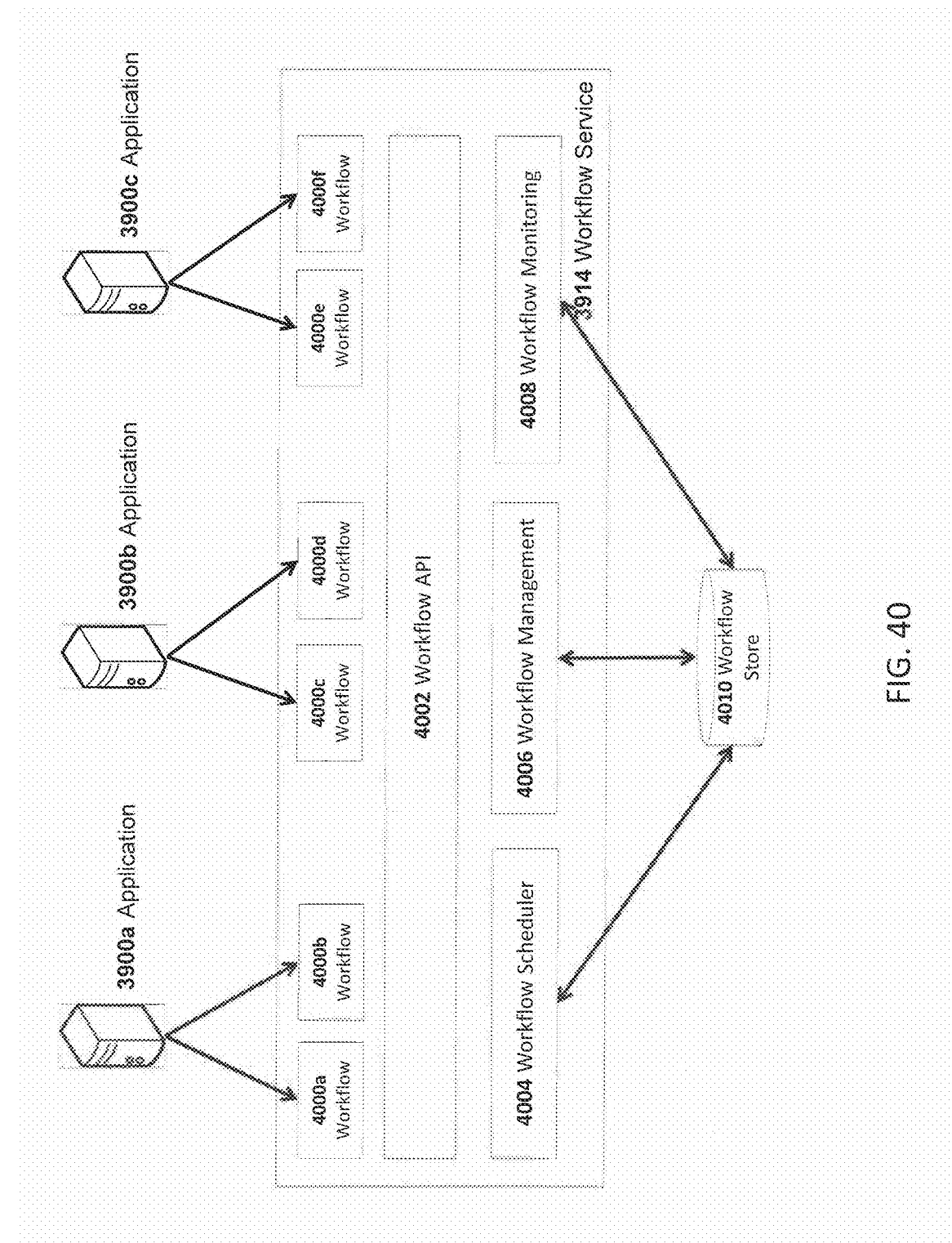
FIG. 40 is a diagram that shows the decomposition of a workflow service, according to some embodiments.

The workflow finishes its execution and production data is safely procured, sanitized and consumed by test and development applications. The workflow, once defined, is persisted in Workflow Store 4010 as shown in FIG. 40 and available for reuse. When one of the workflow's triggers (e.g., Trigger 4106 of FIG. 41, described in more detail therein) is activated again the entire process described above repeats so that Test-and-Development Application 3904 can start its new cycle of development effort with refreshed production data set.

Workflow Service

FIG. 40 shows the decomposition of Workflow Service 3914 from FIG. 39C, according to some embodiments. FIG. 40 includes applications 3900a-3900c, which interact with the Workflow Service 3914, which in turn interacts with the Workflow Store 4010. In this example, Workflow Service 3914 consists of five main components, which includes Workflows 4000a-4000f (collectively referred to herein as "Workflow 4000"), Workflow API 4002, Workflow Scheduler 4004, Workflow Management 4006, Workflow Monitoring 4008. Lastly all defined workflow artifacts are persisted into Workflow Store 4610. The Workflow Service 3914 exposes the underlying functionalities through Workflow API 4002, which clients can use to manage the lifecycle of a workflow object. The functionalities exposed through Workflow API 4000 can be, for example, collectively provided by Workflow Scheduler 4004, Workflow Management 4006 and Workflow Monitoring 4008. Workflow Management 4006 is the main component responsible for creating, updating and querying workflow objects (e.g., Workflow 4000) defined within the Data Management Virtualization Engine 3906. Workflow Monitoring 4008 is the component that client uses to query and monitor the status history of each workflow run. Workflow Scheduler 4004 maintains the schedules for each workflow object. It is the main source for triggering workflow execution. All four components described above use Workflow Store 4010 as the persistent storage to keep track of workflow configuration, states and run history.

The basic operation unit of all five components is Workflow 4000, which captures the abstraction of the data flow for the Test-and-Development process. It is the central data structure that Workflow API 4002 exposes and operates on, which controls data movement as described above in FIG. 39C. Each Application 3900 object can have multiple associated Workflow 4000 objects with each operating independently from another for different uses of the production data. Test and development is one major use case of Workflow Service 3914 but it can be extended to automate other uses of production data, which require multiple steps of transformation.

Workflow Anatomy

Figure 41:
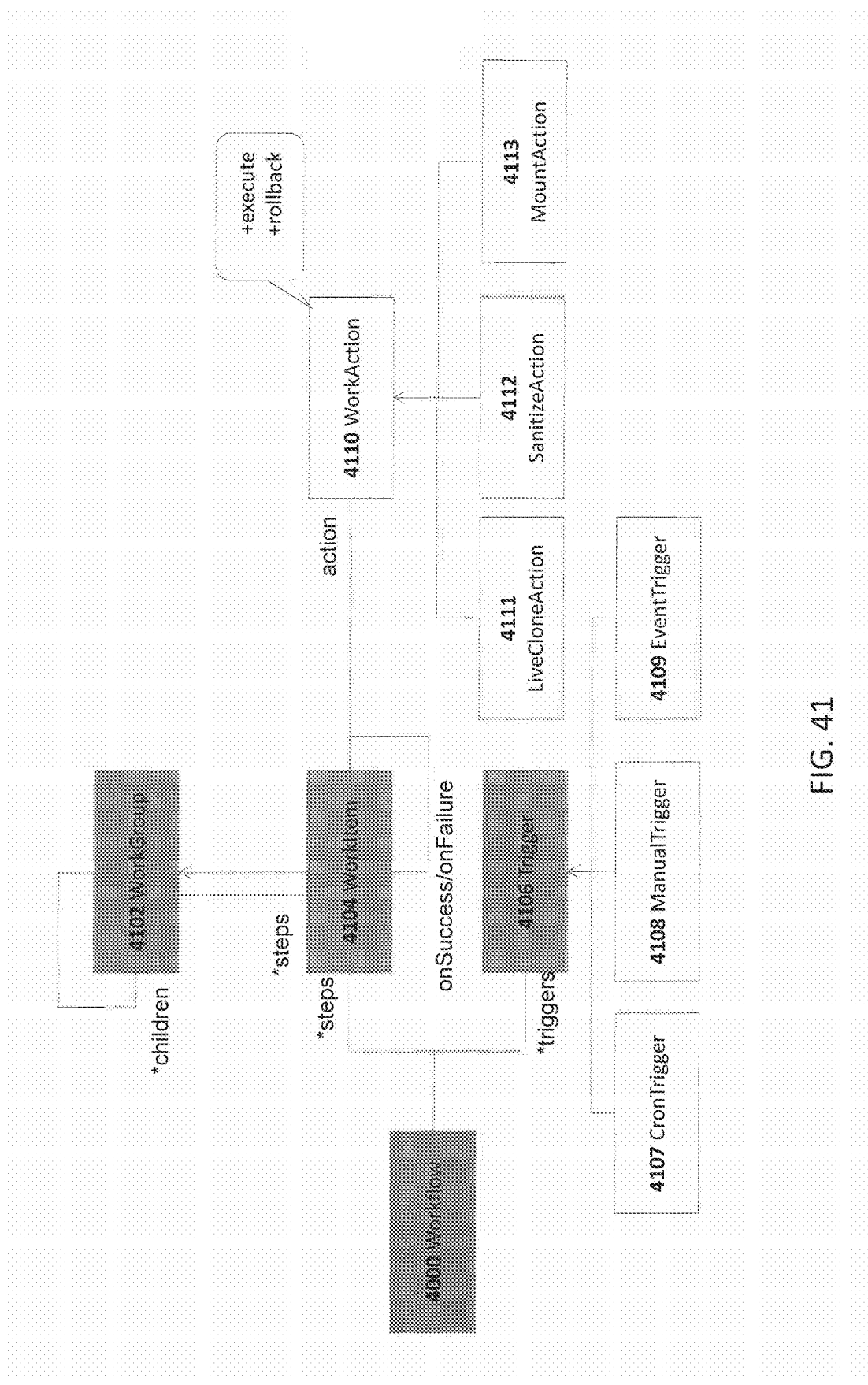
FIG. 41 is a diagram that shows the decomposition of a workflow, which is the main abstraction modeling the underlying data flow for the test-and-development process and the basic operation unit by a workflow service, according to some embodiments.

FIG. 41 shows the decomposition of Workflow 4000. In general each Workflow 4000 consists of multiple execution steps (shown as the relationship "* steps" left to WorkItem 4104, in which "*" means multiple here and below), each responsible for transformation of the input data in some way and is modeled by WorkItem 4104. Each workflow item is a subtype of WorkGroup 4102 and has an associated WorkAction 4110 (shown as the relationship "action" left to WorkAction 4110). WorkAction 4110 has a set of subtypes embodied in LiveCloneAction 4111, SanitizeAction 4112 and MountAction 4113. Each Workflow 4000 also has a set of associated Triggers 4106 (shown as the relationship "* triggers" left to WorkItem 4104), each of which defines the conditions when met to invoke the owning Workflow 4000. Trigger 4106 has a set of subtypes embodied in CronTrigger 4107, ManualTrigger 4108 and EventTrigger 4109.

WorkItem 4104 abstracts an execution step within Workflow 4000. It represents a unit of work, which defines a distinctive phase of transformation of the source data. Arrow 3932 in FIG. 39C exemplifies a work item, "liveclone step", for the test-and development process. It takes the snapshot of the production data (Snapshot 3919) and creates or refreshes a LiveClone backup image (LiveClone 3920) from Snapshot 3919. Arrow 3938a-3938c in FIG. 39C together exemplifies another work item, "mount step", for the test-and development process. It takes LiveClone 3920 produced from "liveclone step" and mounts the snapshots of LiveClone 3920 to multiple target test-and-development applications.

WorkItem 4104 is a subtype of another data structure, WorkGroup 4102. WorkGroup 4102 is a folder like data structure, which can contain instances of itself as child members (shown as the relationship "* children" left to WorkGroup 4102). This essentially enables WorkItem 4104 to model the workflow step which itself consists of child steps (shown as the relationship "* steps" above WorkItem 4104). The parent-child relationship is recursive in nature but normally each WorkItem 4104 models a single step and contains no more than one level of child WorkItem objects. Each work item decides its succession work item based on the outcome of executing its associated WorkAction 4110 and by configuration. The "onSucess/onFailure" relationship shown below WorkItem 4104 describes the next WorkItem 4104 in line to be executed by Workflow Service 3914. If the outcome of executing the work item's associated WorkAction 4110 is success, then the work item configured for "onSucess" relationship will be chosen. Otherwise the work item configured for "onFailure" will be selected as the next workflow item for execution.

WorkItem 4104 has an associated data structure embodied by WorkAction 4110, which abstracts the action that WorkItem 4104 should take if Workflow Service 3914 invokes the step it represents. A WorkAction object defines concrete operations that should be carried out by various services provided by Data Management Virtualization Engine 3906 to achieve the data transformation or movement objective of the owning WorkItem 4104. Such operations include, but not limited to, snapshotting data volumes, creating or fresh liveclone volumes, mounting and unmounting data volumes from/to applications. The operations are grouped into two main methods defined by WorkAction 4110. The "execute" method (shown in the call-out box above WorkAction 4110) groups the operations to carry out the specified data transformation objective and the "rollback" method (shown in the same call-out box) groups the operations to undo the results of the execute method if any should the execute method runs into any failure and needs to start the recovery process.

At runtime each WorkItem 4104 is associated with an instance of a concrete subtype of WorkAction 4110 embodied by LiveCloneAction 4111, SanitizeAction 4112 and MountAction 4113. For the test and development process described in FIG. 39C conceptually the Workflow 4000 object consists of three WorkItem 4104 objects. Workflow Service 3914 executes the WorkItem 4104 objects in succession and corresponding WorkAction 4110 objects, Live- CloneAction 4111, SanitizeAction 4112 and MountAction 4113 in that order. LiveCloneAction 4111 is responsible for creating and refreshing liveclone backup images. SanitizeAction 4112 is responsible for mounting and "scrubbing" the liveclone backup image to remove sensitive information. Finally MountAction 4113 is responsible to mount the sanitized snapshot backup images to the Test-and-Development Application 3904. If multiple target Test-and-Development Application 3904 objects are specified for the last mount step, the parent WorkItem 4104 object representing it will contain multiple child WorkItem 4104 objects, each representing a target Test-and-Development Application 3904 object. The parent or the "macro" WorkItem 4104 can choose to carry out the operations of each MountAction 4113 object associated with each child WorkItem 4104 object sequentially or in parallel if the underlying infrastructure supports it.

Each WorkItem 4104 object decides its succession WorkItem 4104 object based on the operation outcome of its associated WorkAction 4110 object. If the execute method of WorkAction 4110 returns success, the onSuccess method of WorkItem 4104 returns the next WorkItem 4104 object and calls its WorkAction 4110 object's execute method to keep the workflow rolling forward. If the onSucess method returns null it signals the end of Workflow 4000 invocation. If the execute method of WorkAction 4110 returns failure, the onFailure method of WorkItem 4104 returns the next WorkItem 4104 object and calls its WorkAction 4110 object's rollback method to start the recovery or unwinding process. The return results of onSuccess and onFailure methods of each WorkItem 4104 object are configured when the containing WorkFlow 4000 object is defined. A complete run of Workflow 4000 is a successful traversal of containing top-level WorkItem 4104 objects without failure.

As described above each Workflow 4000 has a set of associated triggers embodied by Trigger 4106. Trigger 4106 specifies the condition whether or not Workflow Service 3914 should activate Workflow 4000. Trigger 4106 is generally defined according to the source of triggering events embodied by CronTrigger 4107, ManualTrigger 4108 and EventTrigger 4109. CronTrigger 4107 defines a means of an activation schedule using a "cron-expression". A cron expression is a string consisting of six or seven subexpressions (fields) that describe individual details of the schedule. A cron expression is a string consisting of six or seven subexpressions (fields) that describe individual details of the schedule. One example of cron-expression is as follows, Expression Meaning
"0 0 8 * * ?" Fire at 8:00 am every day ManualTrigger 4108 allows Workflow 4000 to be activated on-demand bypassing all the conditions set up for other types of triggers. EventTrigger 4109 allows Workflow 4000 to be activated in response to certain system events, a typical source of events are SNMP traps that received by the system.

Defining a Workflow

Figure 44:
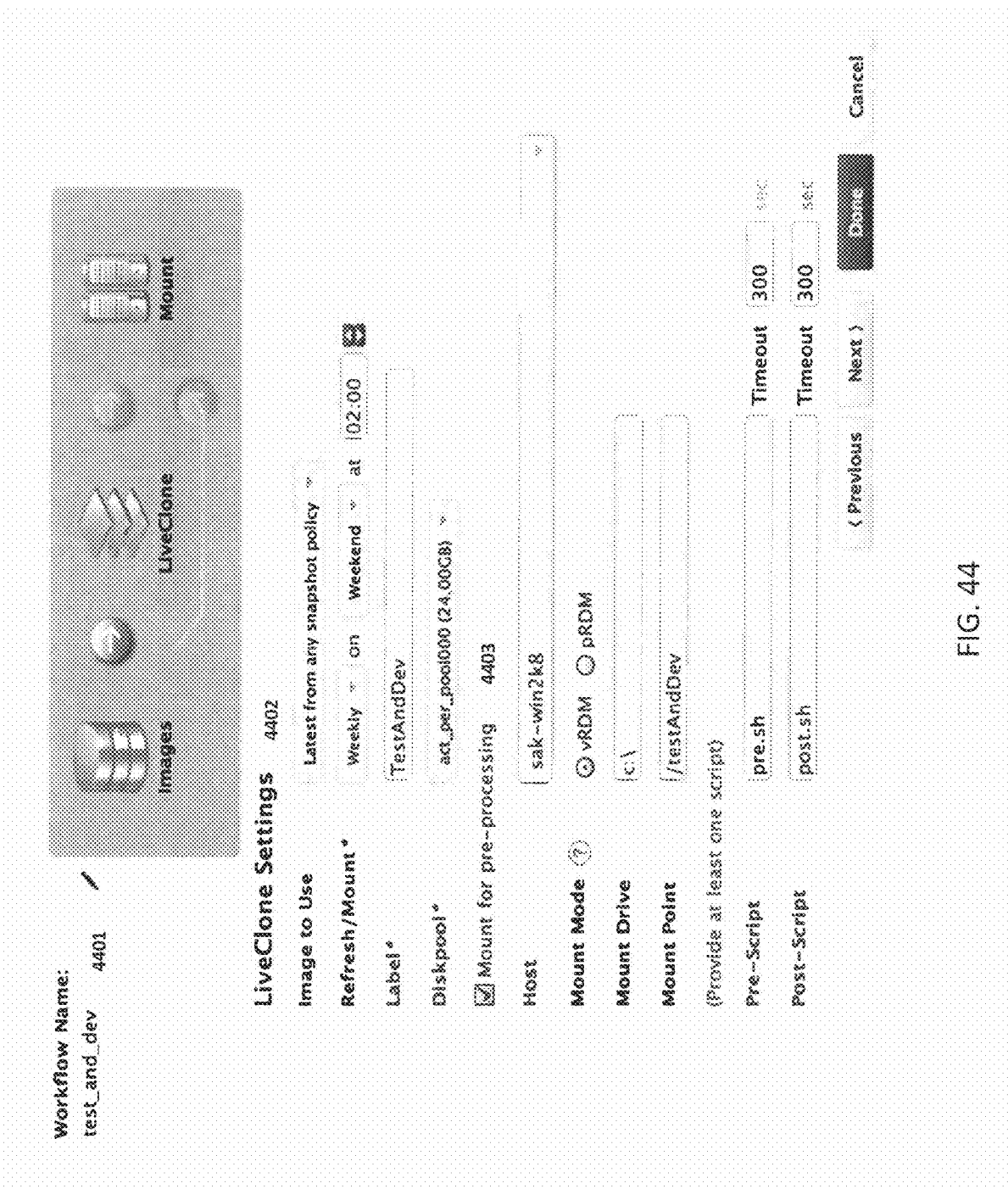
FIG. 44 is a diagram depicting an exemplary graphical user interface for creating a workflow, according to some embodiments.

A workflow can be defined through either a GUI interface or a command line interface, which should specify all the aspects laid out in section "Workflow Anatomy". The core task of defining a workflow is to specify the detailed operations and parameters for each member workflow items. FIG. 44 is an exemplary diagram of a graphical user interface for defining a workflow (e.g., as embodied in FIG. 39C), according to some embodiments.

FIG. 44 is an example defining the "liveclone step" as embodied by arrow 3932 and "sanitization step" as embodied by arrow 3934 in FIG. 39C. The following descriptions highlight some configuration parameters as shown in the screenshot, Workflow Name 4401. The name of the workflow under definition.
    LiveClone Settings 4402. This section specifies all the parameters required for creating and refreshing a LiveClone backup image.
        Image to Use. Specifies which snapshot of the application to be used for LiveClone creation.
        Refresh/Mount. Specifies the schedule as when to start the workflow as embodied by CronTrigger 4107.
    Mount for pre-processing 4403. This section specifies all the parameters required for removing sensitive information from the LiveClone backup image.
        Host. Specifies the target host to carry out sanitization action as embodied by Application 3902.
        Pre-Script/Post-Script. Specifies the pre-script and post-script for SanitizationAction 4112.

Figure 45:
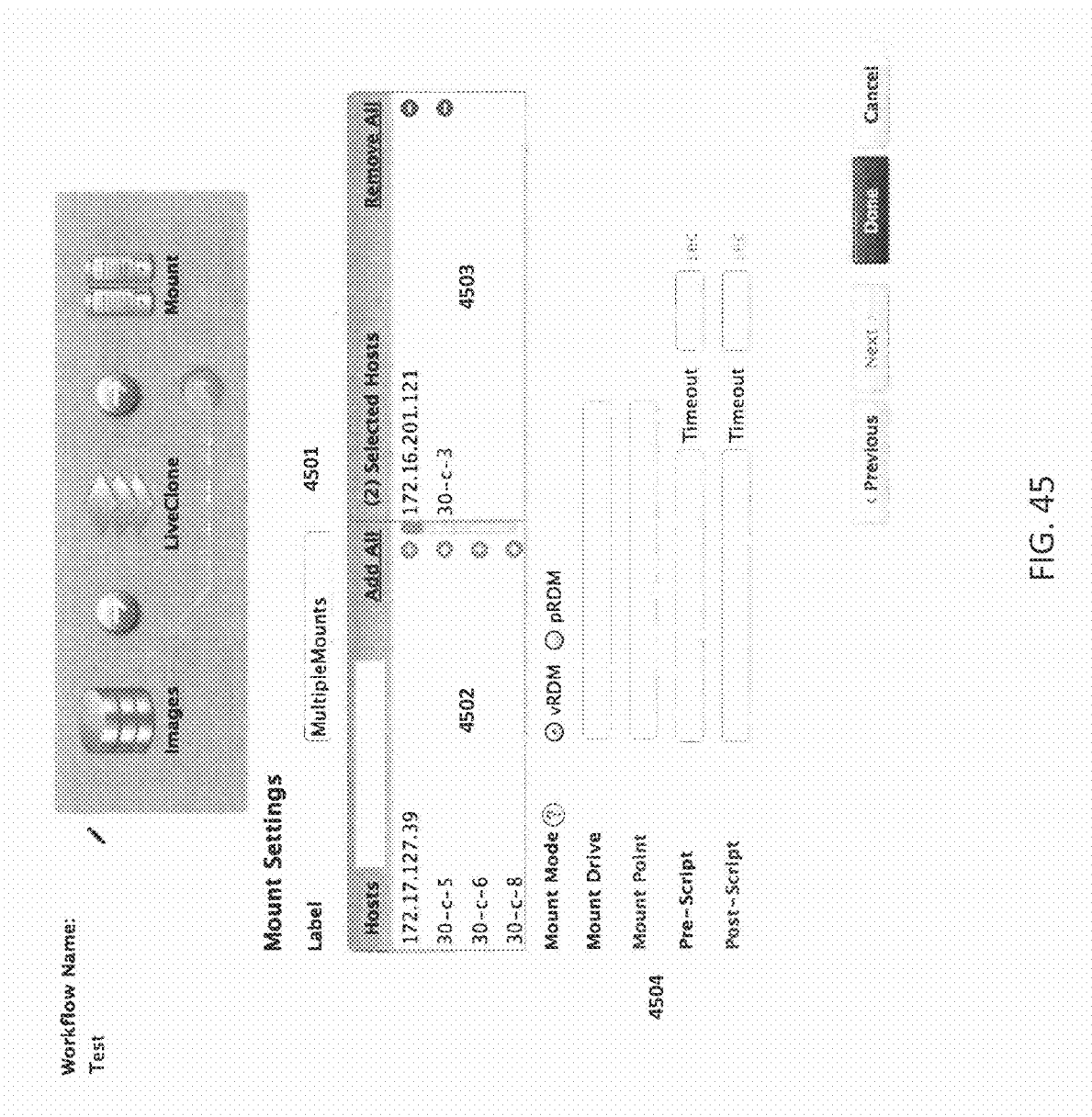
FIG. 45 is a diagram depicting mounting of a live clone to multiple applications, according to some embodiments.

FIG. 45 is an example of mounting a live clone to multiple applications. Once the liveclone volume is refreshed and sanitized, it is ready to be mounted to the final development hosts. The same liveclone volume can be mounted to multiple hosts from within the workflow. The following descriptions highlight some configuration parameters as shown in the screenshot, Label 4501. All mounted volumes will be tagged the same label for easy identification.
    Candidate hosts 4502. All hosts available for mount operation are listed in the left panel.
    Target hosts 4503. All currently selected hosts for mount operation are listed in the right panel
    Mount parameters 4504. The set of parameters for mount operation which include,
        Mount mode. Applicable for VMware virtual machines. vRDM for virtual RDM and pRDM for physical RDM
        Mount Drive. Applicable for Windows hosts. Starting drive letter for the mounted volumes.
        Mount Point. Applicable for both Linux and Windows hosts. The starting mount point within the target hosts file system.
        Pre-script and Post-script. The names of the script launched before and after the mount operation.

Detailed Workflow Execution Logic

Figure 42:
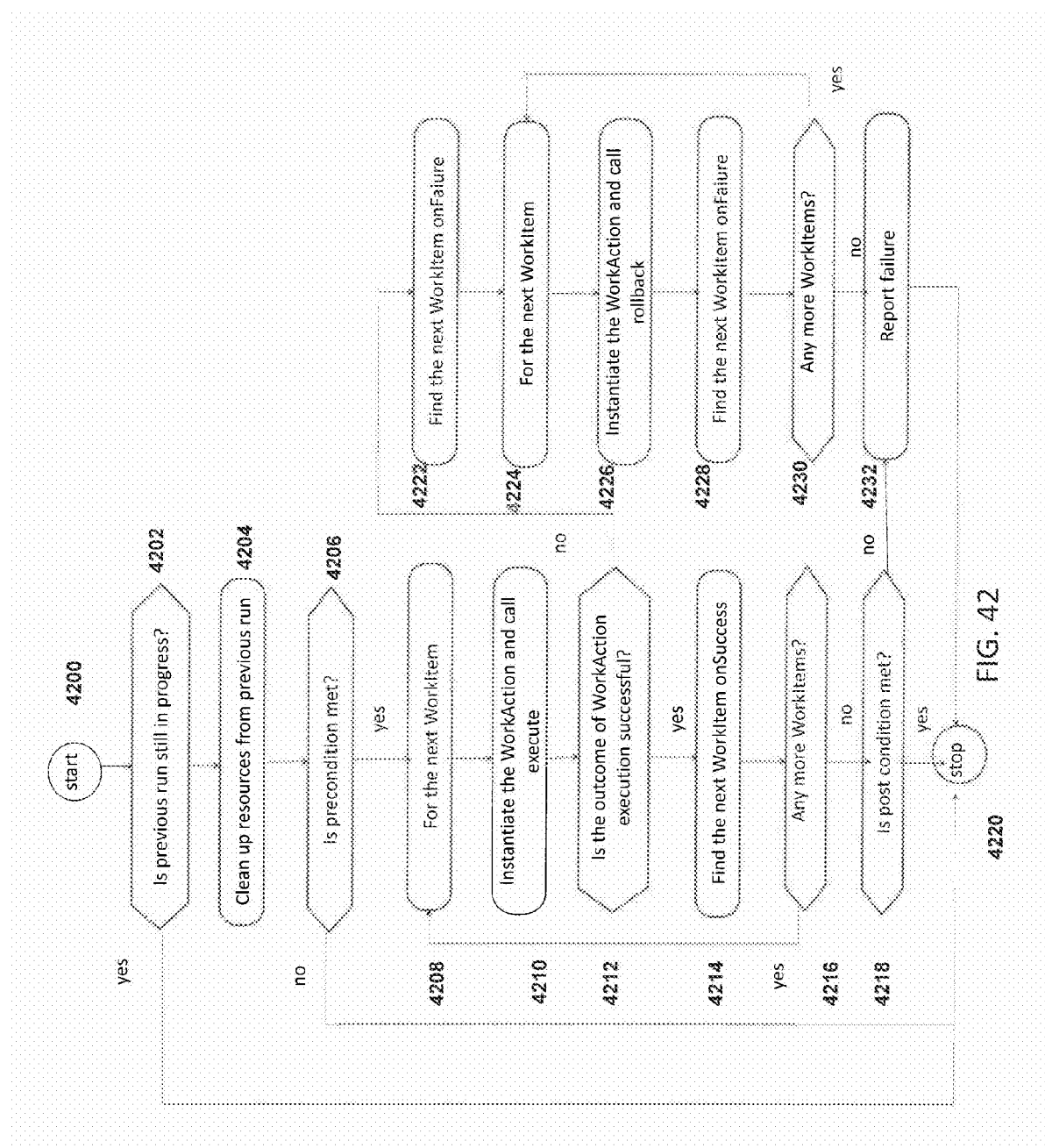
FIG. 42 is a flowchart showing the computerized execution of a workflow by a workflow service when triggered, according to some embodiments.

FIG. 42 illustrates a flowchart of the execution logic of Workflow when activated by Workflow Service 3914, according to some embodiments.

Step 4200 shows the start of the execution. Step 4202 checks if previous activation of the same workflow is still in progress, it goes to the end of the execution, Step 4220 if this is case. If no previous activation is running, the logic goes to Step 4204. Step 4204 checks and frees system resources from previous activation if any is left. It then changes to Step 4206 to check if the pre-condition to execute the workflow is met. If the result is false, workflow execution ends to changes to Step 4220. If pre-condition check passes, the execution changes to Step 4208. Step 4208 finds the starting WorkItem 4104 and it changes to Step 4210 to instantiate and calls WorkItem's 4104 associated WorkAction 4110. If the outcome of the executing WorkAction 4110 is success, Step 4214 finds the next WorkItem 4104 by calling current WorkItem's 4104 onSuccess method. If it the return result is not null signaling there are more WorkItem 4104 objects to be executed, execution logic returns to Step 4208. The looping logic between Step 4208 and Step 4216 repeats until Step 4216 signals the exhaust of all WorkItem 4104 objects.

It then changes to Step 4218 to check if the post-condition for executing the workflow holds. If it is case, the execution changes to Step 4220 and ends. If the post-condition is invalid, execution changes to Step 4232 to report failure and then ends at Step 4220.

In Step 4212 if the outcome of executing current WorkItem 4104 is failure, execution changes to Step 4222 to find the next WorkItem 4104 by calling current WorkItem 4104's onFailure method. If the returned result is not null, execution changes to Step 4224 to start the rollback process. Execution moves to Step 4226 to instantiate WorkAction 4110 associated with WorkItem 4104 identified in Step 4222 and calls its rollback method. Execution moves to Step 4228 to calls the onFailure method of WorkItem 4104 identified in Step 4224 to find the next WorkItem 4104. It then moves to Step 4230 to check if the returned result is null. If the result is not null, it loops back to Step 4224 and repeats the rollback process. If the returned result is null, it signals the end of the rollback process and moves to Step 4232 to report the failure and moves on to Step 4220 to finish the execution of the entire workflow.

Figure 43:
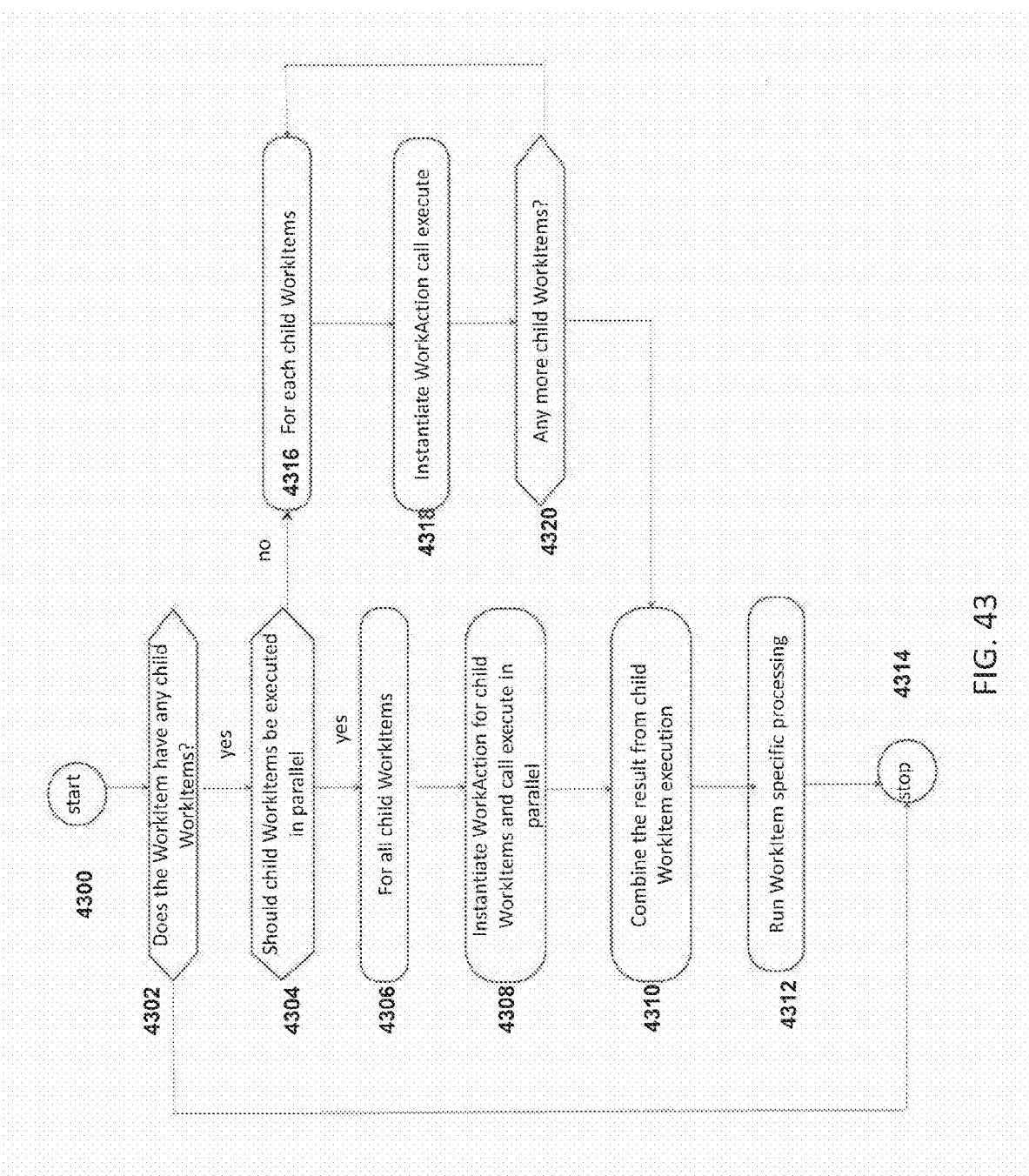
FIG. 43 is a flowchart depicting the execution of a workflow item, according to some embodiments.

FIG. 43 is a flowchart, which shows the execution of WorkflowItem 4104 and gives a magnified view of Step 4210 in FIG. 42. In this example, WorkflowItem 4104 models a step of the Test-and-Development process and each Workflow 4000 can consist of multiple WorkflowItem 4104 objects to model the entire Test-and-Development process. Execution starts at Step 4300. It changes to Step 4302 to check if WorkItem 4104 contains any child WorkItems. If the result is yes it changes to Step 4304 to check if all child WorkItems should be executed sequentially or in parallel. If check result returns true execution changes to Step 4306 to enumerate all child WorkItems. It then changes to Step 4308 to instantiate WorkAction 4110 for each child WorkItem 4104 and calls its execute method in parallel. Execution then moves to Step 4310 to combine the result from the execution of each child WorkItem 4104. Execution then moves to Step 4312 to logic specific to the WorkItem 4104 itself and moves to Step 4314 to finish the execution of WorkItem 4104 and returns final result back.

If check result is false at Step 4104 execution changes to Step 4116 to enumerate all child WorkItems. For each child WorkItem 4316 execution changes to Step 4318 to instantiate and calls its associated WorkAction 4110. It then moves to Step 4320 to check if there is any child WorkItem 4104 remains unexecuted and will loop back to Step 516 if it is case. If no child WorkItem 4104 remains unexecuted control changes to Step 4310.

Data Management Virtualization

As the value of data has increased, and the acquisition cost per gigabyte of data has dropped, enterprises have been deploying larger and larger storage systems. This has particularly been the case with unstructured data, which is usually stored in large file systems, very often accessed over network by multiple servers using industry standard network-attached storage (NAS) protocols such as Network File System (NFS) and Common Internet File System (CIFS).

While the capacity of these NAS devices has gone up, the data protection capabilities, namely backup and restore and replication have not kept pace. This has, for example, led enterprise users to cobble together inefficient and expensive solutions for protecting their data, or go without complete protection.

The techniques described herein protect and manage the lifecycle of data in large Network Attached Storage (NAS) deployments with high efficiency and with the ability to scale with the growth of the NAS System. In addition to data protection, the system described here can leverage the data within the NAS System for additional purposes such as test & development, analysis, reporting, e-discovery and similar functions. The techniques described herein can also protect and manage the lifecycle of data in big data systems (e.g., Hadoop, MongoDB).

Since NAS is, by its nature, often remotely-located from a backup device, NAS must usually be mounted to a host prior to performing backups. The techniques described herein provide for a NAS backup proxy that, in some embodiments, is external to the copy data management server. A NAS server can include a management component that provides an API for invoking functions on the NAS server, such as a snapshot function that generates a snapshot of the NAS server and/or a change tracking function that tracks changes made to data stored on the NAS server. By using such NAS functionality, the backup process can be very fast and efficient since only changed data (e.g., deletions, modifications) are copied from the NAS server.

By remotely locating the NAS backup proxy from the copy data management server, NAS backup proxies can be added for scalability such that more NAS backup proxies can be added as the data in the NAS storage grows (e.g., while still using a single virtual data pipeline to the copy data management server). Additionally, as described herein the NAS backup proxy can be selected such that it is compatible with the NAS server (e.g., NFS for Unix/Linux and SIFS for Windows).

Large enterprise computing systems today often include large amounts of both structured and unstructured data.

Structured data is characterized by having a well-defined format, with large numbers of similar items, each item of data having relationships with other items of data. Such data is most often stored in databases, such as relational databases, object databases, and even specialized databases such as email repositories. As such storage repositories have evolved and grown in size, mechanisms have developed from protecting and replicating the data within these repositories. The relational database system developed by Oracle Corporation, for example, includes tools such as the Oracle Recovery Manager (RMAN) and others, developed by Oracle and by third parties that enable end users to manage the life cycle of their structured data.

Unstructured data is characterized by being heterogeneous, of not having a well defined form with larger individual items, each with their own metadata. An example of unstructured data is a large collection of text files, documents, spreadsheets, images, audio and video files. Each file may be sizable, and has metadata such as a filename, file owners, date of creation and modification and other attributes. Unstructured data is often stored in file systems, and when shared access to such a repository is required, these file systems are shared over a network in what is described as Network Attached Storage (NAS).

A NAS system can be designed to hold unstructured data, which is made accessible to multiple host computers using a well-defined file-access protocol such as CIFS or NFS. Such a system is often designed to scale to large or very large sizes, from tens of terabytes to several petabytes. A large NAS deployment may hold tens or hundreds of millions of individual files, and may be accessed by thousands of computer systems at the same time.

Most modern NAS servers include the ability to take snapshots of the file system state, and often include an interface by which you can determine what files have changed between one snapshot and another.

Whereas the life cycle management of structured data has generally kept pace with the growth of structured data, the same cannot be said for NAS Servers. When NAS Servers get to multiple terabytes in size, it becomes impossible to back them up with conventional backup tools. Backups take too long, and impose too much of a load on the production systems. The NAS vendors only offer replication, where the data in a NAS System can be sent across a wire to a similar NAS system at a remote location. This technique is an expensive solution that addresses site failure, but does not address operational data loss.

The techniques described herein include a system that can efficiently protect a large NAS system, and can grow with the NAS system. It takes advantage of the snapshotting capabilities within the NAS system, and the ability to identify changed files between snapshots.

A Copy Data Management system can be enhanced with the addition of one or more NAS Backup Proxy hosts that serve to backup some or all of one ore more NAS Servers. Multiple Proxy hosts can be added to a single Copy Data Management server to scale with the growth of the NAS Server. For example, U.S. patent application Ser. No. 13/920,981, entitled "System and Method for Incrementally Backing Up Out-of-Band Data" describes an example of a virtualized data management system, which is hereby incorporated by reference herein in its entirety.

Figure 46:
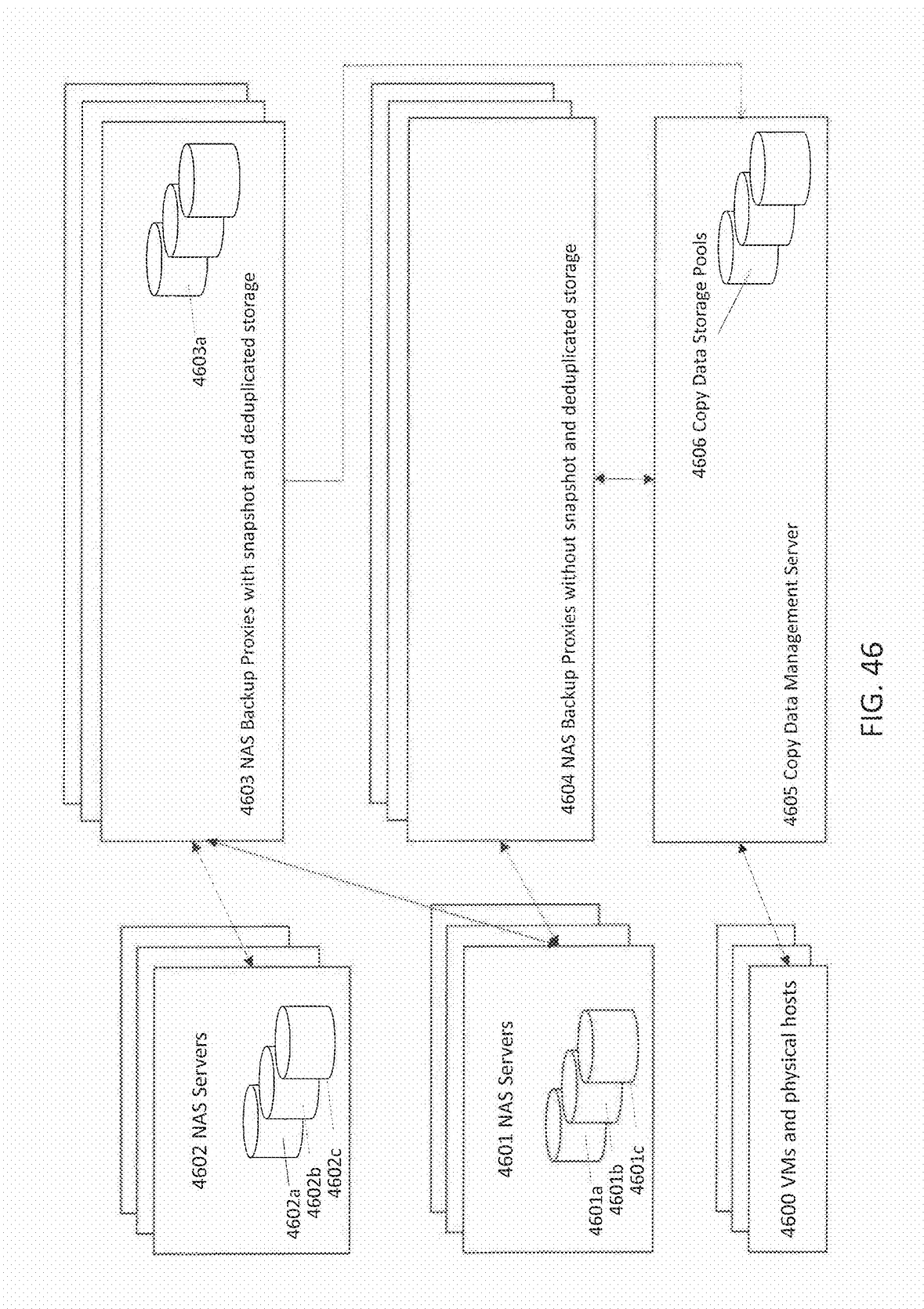
FIG. 46 is a simplified block diagram of the relationship between the NAS systems and the copy data management components, according to some embodiments.

FIG. 46 illustrates the relationship between the Copy Data Management System and the rest of the enterprise systems, according to some embodiments. The Customer environment consists of a collection of physical and virtual machines, 4600. These are protected by the Copy Data Management Server 4605 using storage in the form of Copy Data Storage Pools 4606. Copy Data Storage Pools 4606 are, for example, storage that the customer has specifically reserved for storing copies of production data. The enterprise environment also includes one or more NAS Servers 4601 and 4602, which consist of NAS service nodes with their own storage 4601a-4601c and 4602a-4602c, respectively. NAS Servers 4601 and 4602 are exemplified by offerings from EMC, Network Appliance, and other Na vendors. The Copy Data Management System has been enhanced with the addition of one or more NAS backup Proxy Servers, 4603 and 4604. Two types of NAS Backup Proxies are illustrated, one with its own snapshot and deduplicated storage, 4603 and the other without its own snapshot and deduplicated storage, 4604. NAS Backup Proxy Server 4604 is configured without its own storage. This type of NAS Backup Proxy Server 4604 can share storage with the Copy Data Management Server 4605. NAS Backup Proxy Server 4603 is configured with its own Copy Data Storage Pool 4603a. Having its own storage can be useful if the NAS Backup Proxy Server 4603 is at a distant location, where it would be impractical to share the Copy Data Storage Pool 4606 with the Copy Data Management Server 4605. The user may also choose to deploy NAS Backup Proxy Servers 4603 with their own Storage for other reasons, such as keeping storage reserved for NAS Protection, or the ability to expand the Copy Data Storage as more and more NAS Servers are protected. Note that there is not necessarily a one-to-one relationship between the NAS Servers and the NAS Backup Proxy hosts. There may be more or less NAS Backup Proxy hosts depending on the size and capacity of the NAS Servers and of the proxy hosts. For example, one NAS Backup proxy may protect several NAS Servers, and a single NAS Server may be protected by several NAS Backup Proxy hosts.

Figure 47:
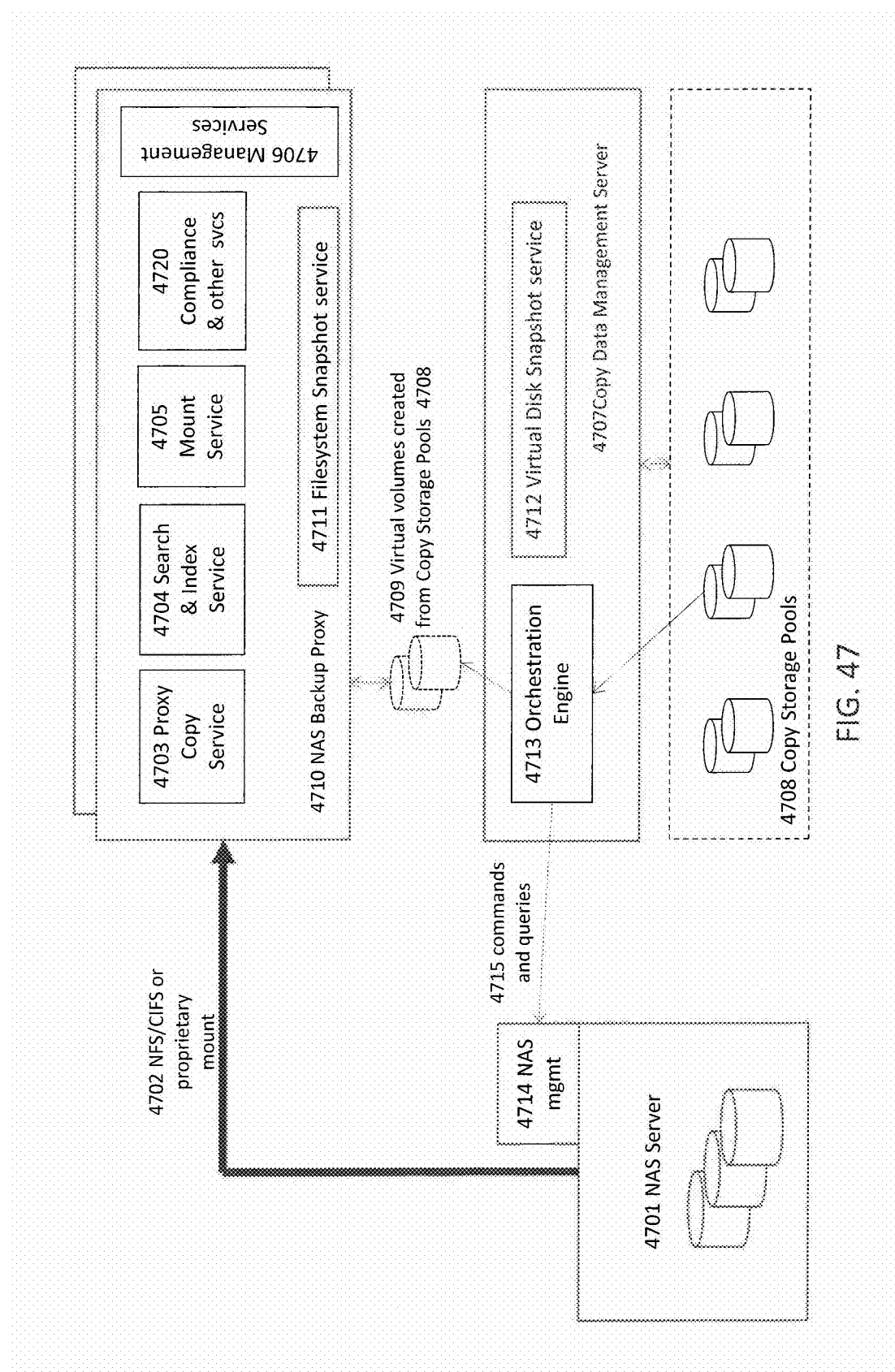
FIG. 47 is a block diagram of the detail of the interaction of the copy data management system and the NAS Backup System, according to some embodiments.

FIG. 47 illustrates the high level components that are active during the backup and mounting of NAS systems, according to some embodiments. The file system presented by the NAS Server 4701 is mounted by the NAS Backup Proxy host 4710 using standard protocols such as NFS and CIFS, or a proprietary protocol if required by the NAS vendor. Backups can be mounted as either CIFS or NFS regardless of whether the original NAS export was one or the other. The NAS Backup Proxy Server 4710 includes various services including the Proxy Copy Service 4703, the Search and Indexing Service 4704, the Mount Service 4705, the Management Services 4706 and other services such as Compliance 4713. There may also be a Filesystem Snapshot Service 4711, which is usually used when the NAS Backup Proxy host has its own snapshot and deduplicated storage. The Virtual Volumes 4709 are created from the Copy Data Storage Pools 4708 by the Orchestration Engine 4713 and presented to the NAS Backup Proxy hosts 4710. The Orchestration Engine 4713 can communicate with various components on the NAS Backup Proxy 4710, as explained further with reference to FIGS. 48, 49, and 50.

The Copy Data Management Server 4707 includes the Orchestration Engine 4713 and the Virtual Disk Snapshot service 4712. The Virtual Disk Snapshot Service 4712 is usually used when the NAS Backup Proxy 4710 does not have its own storage. The Orchestration Engine 4713 communicates with the NAS Management component 4714 to issue commands to create and delete NAS Server 4701 snapshots and to compare snapshots to generate lists of modified files.

The Copy Data Management Server 4707 controls the Copy Storage Pools 4708, and may apportion some of the storage in the pools to one of the NAS Backup Proxy hosts in the form of the Virtual Volumes 4708.

The NAS Backup Proxy Host 4710 contains many Services that are used within the Copy Data Management System 4707 to perform protection and recovery operations.

In some embodiments, the Proxy Copy Service 4703 is responsible for mounting a snapshot of a NAS Server 4701 onto the NAS Backup Proxy Host 4710, formatting Virtual Volumes 4709, creating filesystems on the virtual volumes, and then copying all files or changed files only from the mounted NAS snapshot to the filesystem. The Proxy Copy Service 4703 can also be responsible for creating a list of files copied along with their metadata, and communicating with the Search and Index Service 4704 to generate an index of the files backed up.

The Search and Index Service 4704 is, for example, a general purpose search engine which is capable of breaking up its inputs into words and generating an index database that can quickly be searched to find occurrences of single terms or more complex queries. This Service can be used on the NAS Backup Proxy Host to generate an index of the files backed up, and to be able to search this index to locate the backup that needs to be mounted to restore a particular file.

The Mount Service 4705 can be responsible for importing Virtual Volumes 4709 and mounting the filesystems on these volumes. It can also export the mounted filesystems to other hosts in the Enterprise.

The Compliance and Other Services 4720 is, in some examples, a set of services that may optionally be deployed on the NAS Backup Proxy 4710 host to perform advanced operations such as compliance auditing, e-discovery or long term archiving. These services can be capable of performing their selected actions on a mounted copy of a NAS filesystem backup. In some examples, an advantage of deploying these services on the NAS Backup Proxy Host 4710 is that they have no impact on the NAS Server and that the services scale up, that is, as more NAS Servers are deployed, more NAS Backup Proxy Servers can be deployed, to keep pace.

Configuration of the Dataset

To pre-configure a NAS system for backup, the user can use the graphical user interface (GUI) of the Copy Management System (not illustrated) and specify the NAS Server through its IP address or URL, and select one or more of the NAS Backup Proxy hosts. The NAS Proxy Hosts will then mount the NAS Filesystems 4702 and be ready for browsing.

To configure a subset of a NAS Filesystem for backup, the user can use the GUI to browse the mounted filesystem, and select the starting directories to be backed up. This is called the NAS Backup Dataset. The user can also select a Service Level Template, which specifies the backup frequencies and retentions across the various Copy Data Storage Pools.

Flow of the First Backup

Figure 48:
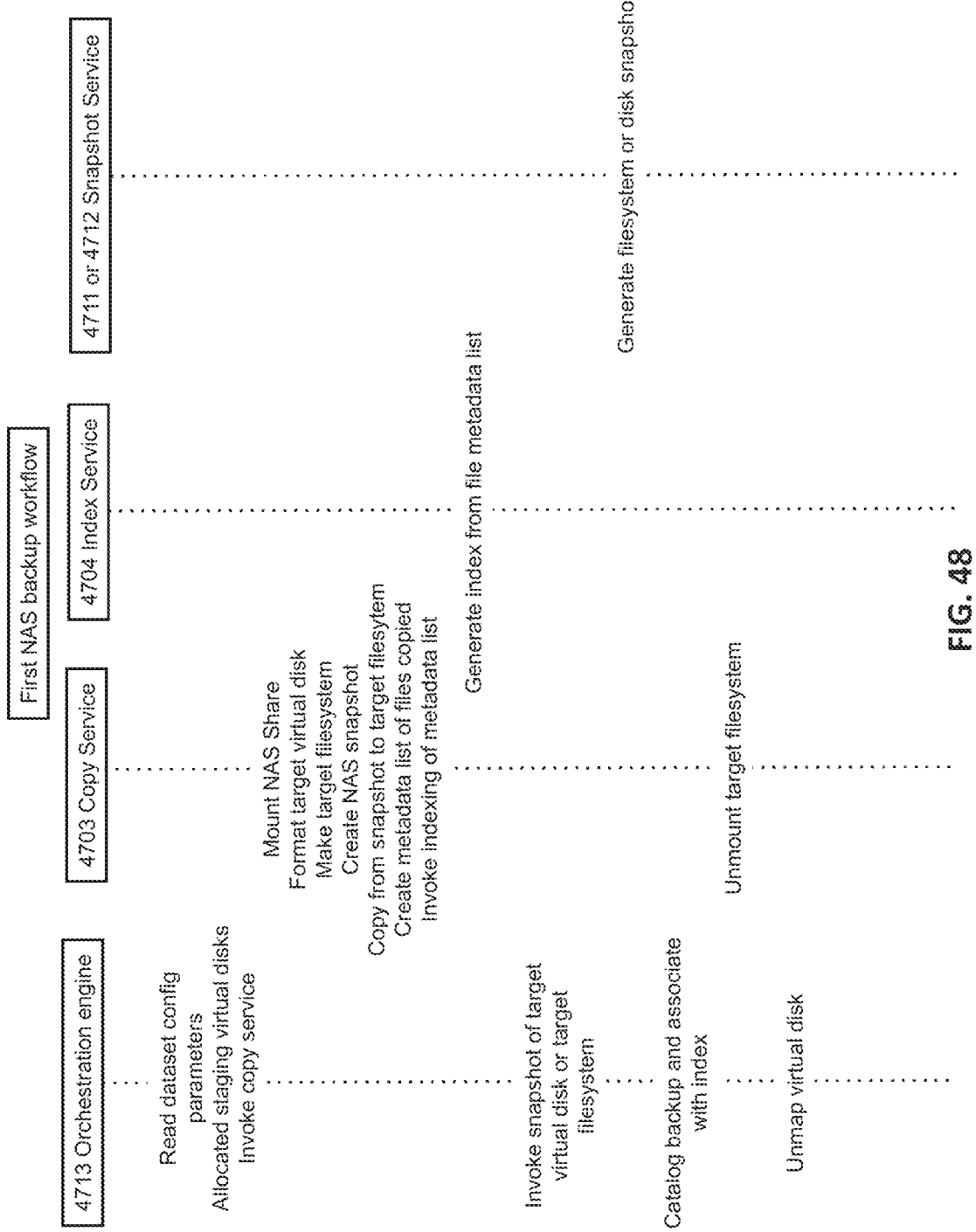
FIG. 48 is the sequence diagram illustrating the workflow of the first time data capture of the NAS system, according to some embodiments.

FIG. 48 is the sequence diagram illustrating the workflow of the first time data capture of the NAS system, according to some embodiments.

When the Copy Management System schedules the first backup of the NAS Server as dictated by the Service Level Policies set by the user, it follows a computerized process shown by the sequence diagram in FIG. 3, according to some embodiments.

The Orchestration Engine 4713 on the Copy Data Management Server 4707 reads the NAS Backup Dataset configuration parameters by sending command and queries to the NAS Server 4715. From this the Orchestration Engine 4713 can derive which NAS Server is to be backed up, what subset of the filesystem is to be backed up, and which NAS Backup Proxy host will participate.

The Orchestration Engine 4713 creates an appropriately sized staging virtual disk for the backup, and presents it to the correct NAS Backup Proxy 4710. It then communicates with the Copy Service 4703 on the NAS Backup Proxy 4710.

The Copy Service 4703 ensures that the NAS Filesystem is still mounted. It then formats the virtual disk and creates a target filesystem on the virtual disk. The type of filesystem created depends on the supported filesystem types and the type of NAS that is being backed up. To properly backup a CIFS based NAS Filesystem, the NAS Backup Proxy host will usually be a Windows host, and will use an NTFS filesystem. For an NFS based NAS Filesystem, a Linux based NAS Backup Proxy host is preferred, and an ext3 filesystem is usually deployed.

Next, either the Orchestration Engine 4713 or the Copy Service 4703 will create a NAS Filesystem snapshot, and will then copy data from the NAS snapshot to the target filesystem. Since this is the first backup of the particular dataset, all of the files matching the dataset criteria will have to be copied to the target file system.

While copying the files, the Copy Service 4703 will generate a list of the files copied including selected metadata. The metadata will include the pathname of the file, the dates of creation and modification, the owner, permission and potentially other attributes. When backups are mounted as CIFS, there is a choice of share level permissions or file level permissions. Share level permissions grant access to a network node associated with a share point, while file level permissions grant access to individual objects such as files and folders.

At the end of the copy process, the Copy Service 4703 will pass the metadata list to the Search and Indexing Service 4704 in order to generate an index of the files backed up.

Next, the Orchestration Engine 4713 or the Copy Service 4703 will invoke a snapshot operation on the virtual disk. If the virtual disk snapshot service is being used, the Engine will invoke the Virtual Disk Snapshot Service 4712 on the Copy Management Server. If the Filesystem Snapshot Service 4711 is to be invoked, the Copy Service 4703 shall invoke the snapshot on the NAS Backup Proxy Host 4710.

Therefore, in some embodiments, when the NAS Server 4709 generates a snapshot, the snapshot is copied from the NAS Server to 4709 to the mounted Virtual Volumes 4709. The Orchestration Engine 4713 takes a snapshot of the Virtual Volumes 4709 (e.g., using one of two file system-based snapshots services 4711 or 4712). The NAS snapshot stored on the NAS Server 4701 is not deleted because the process needs the snapshot for the next backup to compare it against the new snapshot to identify the changed data so only changed data needs to be transmitted to the Virtual Volumes 4709. For example, the NAS Server 4701 can use change tracking to only copy changed (deleted) files. In some examples, the Virtual Volume 4709 is a live version—the snapshot of the Virtual Volumes 4709 is taken to back-up the live version, which can be retained for as long as the system is configured to retain the snapshots (e.g., daily, weekly, etc.).

The last step of the backup is to catalog the backup, which records details of the backup that has been completed, including the date and time, and the copy data storage that was used. The target filesystem is now unmounted from the NAS Backup Proxy host, and the virtual disk unmapped from it.

Flow of Subsequent Backups

Figure 49:
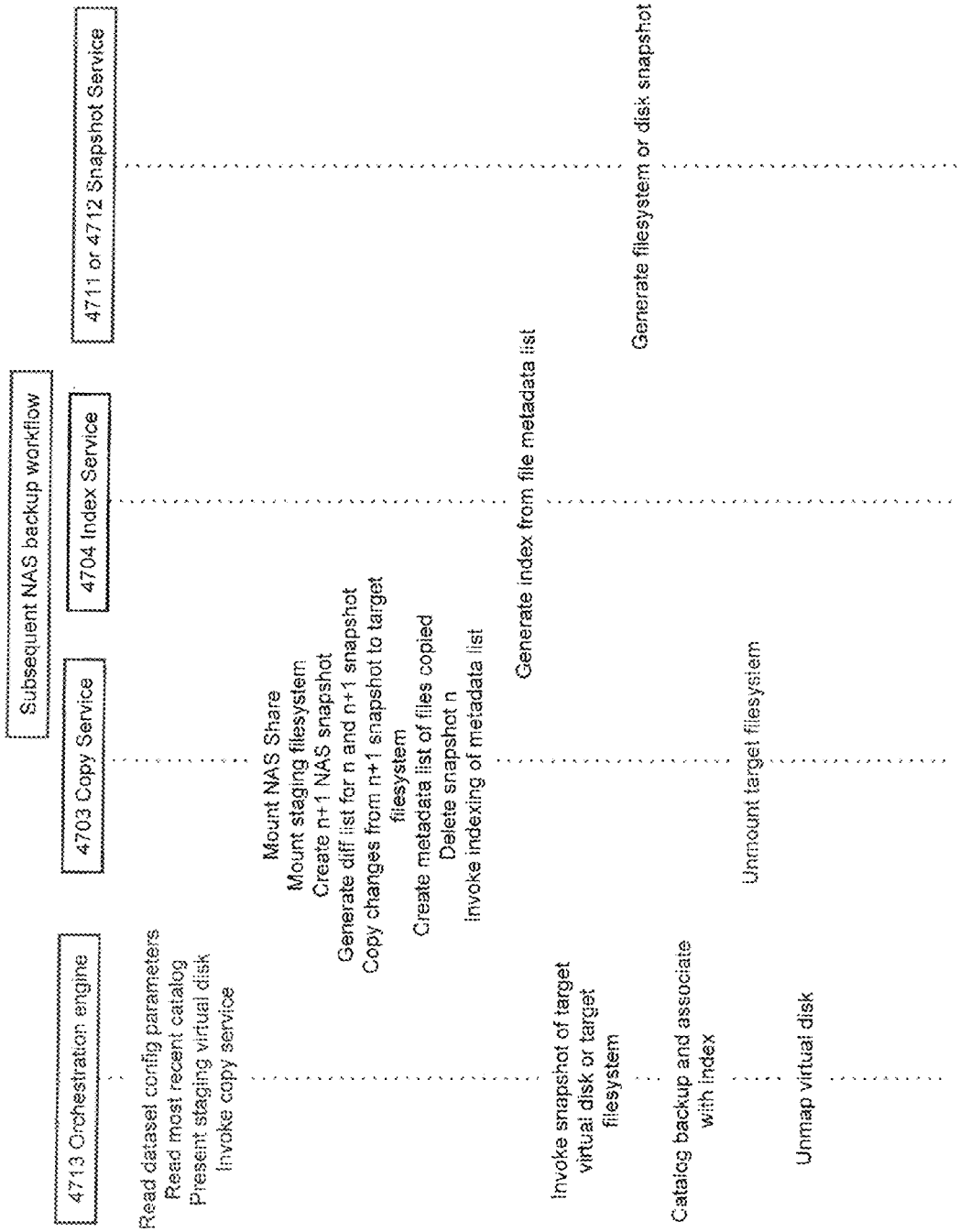
FIG. 49 is the sequence diagram illustrating the workflow of a subsequent data capture of the NAS system after the first time shown in FIG. 47, according to some embodiments.

FIG. 49 is the sequence diagram for the flow of any subsequent backup of a dataset after the first one, according to some embodiments.

The backup begins with the Orchestration Engine 4713 reading the dataset configuration and information from the catalog indicating the most recent backup. From the catalog, the Orchestration Engine 4713 learns of the previously used staging virtual disk. The Orchestration Engine maps this virtual disk to the appropriate NAS Backup Proxy 4710 host. It then sends a message to the Copy Service 4703 on the NAS Backup Proxy 4710 host.

The Copy Service 4703 mounts the target filesystem, and then creates a new NAS snapshot. It uses the Management Service 4706 of the NAS System to compare the current snapshot and the previous one, and generates a list of files that were created, modified or deleted since the last backup.

The Copy Service 4703 then copies newly created and modified files from the mounted NAS filesystem to the target filesystem, and it also deletes files from the target filesystem if they were deleted from the NAS Filesystem. At the end of this operation, the target filesystem looks just like the NAS filesystem. While copying, the Copy Service 4703 creates a list of the files that it handled, along with selected metadata.

Once the copying is completed, the Copy Service 4703 deletes the older NAS snapshot. It then invokes the Index and Search Service 4703 on the list of files created, copied or deleted.

The Search and Index Service processes the list of files provided to it and adds these file names and their metadata to the search database that it maintains. This provides it with the ability to perform fast searches on any of the filenames or other metadata, and identify the backup that contained these files.

Next the Orchestration Engine 4712 invokes the Virtual Disk Snapshot service 4712 (or the Copy Service invokes the File Snapshot Service 4711), to create a new snapshot of the staging disk. This disk is cataloged as the next successful backup, and the target filesystem is unmounted and the virtual disk is unmapped.

Therefore, only the changed data is copied to the mounted Virtual Volumes 4709, which updates the live copy on the Virtual Volumes 4709. The Orchestration Engine 4713 takes a snapshot of the Virtual Volumes 4709 to backup the current version of the live copy on the Virtual Volumes 4709. Since the snapshots of the Virtual Volumes 4709 can be retained for as long as the system is configured to retain the snapshots (e.g., daily, weekly, etc.), this may result in multiple snapshots on the Virtual Volumes 4709.

The second and subsequent backup, performed in this manner is a full copy of the NAS filesystem. Every file in the subset of the NAS System is on the target filesystem at the same version. Yet the full backup was achieved by just copying the changed files from the NAS Filesystem, which is an enormous savings in I/O. This is what allows the Copy Data Management system to handle very large NAS systems.

Mounting of a NAS Backup

Figure 50:
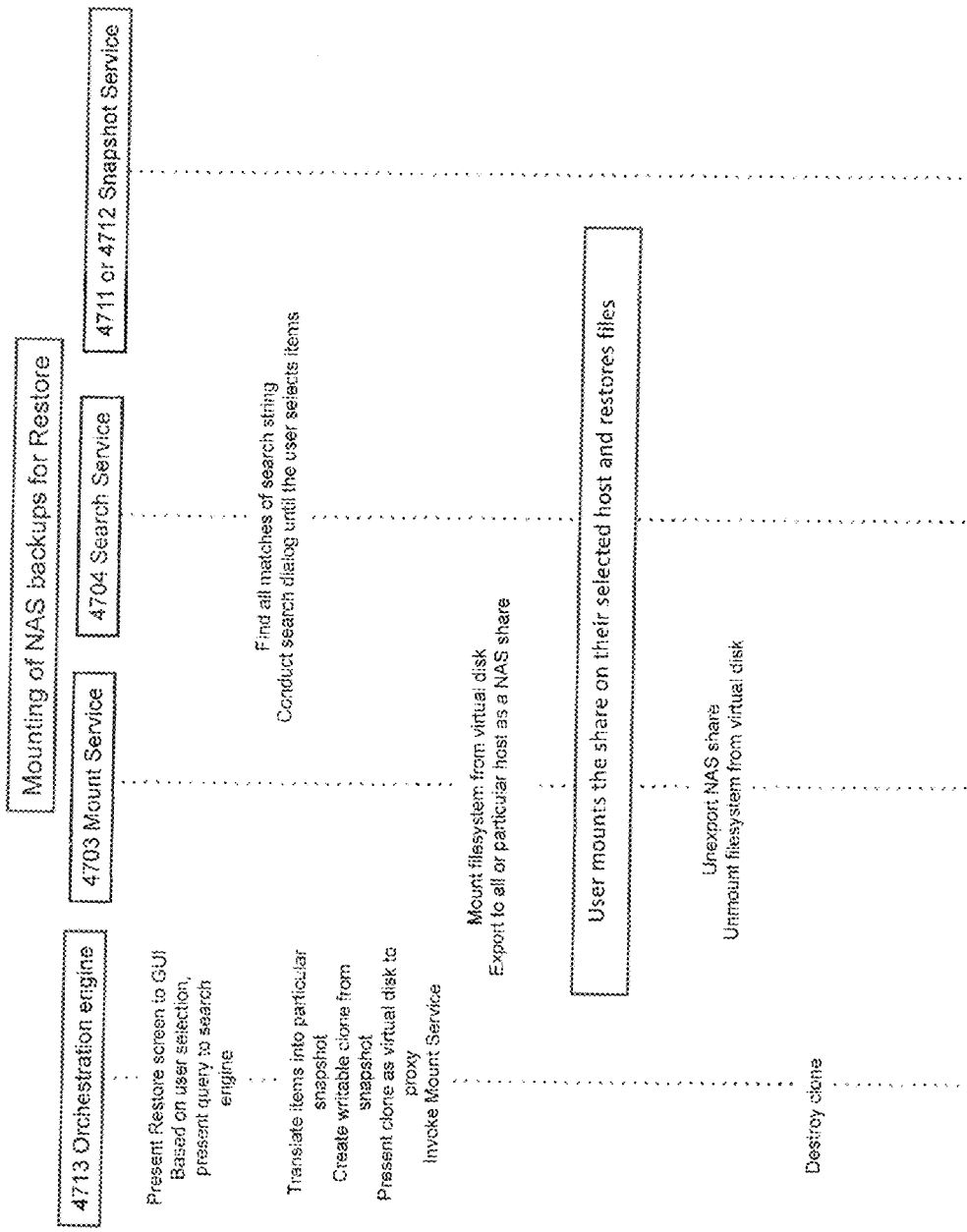
FIG. 50 is the sequence diagram describing the workflow during the recovery or access of captured data for restore, according to some embodiments.

FIG. 50 shows a sequence diagram for the flow of mounting and unmounting a NAS Backup to a customer system for a restore, according to some embodiments. In some embodiments, the NAS Backup Proxy 4710 may not perform a traditional restore (e.g., that returns data back to the NAS server 4701). The NAS Backup Proxy 4710 can be configured to mount a snapshot to the target device such that the target device can see (e.g., and manipulate) the full data on the mounted snapshot without affecting or overwriting data on the NAS Server 4701.

The mount and unmounts operations can replace the restore in a traditional backup. Mounting of a NAS Backup allows the user to access files as they used to be at the time of the backup. It is quicker than traditional restore, because no data movement is involved. The time required is virtually independent of the size of the backup.

The mount operation can be triggered, for example, by the user using a GUI to invoke the service. The Orchestration Engine 4713 presents a selection list based on the filesystems that were backed up. The user may select one or more datasets, and type in keywords to identify the desired dataset(s). Keywords may include filenames or wildcard patterns, or owner names or any other indexed attributes.

The Orchestration Engine 4713 presents these keywords to the Indexing and Search Service 2504. The Search Service 4704 returns with a list of backups that matched the search query. Now the user selects one of the backups, and the host to which the backup is to be mounted.

The Orchestration Engine 4713 converts the search engine results into the name of a virtual disk (or filesystem) snapshot. If required, the Orchestration Engine 4713 creates a writable clone from the snapshot, and presents this clone to the NAS Backup Proxy host. For example, while some snapshot functions allow the data to be modified, some snapshot functions require making a clone of the snapshot before it is writable.

There, the Mount Service 4703 mounts the filesystem from the virtual disk, and then exports this as a NAS Share to the user selected host.

Depending on the level of access available on the user selected host, the Orchestration Engine 4713 or the User will mount the share on the selected host, and will have full access to the backed up data.

The user can now examine the files in the mounted filesystem on the selected host. The user can copy files, run programs or even make modifications to the mounted files. The mounted filesystem is based on a writable clone of the original snapshot, so the snapshot is unaffected by modifications.

After the user is done with the mounted filesystem, the user invokes the unmount operation. The filesystem is unmounted from the selected host. Then the virtual disk snapshot is unmounted from the NAS Backup Proxy, and the virtual disk is unmapped. Last of all, the writable clone is destroyed.

Comparing Virtual Disk Snapshots and Filesystem Snapshots

The Copy Data Management System can be configured to support multiple (e.g., two) different snapshot mechanisms for creating snapshots of the staging disk after the copying of data is completed.

In some embodiments, one mechanism is the Virtual Disk Snapshot Service that runs on the Copy Data Server 4712 as shown in FIG. 48. This service is capable of creating snapshots of virtual disks using a storage hypervisor and a copy-on-write technology.

The other mechanism is the Filesystem Snapshot Service, 4711 as shown in FIG. 47. This service runs on the NAS Backup Proxy host. This services uses a filesystem based snapshot capability built on allocate on write technology.

One or both of these services may be available in any particular configuration. If both are available, which one is used depends on the exact requirements of the user.

FIG. 51 is an exemplary table that compares features of the two Snapshot services, according to some embodiments. In some embodiments, the Virtual Disk snapshot service provides for higher performance snapshots than the Filesystem Snapshot service. However, in some implementations the Filesystem Snapshot service scales better, since each NAS Backup Proxy will have its own instance of the Filesystem Snapshot service.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A system for automating a process of creating and mounting operational copies of production data from a client storage system to applications in accordance with workflows that specify procedures for unmounting old operational copies of the production data, creating new operational copies of the production data, and mounting the new operational copies of data to the applications so that the applications can use the new operational copies, said system comprising:
   a processor and a memory containing instructions for execution by the processor that when executed by the processor, cause the processor to:
      execute a copy data workflow associated with production data stored at a client storage system based on a triggering event, the triggering event specifying a condition upon which to execute the copy data workflow, the copy data workflow comprising a configurable set of work actions for managing copy data associated with the production data; and
      execute the set of configurable work actions associated with the copy data workflow, comprising:
         unmounting an old operational copy of the production data from an application, wherein the old operational copy was created based on an outdated version of the production data,
         creating a new operational copy of a current version of the production data, wherein the new operational copy of the production data provides a working copy of the current version of the production data, and
         mounting the new operational copy of the production data to the application so that the application can use the current version of the production data,
      thereby automating the process of creating and mounting the operational copy of the production data to the application in accordance with the copy data workflow, which specifies procedures for creating and mounting the new operational copy of the production data to the application.

2. The system of claim 1, wherein to execute the set of configurable work actions associated with the at least one workflow, the processor is further configured to:
   refresh the new operational copy of the current version of the production data, and
   sanitize the new operational copy of the current version of the production data prior to mounting the new operational copy of the current version of the production data.

3. The system of claim 2, wherein to sanitize the new operational copy of the current version of the production data, the processor is further configured to remove sensitive user information from the new operational copy of the current version of the production data.

4. The system of claim 2, wherein to sanitize the new operational copy of the current version of the production data, the processor is further configured to invoke a prescript before the mount operation and a postscript after the mount operation.

5. The system of claim 1, wherein the triggering event comprises a manual trigger, an event trigger, a Cron-expression trigger, or any combination thereof.

6. The system of claim 1, wherein the production data is a test and development application.

7. A computerized method for automating a process of creating and mounting operational copies of production data from a client storage system to applications in accordance with workflows that specify procedures for unmounting old operational copies of the production data, creating new operational copies of the production data, and mounting the new operational copies of data to the applications so that the applications can use the new operational copies, the method comprising:

executing, by a computing device, a copy data workflow associated with production data stored at a client storage system based on a triggering event, the triggering event specifying a condition upon which to execute the copy data workflow, the copy data workflow comprising a configurable set of work actions for managing copy data associated with the production data; and executing, by the computing device, the set of configurable work actions associated with the copy data workflow, comprising:

unmounting an old operational copy of the production data from an application, wherein the old operational copy was created based on an outdated version of the production data, creating a new operational copy of a current version of the production data, wherein the new operational copy of the production data provides a working copy of the current version of the production data, and mounting the new operational copy of the production data to the application so that the application can use the current version of the production data, thereby automating the process of creating and mounting the operational copy of the production data to the application in accordance with the copy data workflow, which specifies procedures for creating and mounting the new operational copy of the production data to the application.

8. The method of claim 7, wherein executing the set of configurable work actions associated with the at least one workflow comprises:

refreshing the new operational copy of the current version of the production data, and sanitizing the new operational copy of the current version of the production data prior to mounting the new operational copy of the current version of the production data.

9. The method of claim 8, wherein sanitizing the new operational copy of the current version of the production data comprises removing sensitive user information from the new operational copy of the current version of the production data.

10. The method of claim 8, wherein sanitizing the new operational copy of the current version of the production data comprises invoking a prescript before the mount operation and a postscript after the mount operation.

11. The method of claim 7, wherein the triggering event comprises a manual trigger, an event trigger, a Cron-expression trigger, or any combination thereof.

12. The method of claim 7, wherein the production data is a test and development application.

13. A non-transitory computer readable medium having executable instructions operable to cause an apparatus to:

execute a copy data workflow associated with production data stored at a client storage system based on a triggering event, the triggering event specifying a condition upon which to execute the copy data workflow, the copy data workflow comprising a configurable set of work actions for managing copy data associated with the production data; and execute the set of configurable work actions associated with the copy data workflow, comprising:

unmounting an old operational copy of the production data from an application, wherein the old operational copy was created based on an outdated version of the production data, creating a new operational copy of a current version of the production data, wherein the new operational copy of the production data provides a working copy of the current version of the production data, and mounting the new operational copy of the production data to the application so that the application can use the current version of the production data, thereby automating the process of creating and mounting the operational copy of the production data to the application in accordance with the copy data workflow, which specifies procedures for creating and mounting the new operational copy of the production data to the application.

14. The non-transitory computer readable medium of claim 13, wherein executing the set of configurable work actions associated with the at least one workflow comprises:

refreshing the new operational copy of the current version of the production data, and sanitizing the new operational copy of the current version of the production data prior to mounting the new operational copy.

15. The non-transitory computer readable medium of claim 14, wherein sanitizing the new operational copy of the current version of the production data comprises removing sensitive user information from the new operational copy of the current version of the production data.

16. The non-transitory computer readable medium of claim 14, wherein sanitizing the new operational copy of the current version of the production data comprises invoking a prescript before the mount operation and a postscript after the mount operation.

17. The non-transitory computer readable medium of claim 13, wherein the triggering event comprises a manual trigger, an event trigger, a Cron-expression trigger, or any combination thereof.

18. The non-transitory computer readable medium of claim 13, wherein the production data is a test and development application.

* * * * *